United States Patent
Park et al.

(10) Patent No.: US 12,171,030 B2
(45) Date of Patent: Dec. 17, 2024

(54) METHOD FOR TRANSMITTING AND RECEIVING URGENT INFORMATION IN WIRELESS COMMUNICATION SYSTEM SUPPORTING MACHINE TYPE COMMUNICATION, AND DEVICE FOR SAME

(71) Applicant: LG ELECTRONICS INC., Seoul (KR)

(72) Inventors: Changhwan Park, Seoul (KR); Jaehyung Kim, Seoul (KR); Hyunjung Choe, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 408 days.

(21) Appl. No.: 17/627,589

(22) PCT Filed: Jul. 23, 2020

(86) PCT No.: PCT/KR2020/009699
§ 371 (c)(1),
(2) Date: Jan. 14, 2022

(87) PCT Pub. No.: WO2021/015565
PCT Pub. Date: Jan. 28, 2021

(65) Prior Publication Data
US 2022/0377808 A1 Nov. 24, 2022

Related U.S. Application Data

(60) Provisional application No. 62/877,825, filed on Jul. 23, 2019.

(30) Foreign Application Priority Data
Nov. 7, 2019 (KR) .................. 10-2019-0142133

(51) Int. Cl.
*H04W 74/0833* (2024.01)
*H04W 72/1263* (2023.01)
(Continued)

(52) U.S. Cl.
CPC .... *H04W 74/0841* (2013.01); *H04W 72/1263* (2013.01); *H04W 72/23* (2023.01); *H04W 74/006* (2013.01)

(58) Field of Classification Search
CPC ......... H04W 74/0841; H04W 72/1263; H04W 72/23; H04W 74/006; H04W 24/08;
(Continued)

(56) References Cited

U.S. PATENT DOCUMENTS

| | | | |
|---|---|---|---|
| 2016/0242206 A1* | 8/2016 | Ohlsson | H04W 74/006 |
| 2017/0238302 A1* | 8/2017 | Futaki | H04W 4/70 370/329 |
| 2018/0220373 A1* | 8/2018 | Arzelier | H04W 52/0241 |

FOREIGN PATENT DOCUMENTS

KR 10-2018-0028439 A 3/2018

OTHER PUBLICATIONS

LG Electronics, Summary of CE mode A and B improvements for non-BL UEs, 3GPP TSG RAN WG1 Meeting #97, Reno, USA, May 13-17, 2019, R1-1907618; (Year: 2019).*

(Continued)

*Primary Examiner* — Shailendra Kumar
(74) *Attorney, Agent, or Firm* — BRYAN CAVE LEIGHTON PAISNER LLP

(57) ABSTRACT

Proposed in the present specification is a method for transmitting and receiving urgent information in a wireless communication system supporting machine type communication, and a device for same. Specifically, a method performed by a terminal may include the steps of: receiving information including a Reference Signal Received Power
(Continued)

(RSRP) threshold value from a base station; determining a Coverage Enhancement (CE) mode on the basis of the RSRP threshold value and an RSRP measurement value; determining a Physical Random Access Channel (PRACH) resource on the basis of the CE mode; and transmitting a PRACH preamble to the base station on the basis of the PRACH resource.

13 Claims, 29 Drawing Sheets

(51) Int. Cl.
*H04W 72/23* (2023.01)
*H04W 74/00* (2009.01)

(58) Field of Classification Search
CPC ..... H04W 48/12; H04W 76/27; H04W 76/50; H04W 74/0833; H04W 4/70; H04W 4/90; H04W 68/00; H04W 72/1268; H04W 74/004; H04W 68/005; H04W 48/08; H04L 5/0012; H04L 5/0023; H04L 5/0048; H04L 5/0053; H04L 5/0069; H04L 5/0091; H04L 27/2601; H04L 5/16; H04L 5/0007; Y02D 30/70
See application file for complete search history.

(56) References Cited

OTHER PUBLICATIONS

Nokia Networks, Random access procedure for enhanced coverage UEs, 3GPP TSG RAN WG2 Meeting #91bis, Malmö, Sweden, Oct. 5-9, 2015, R2-154559 (Year: 2015).*
Panasonic, DCI size alignment in CSS, 3GPP TSG RAN WG1 Meeting #92, Athens, Greece, Feb. 26-Mar. 2, 2018, R1-1802506 (Year: 2018).*
LG Electronics, "Summary of CE mode A and B improvements for non-BL UEs", R1-1907618, 3GPP TSG RAN WG1 Meeting #97, Reno, USA. May 13-17, 2019, see section 2.2.
Panasonic, "DCI size alignment in CSS", R1-1802506, 3GPP TSG RAN WG1 Meeting #92, Athens, Greece, Feb. 26-Mar. 2, 2018, see section 3.
Nokia Networks, "Random access procedure for enhanced coverage UEs", R2-154559, 3GPP TSG RAN WG2 Meeting #91bis, Malmo, Sweden, Oct. 5-9, 2015, see section 2.
Qualcomm Incorporated, "CE Mode A and B improvements for non-BL UEs", R1-1906997, 3GPP TSG RAN WG1 Meeting #97, Reno, USA, May 13-17, 2019, see section 3.

* cited by examiner

[FIG. 1]
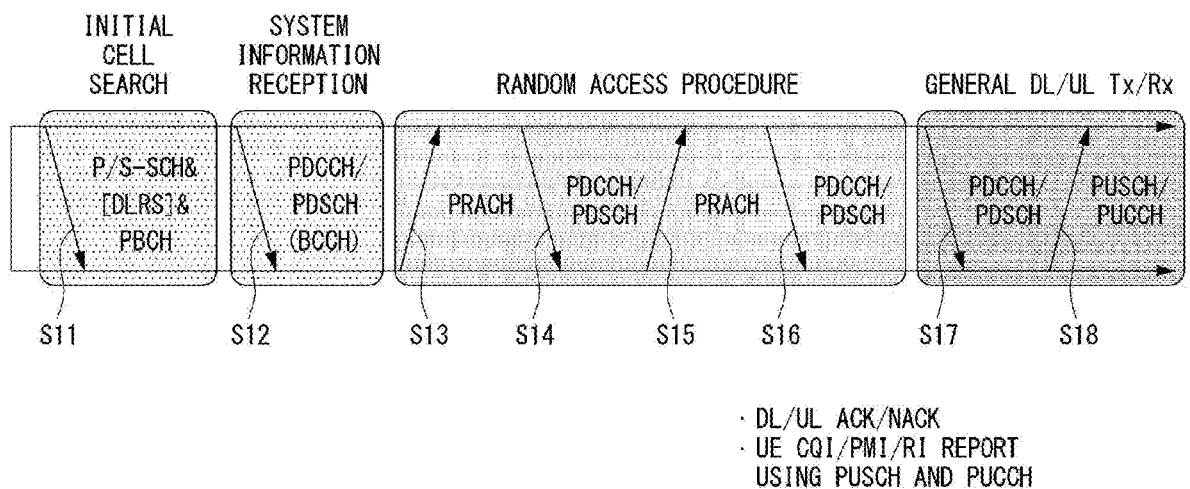

[FIG. 2]
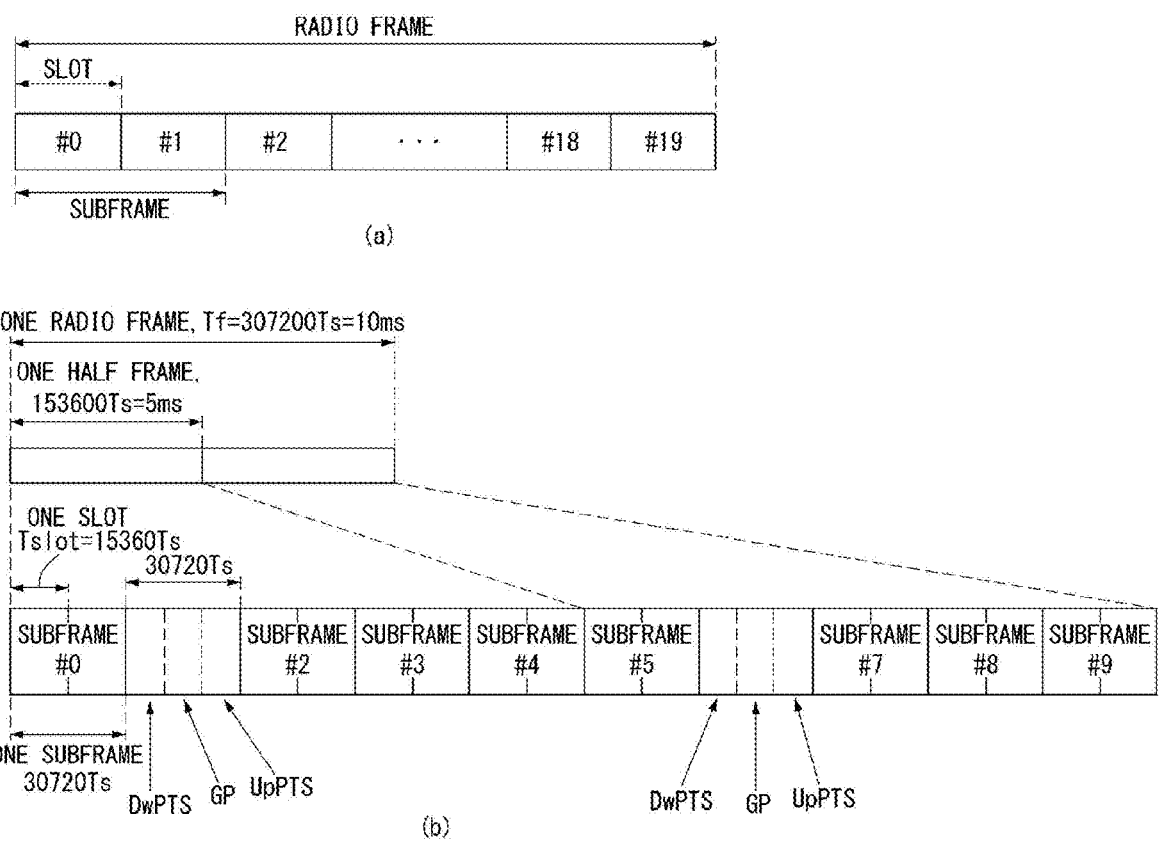

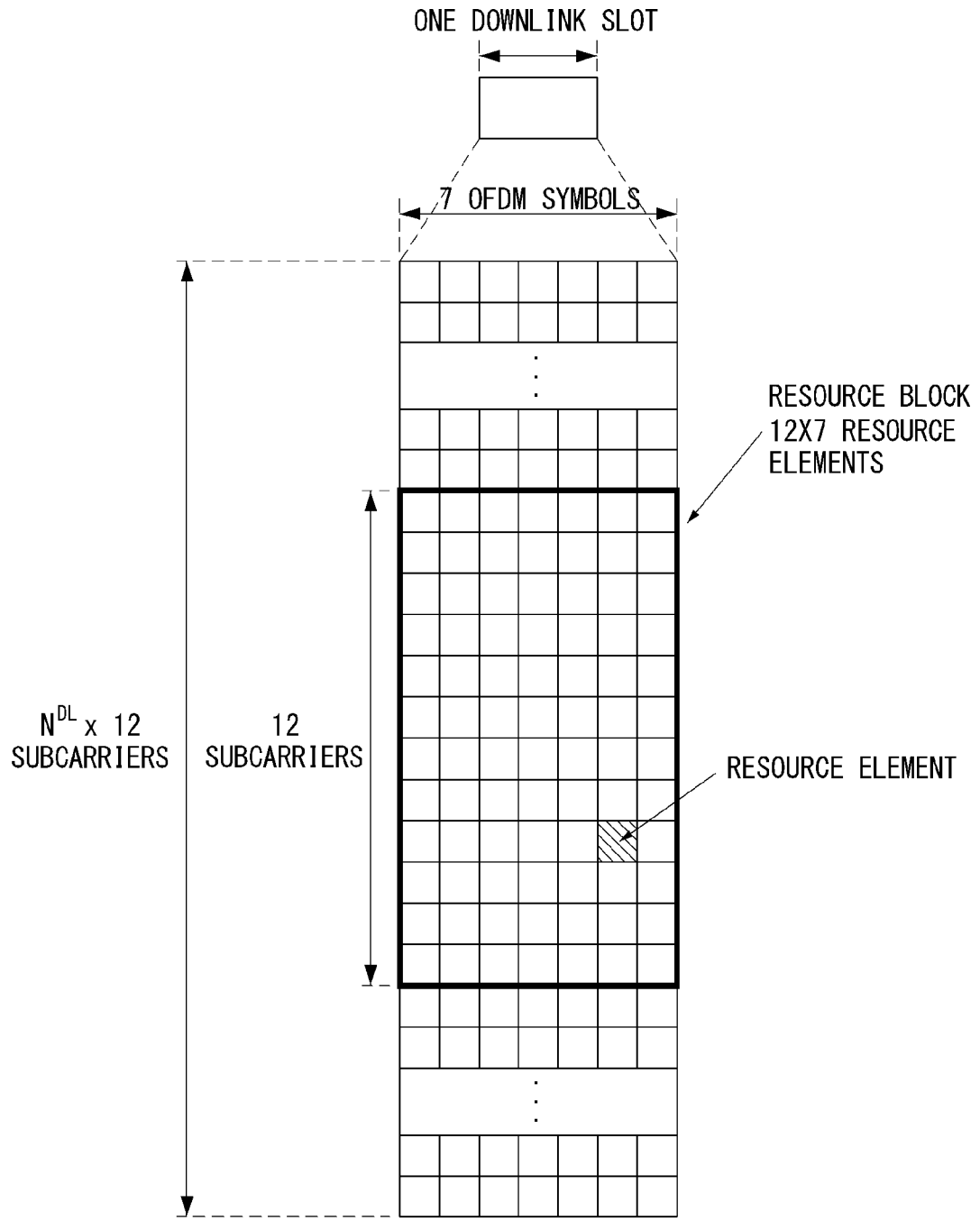
[FIG. 3]

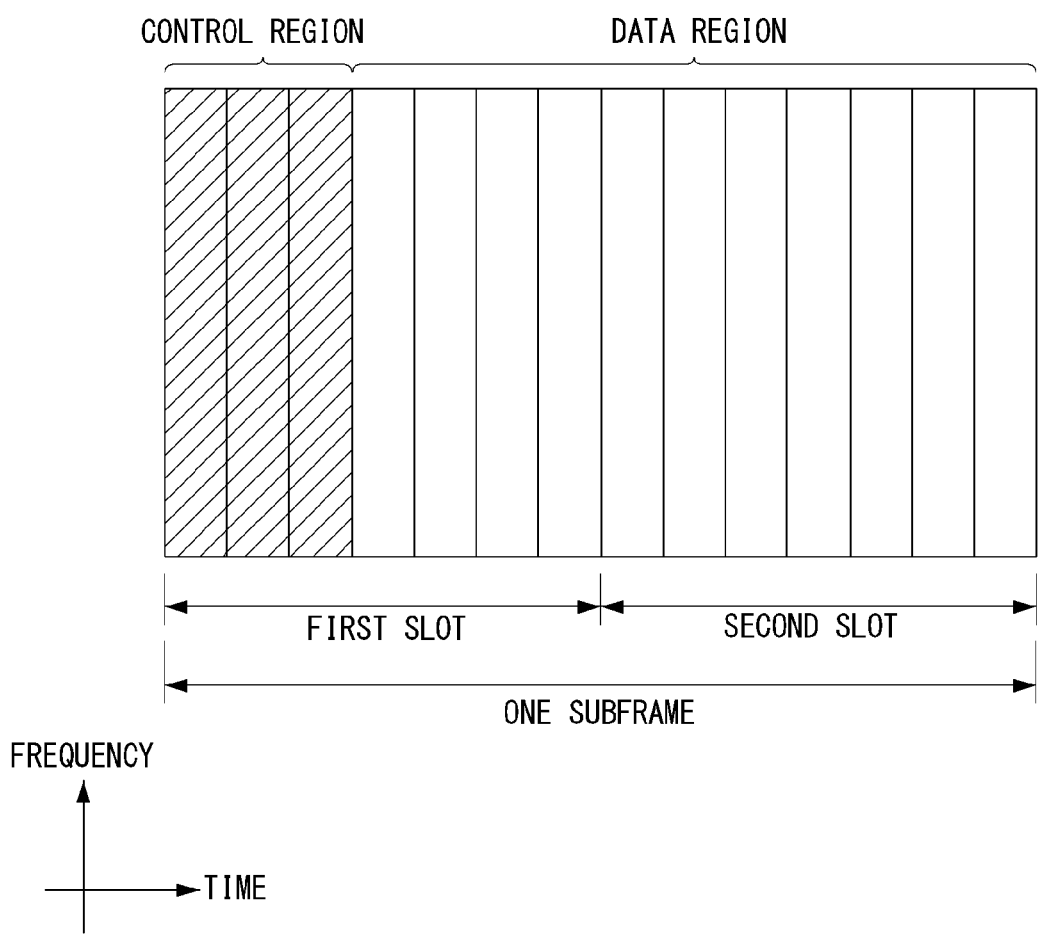

[FIG. 5]
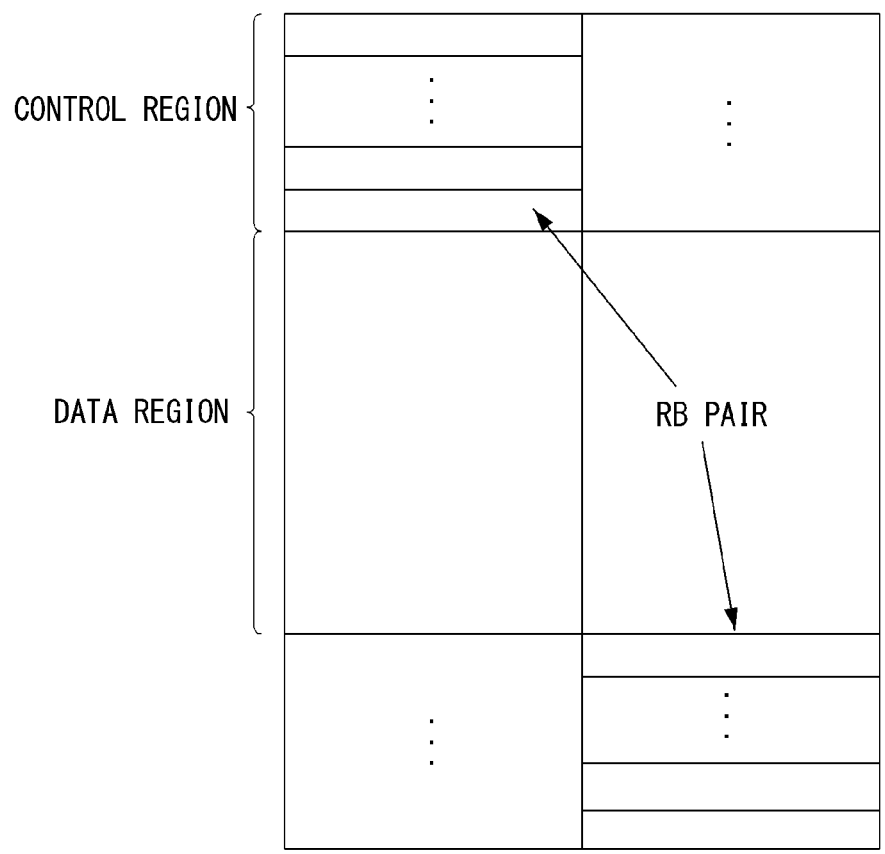

[FIG. 6]
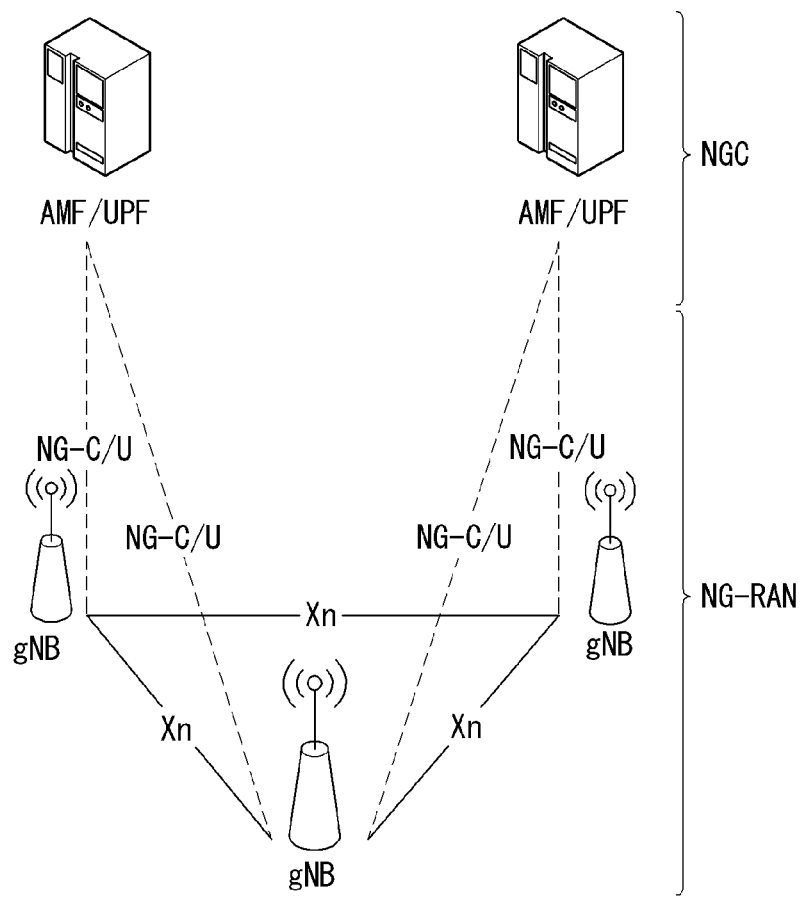

[FIG. 7]
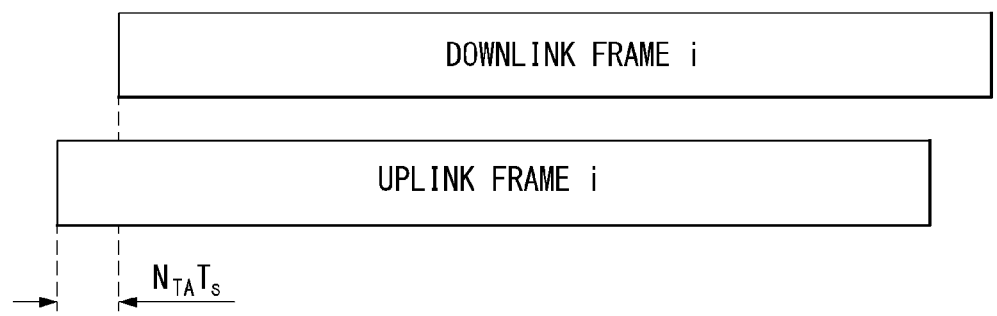

[FIG. 8]
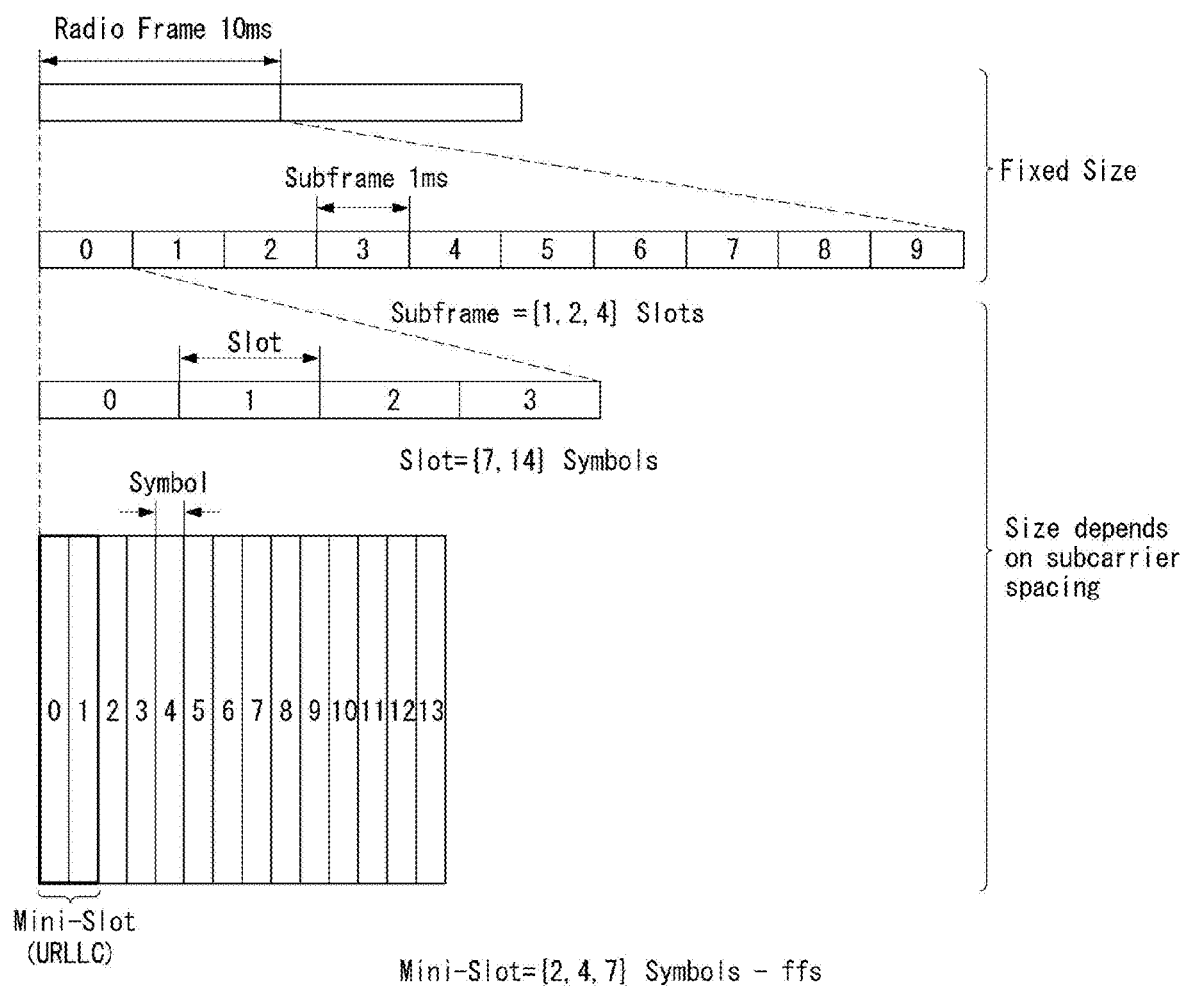

[FIG. 9]
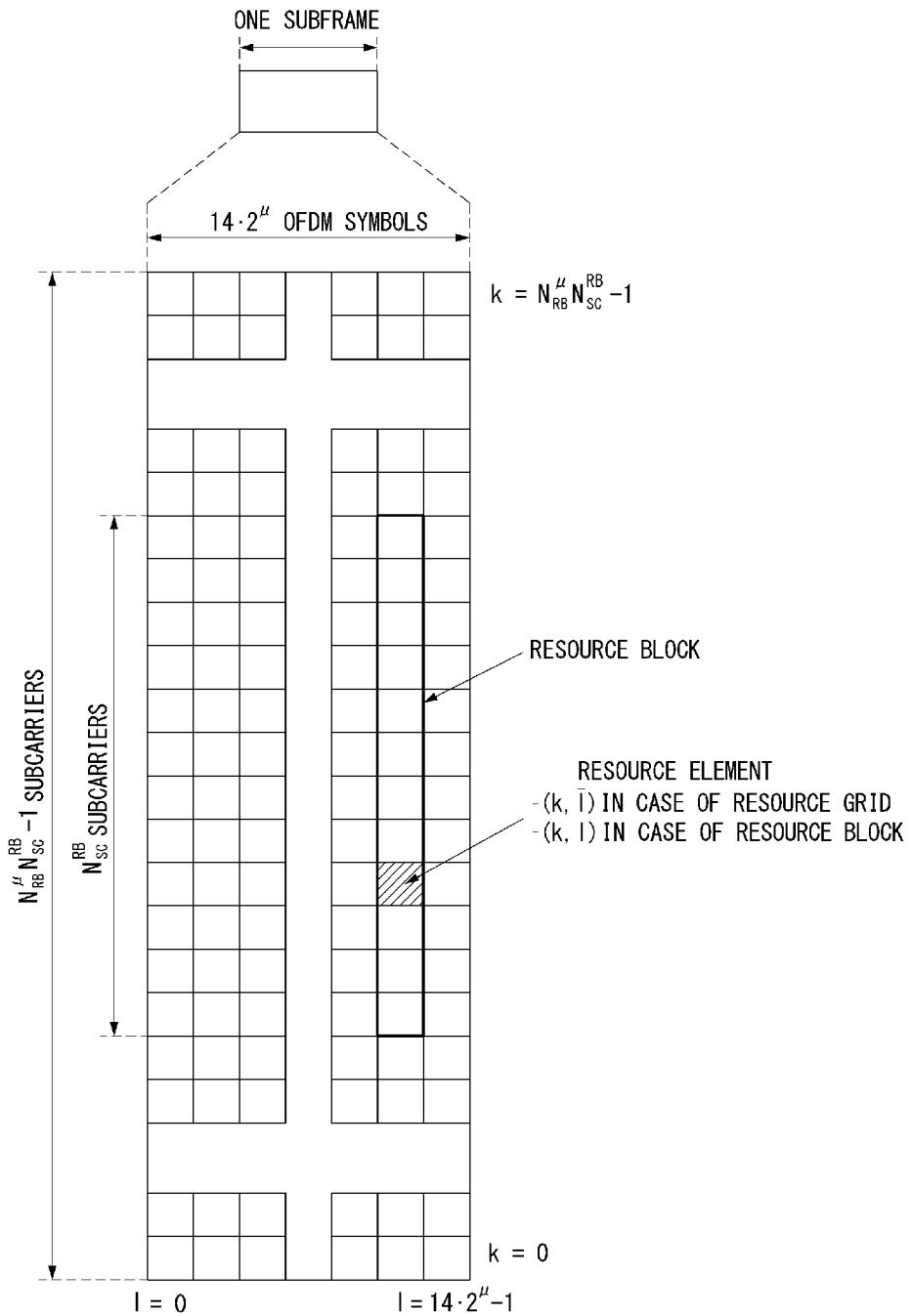

[FIG. 10]
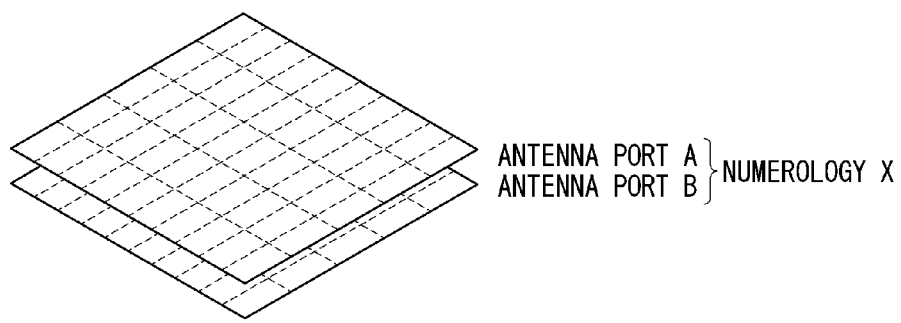
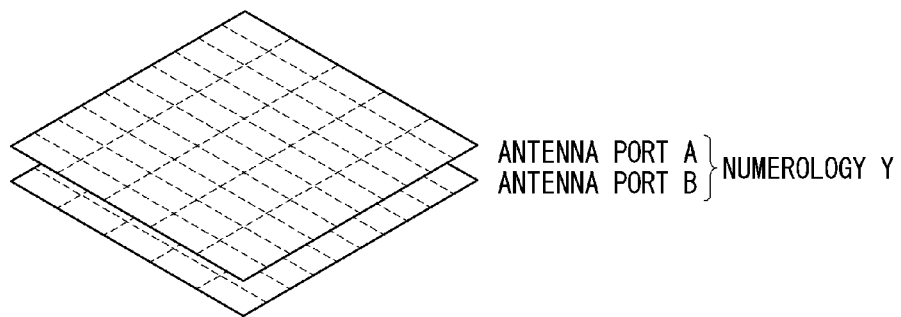

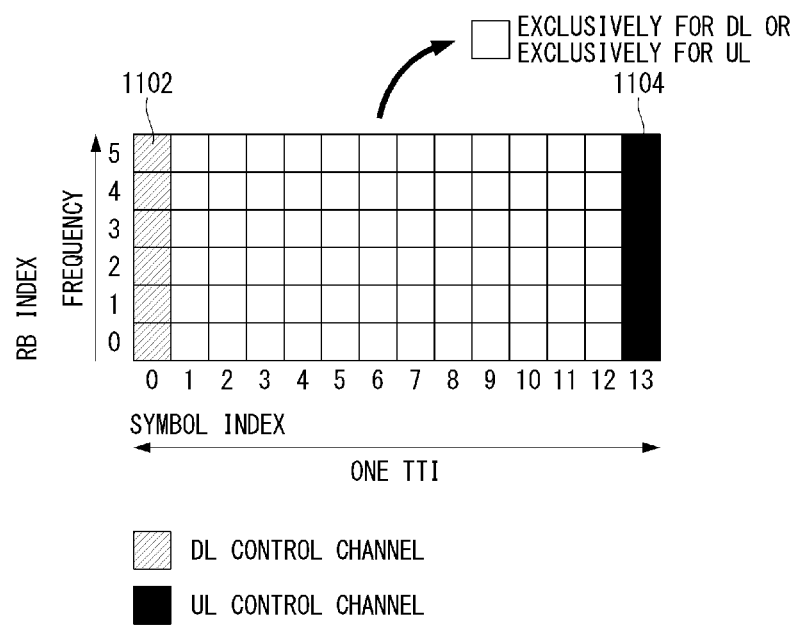

[FIG. 12]
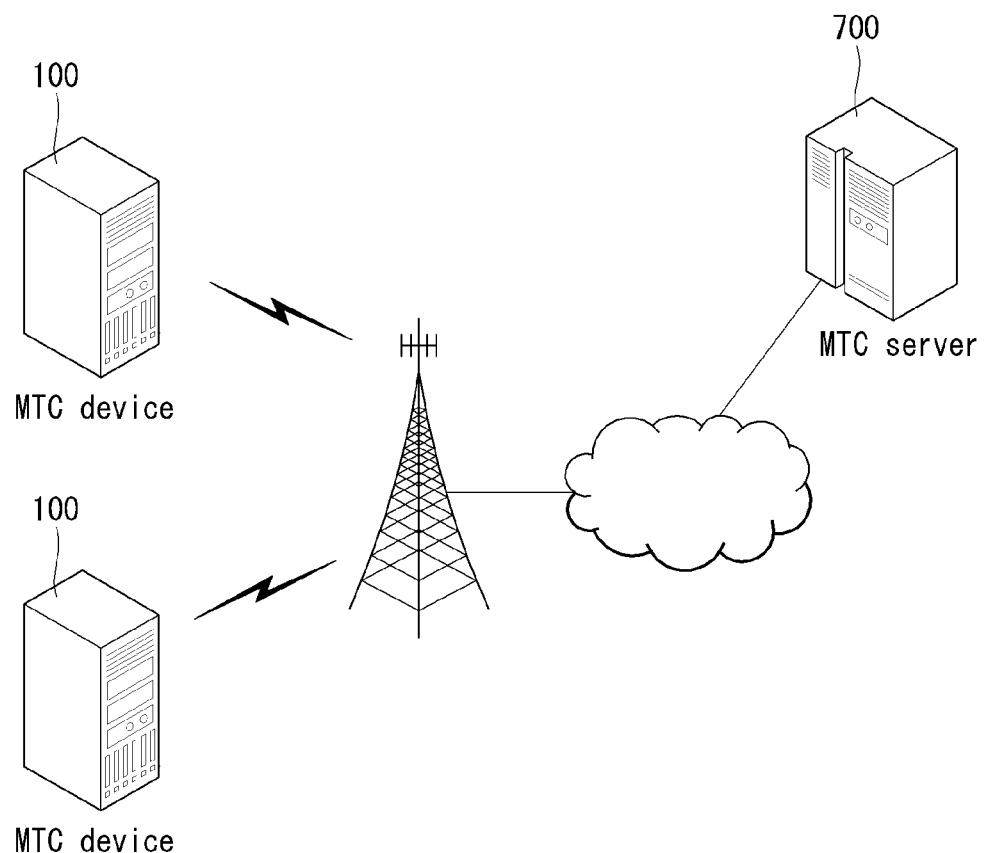

[FIG. 13]
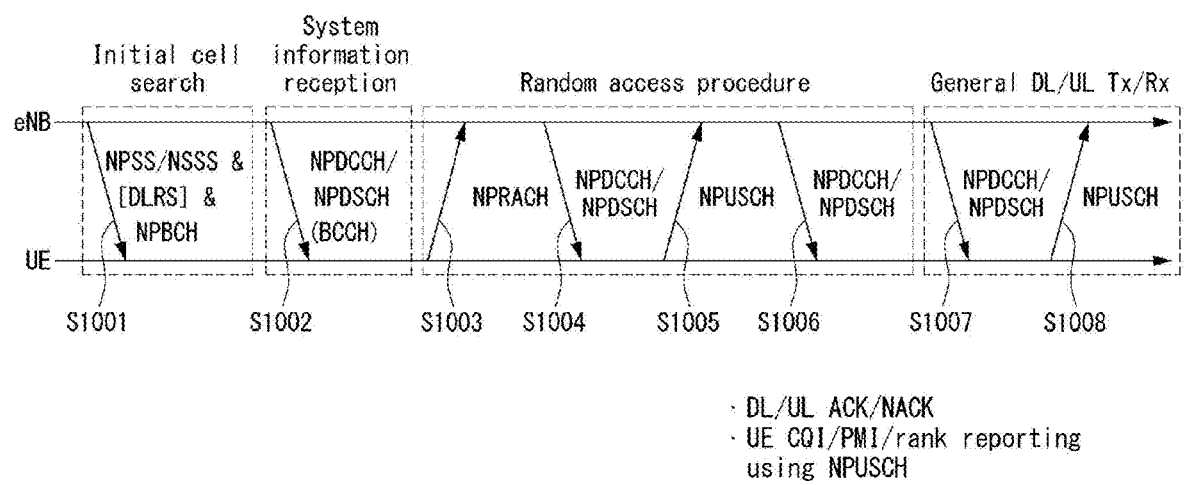

[FIG. 14]
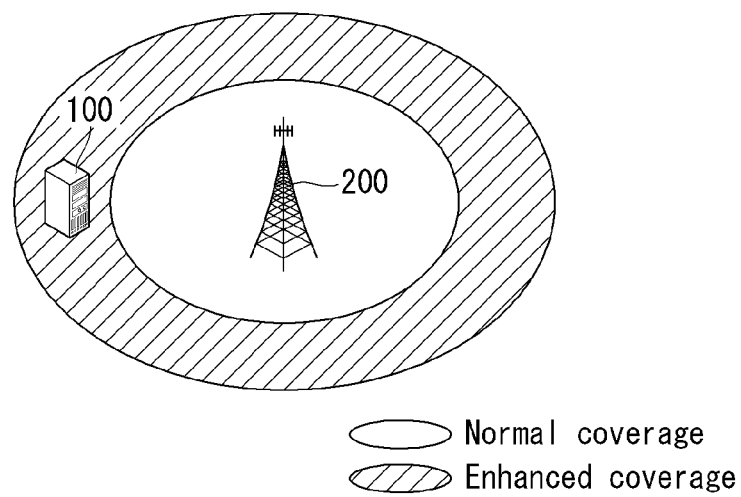
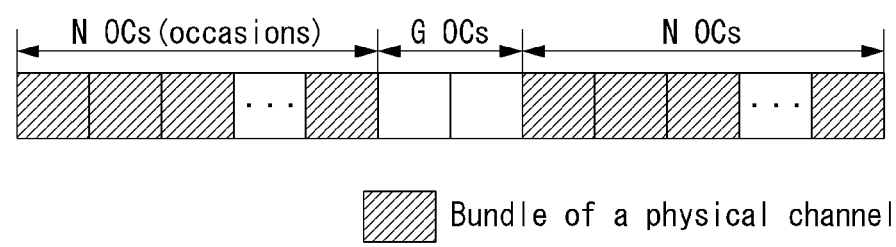

[FIG. 15]
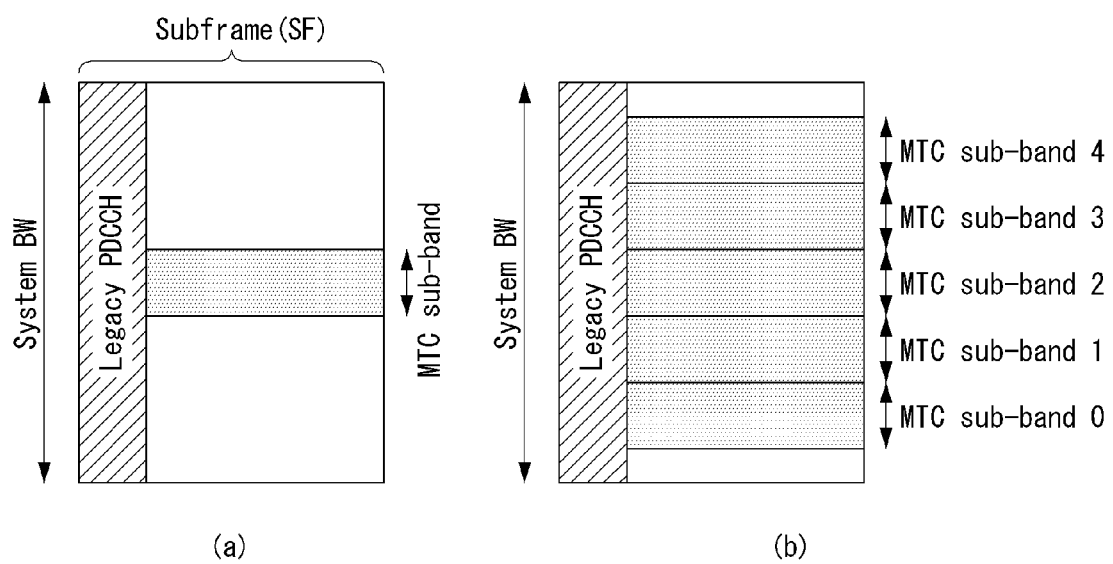

[FIG. 16]
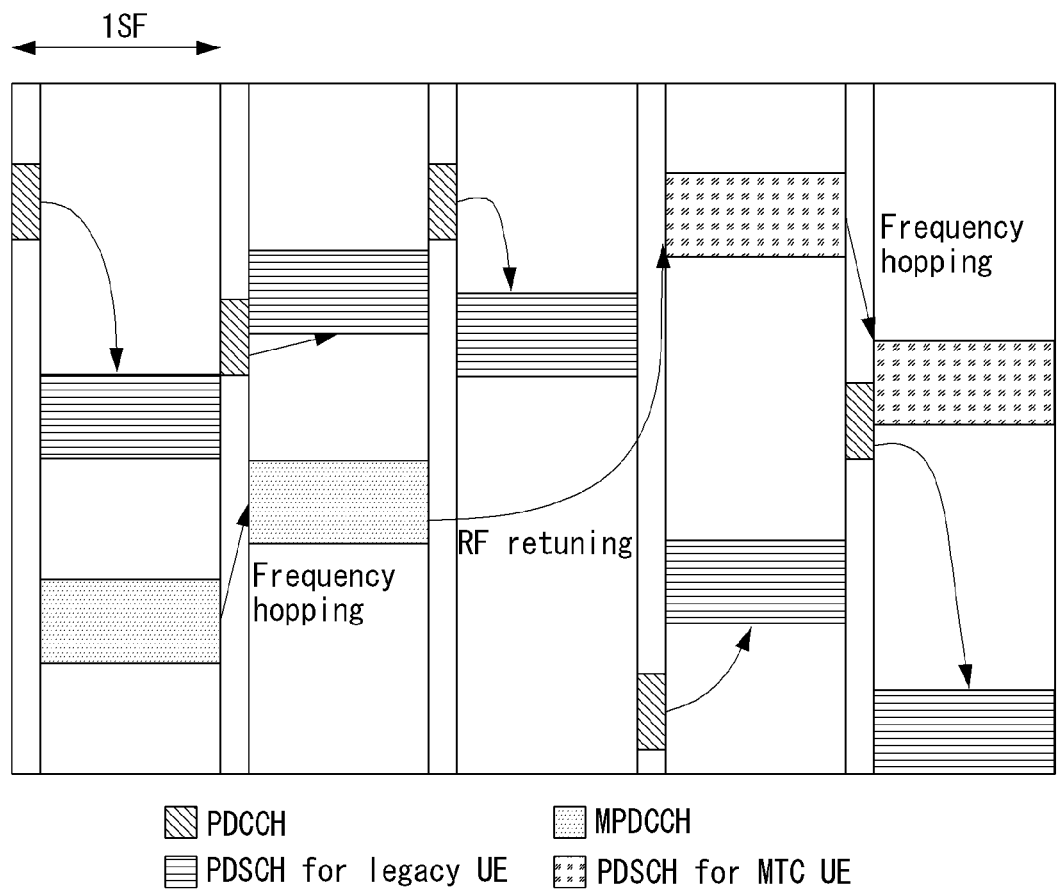

[FIG. 17]
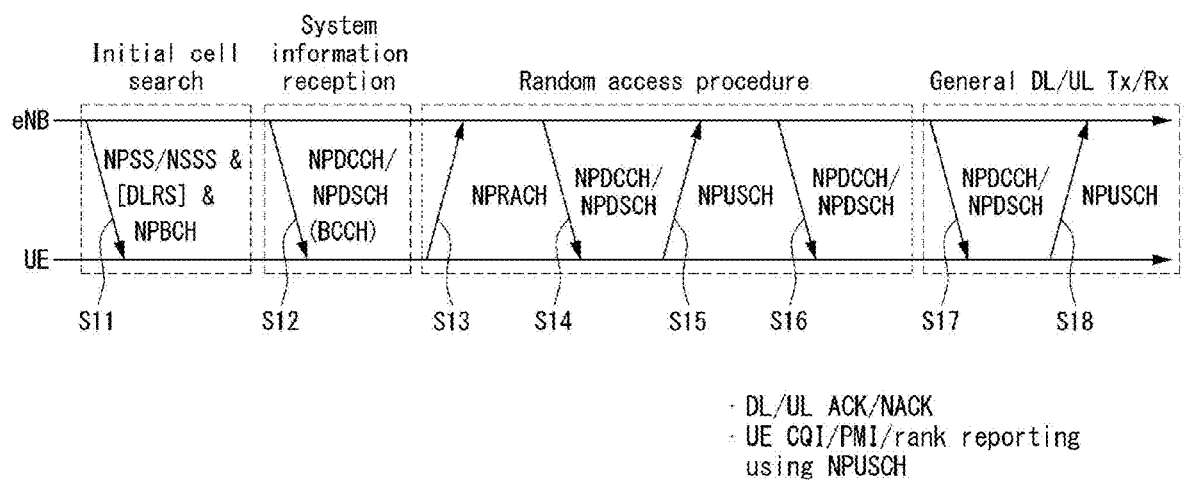

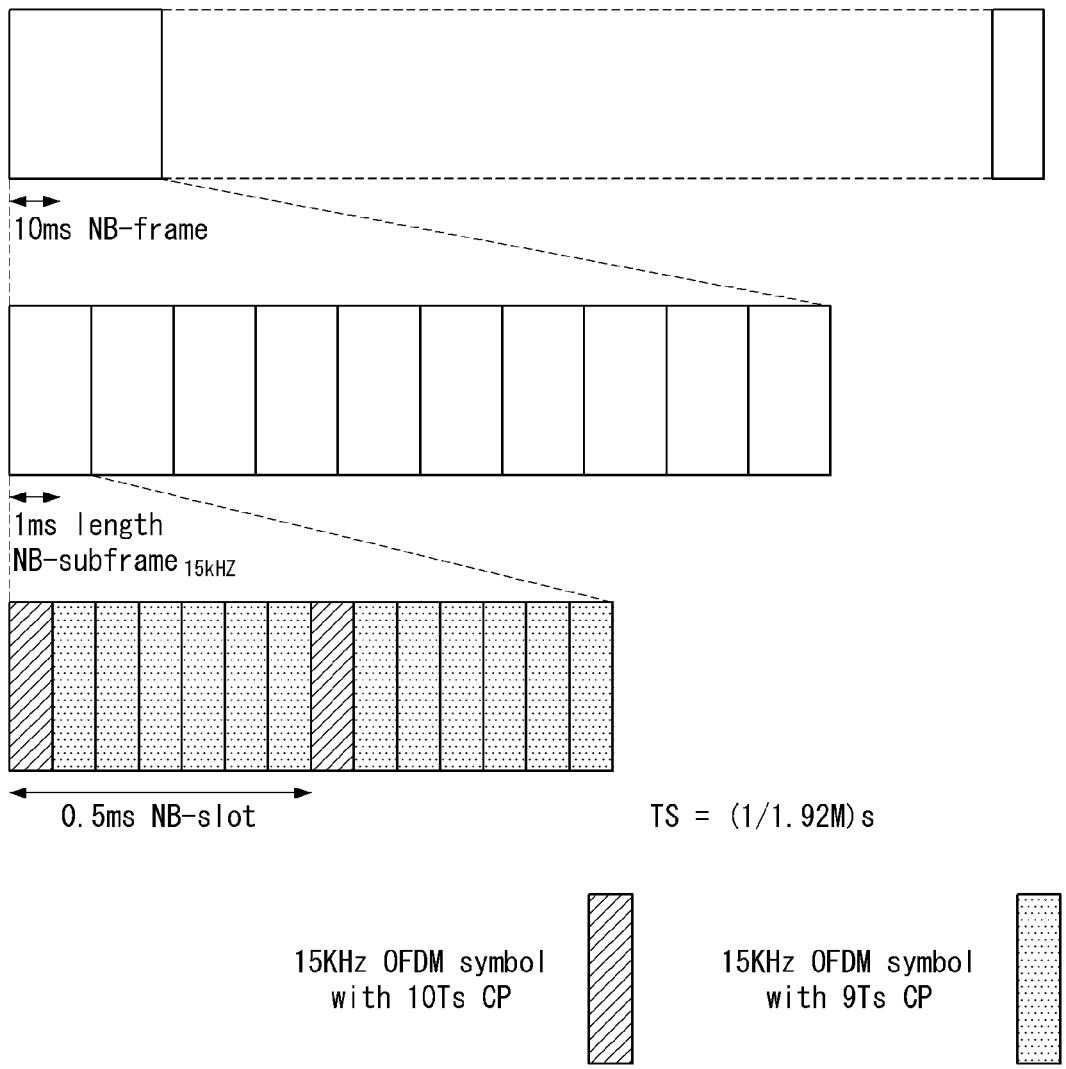
[FIG. 18]

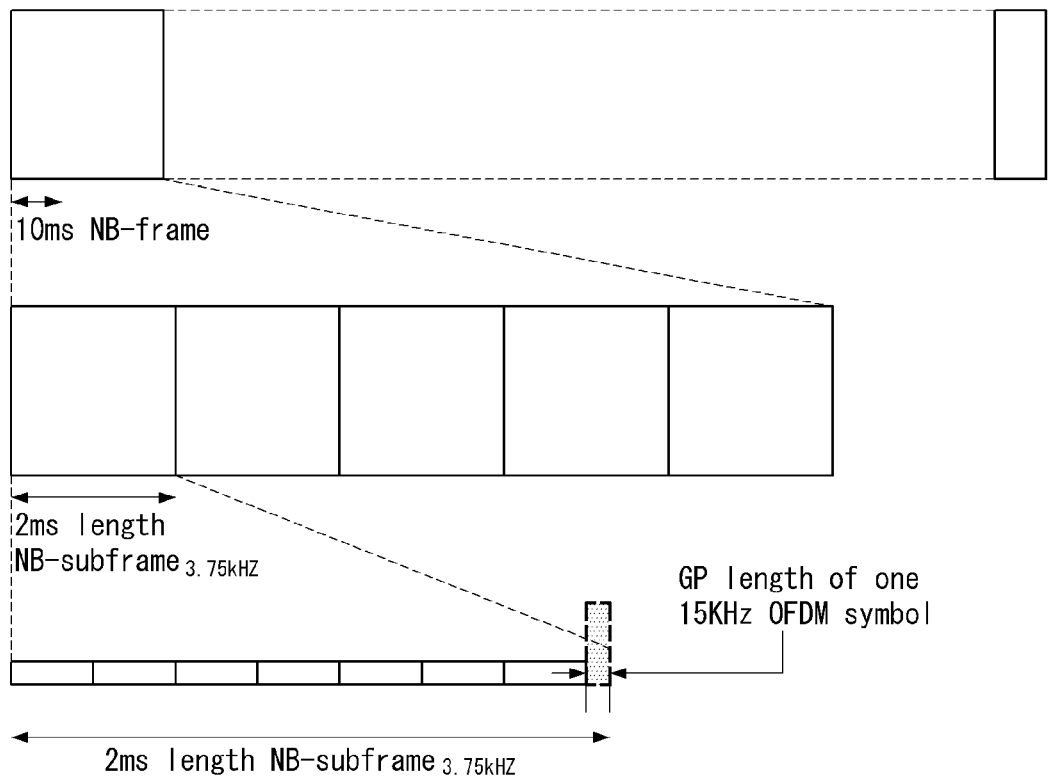
[FIG. 19]

【FIG. 20】
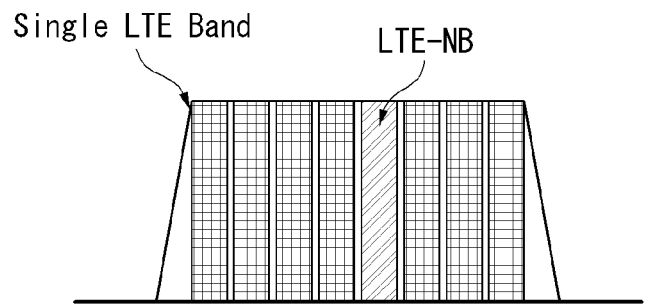
(a) In-band system
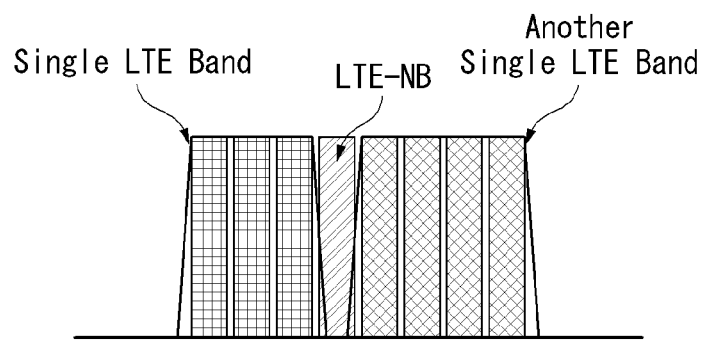
(b) Guard-band system
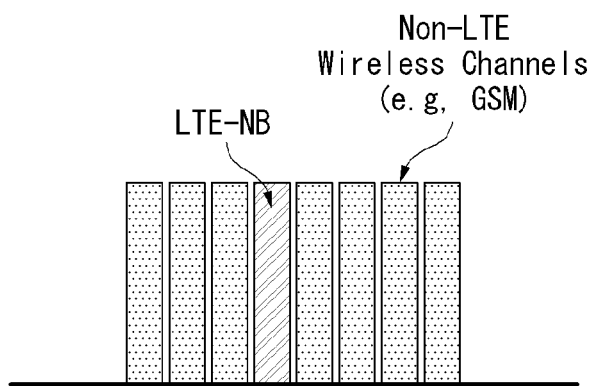
(c) Stand-alone system

[FIG. 21]
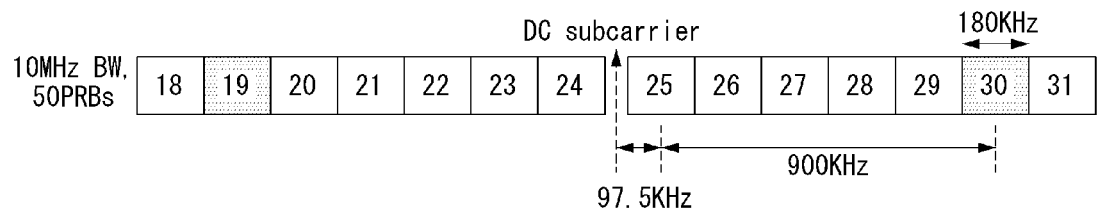
[FIG. 22]
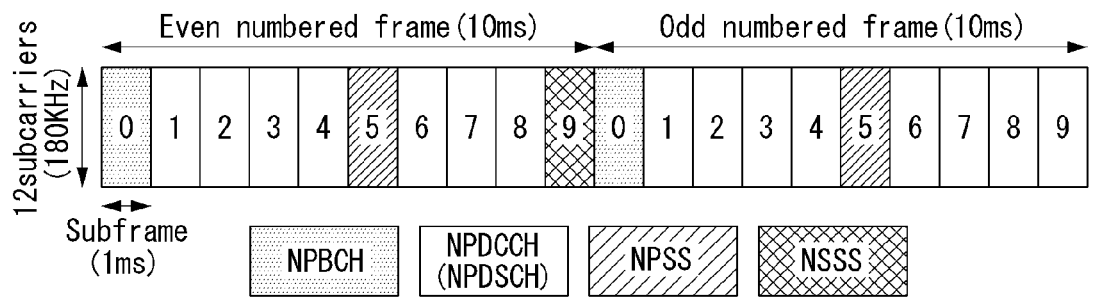
[FIG. 23]
| | 3.75KHz | 15KHz |
|---|---|---|
| NPUSCH format 1 | | |
| NPUSCH format 2 | | |

[FIG. 24]
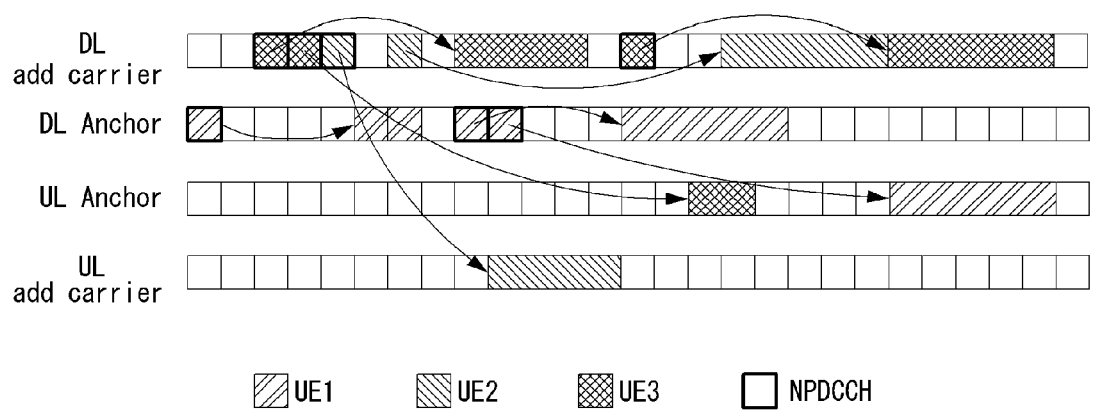

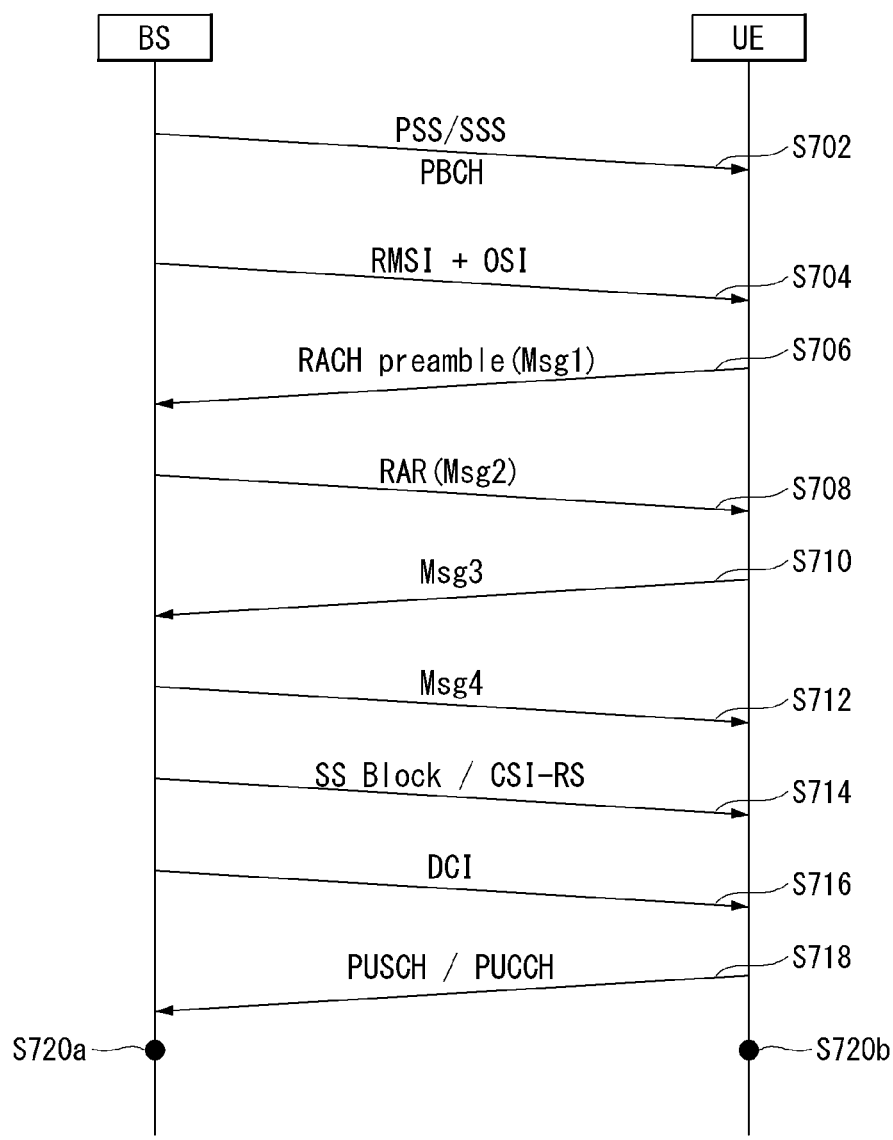

[FIG. 26]
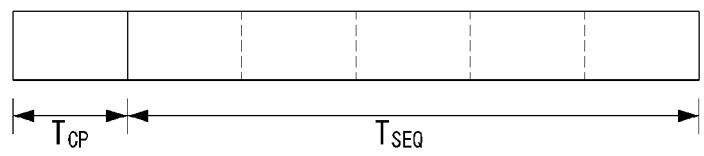
(a) Preamble symbol group
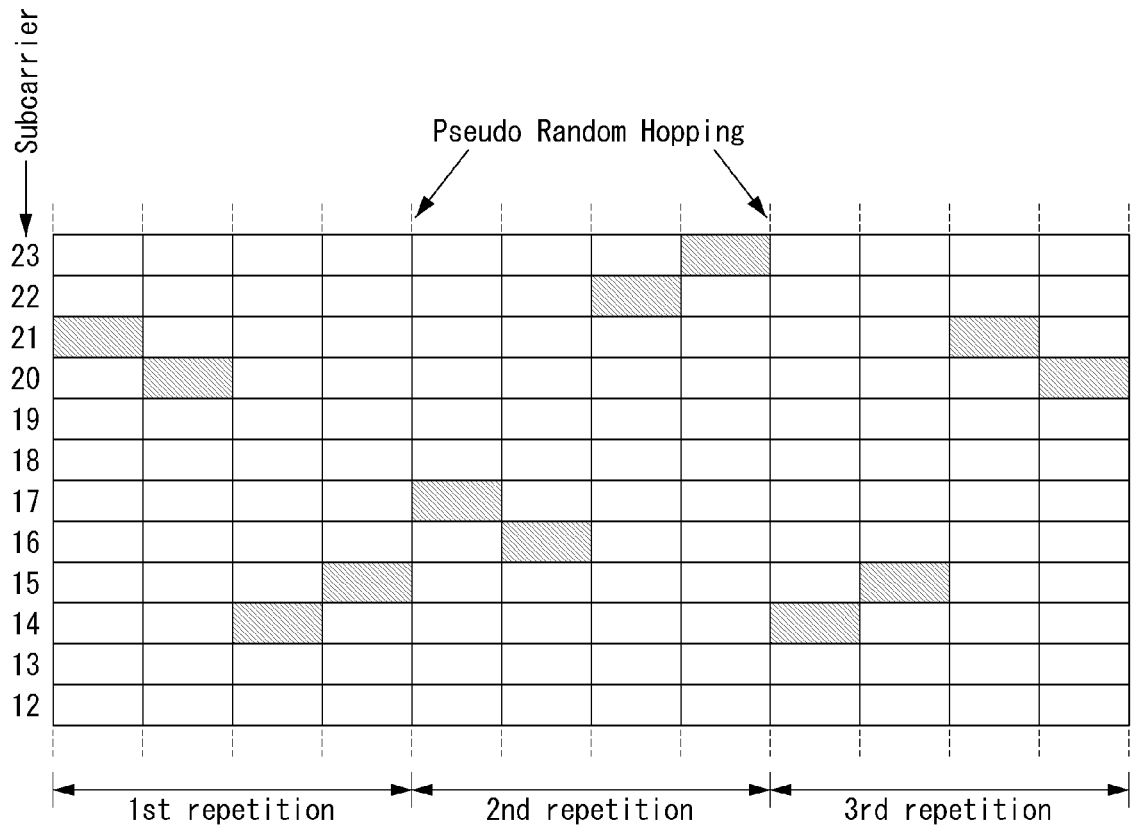
(b) Preamble transmission

[FIG. 27]
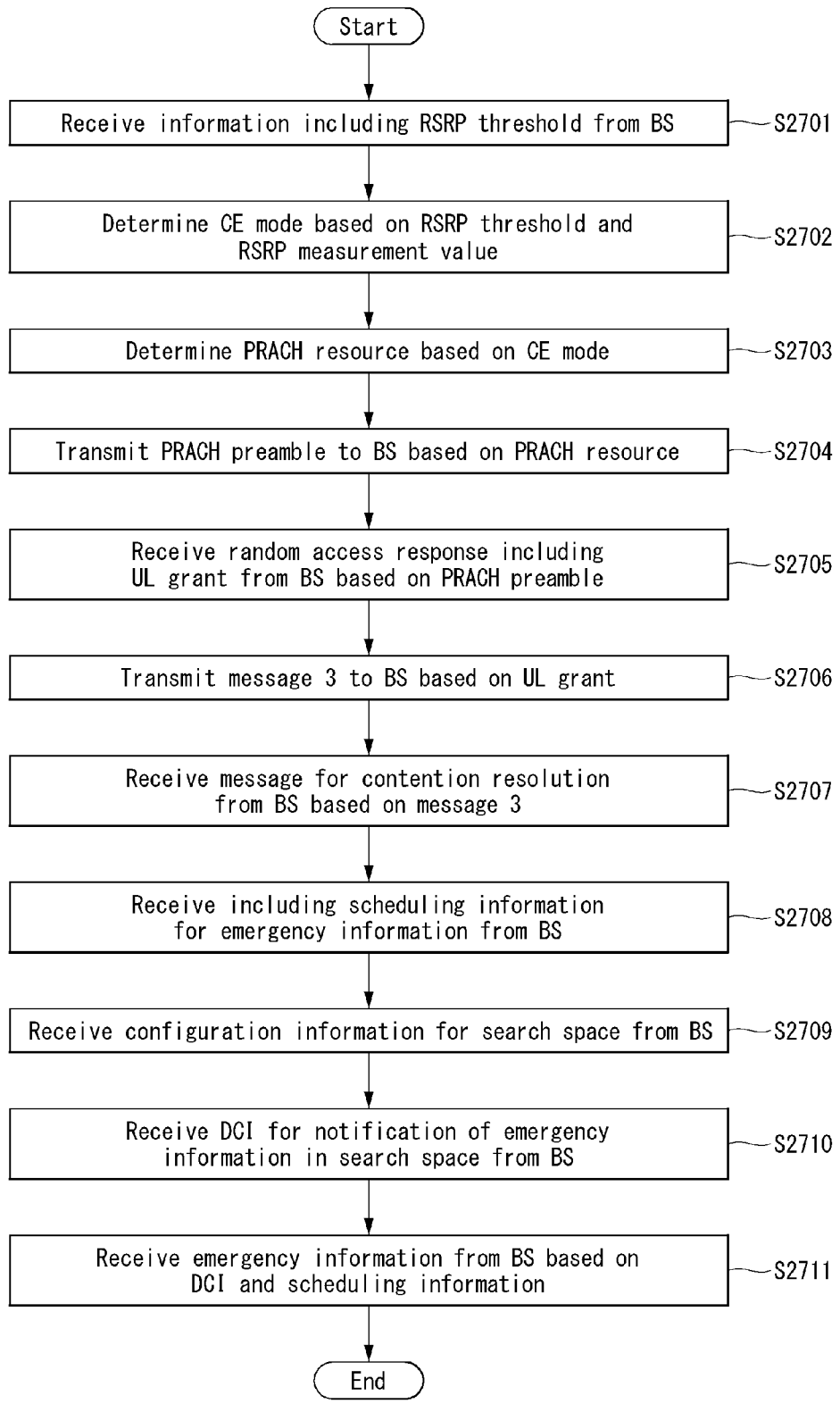

[FIG. 28]
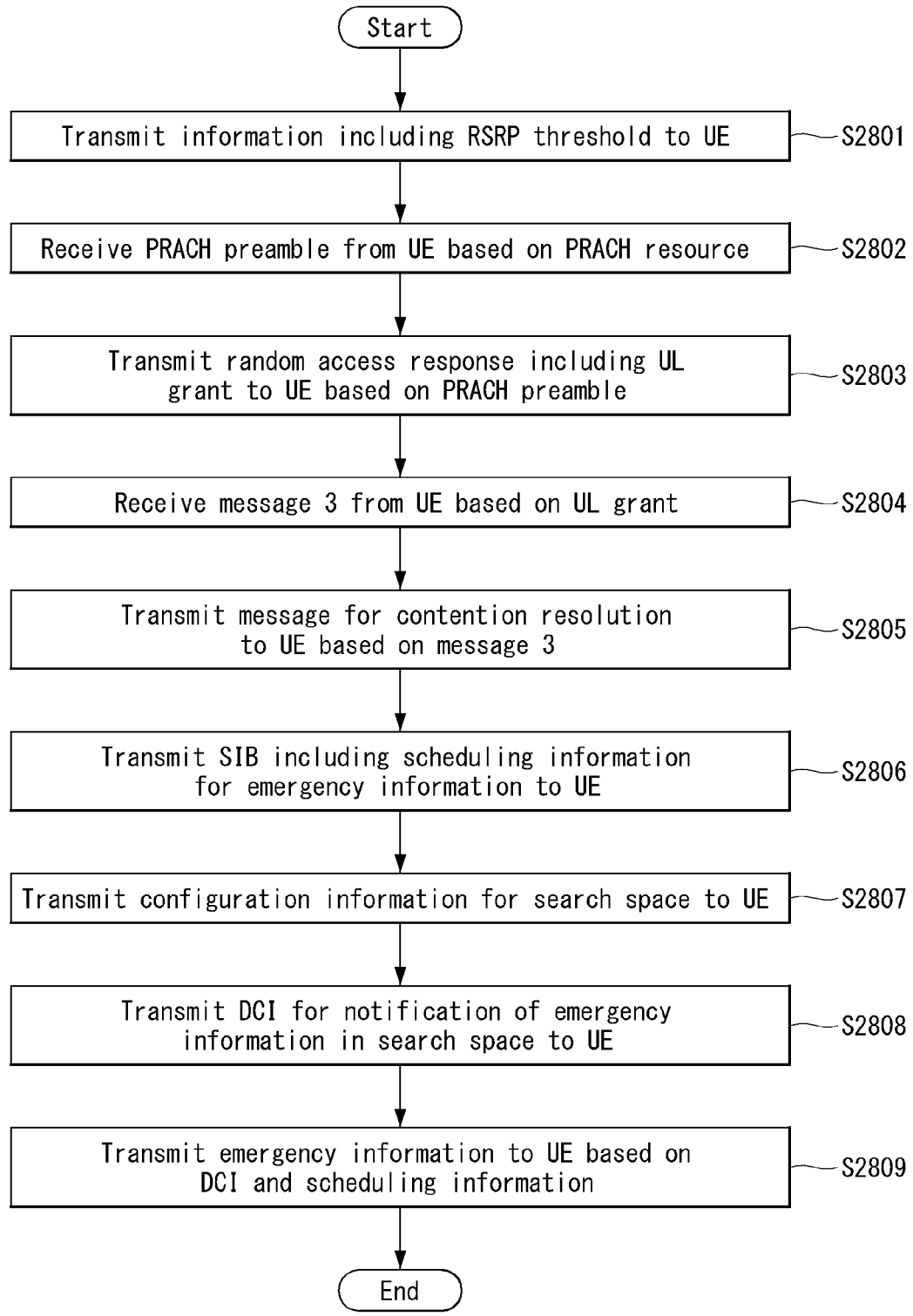

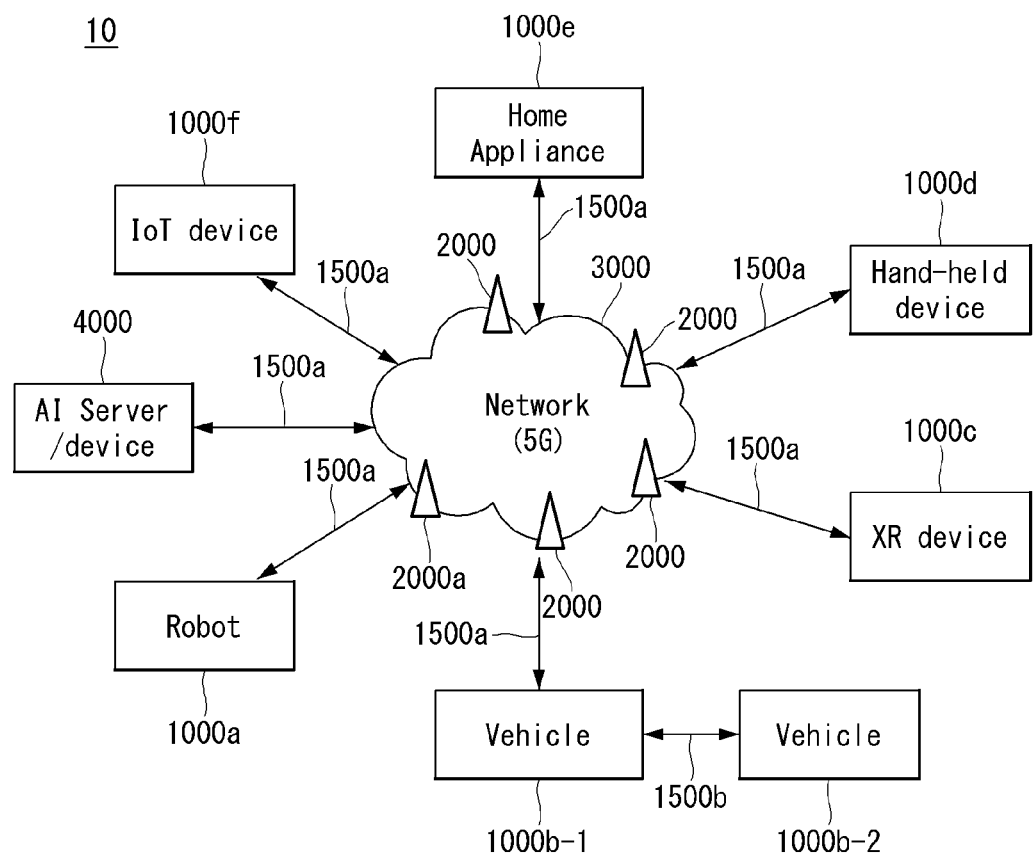
[FIG. 29]

[FIG. 30]
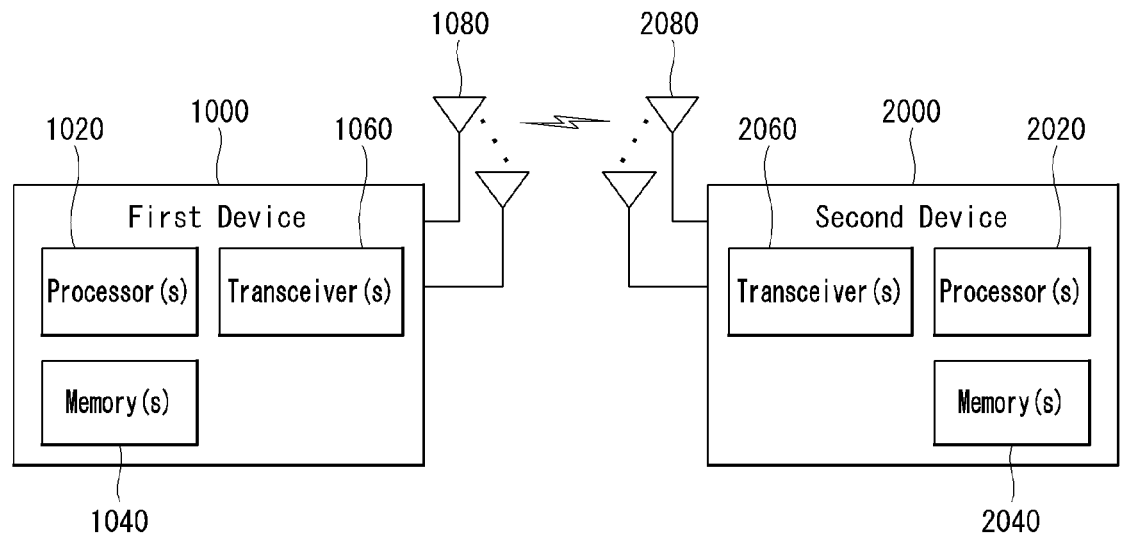
[FIG. 31]
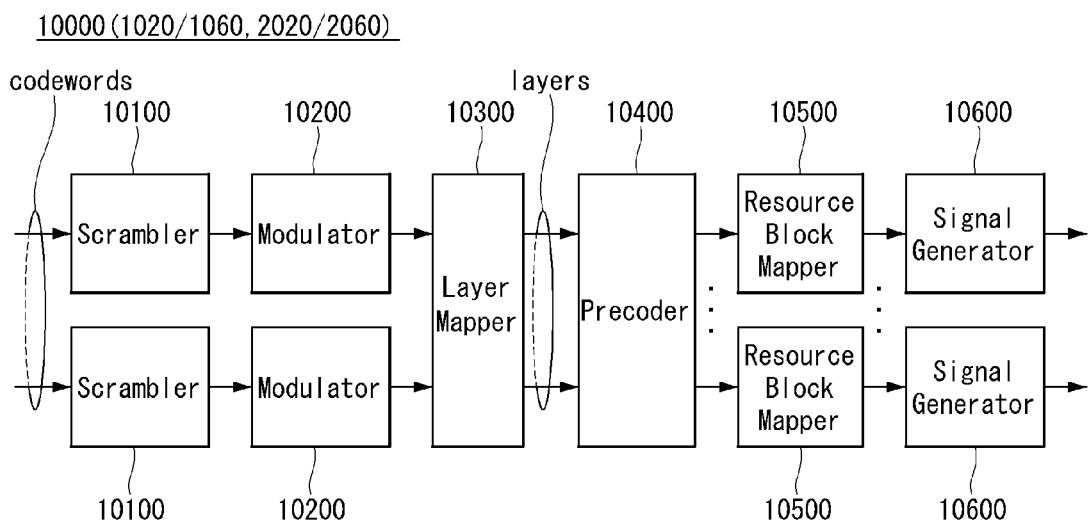

[FIG. 32]
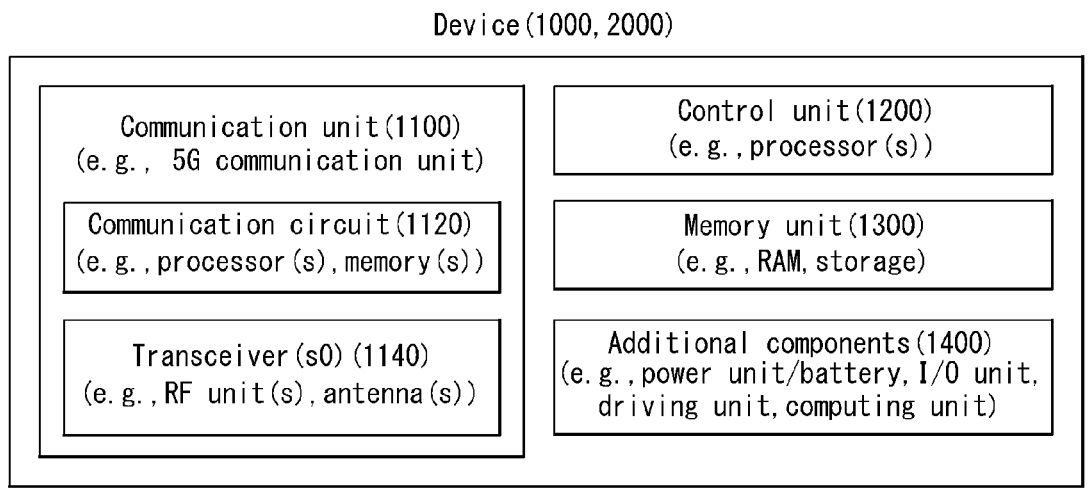
[FIG. 33]
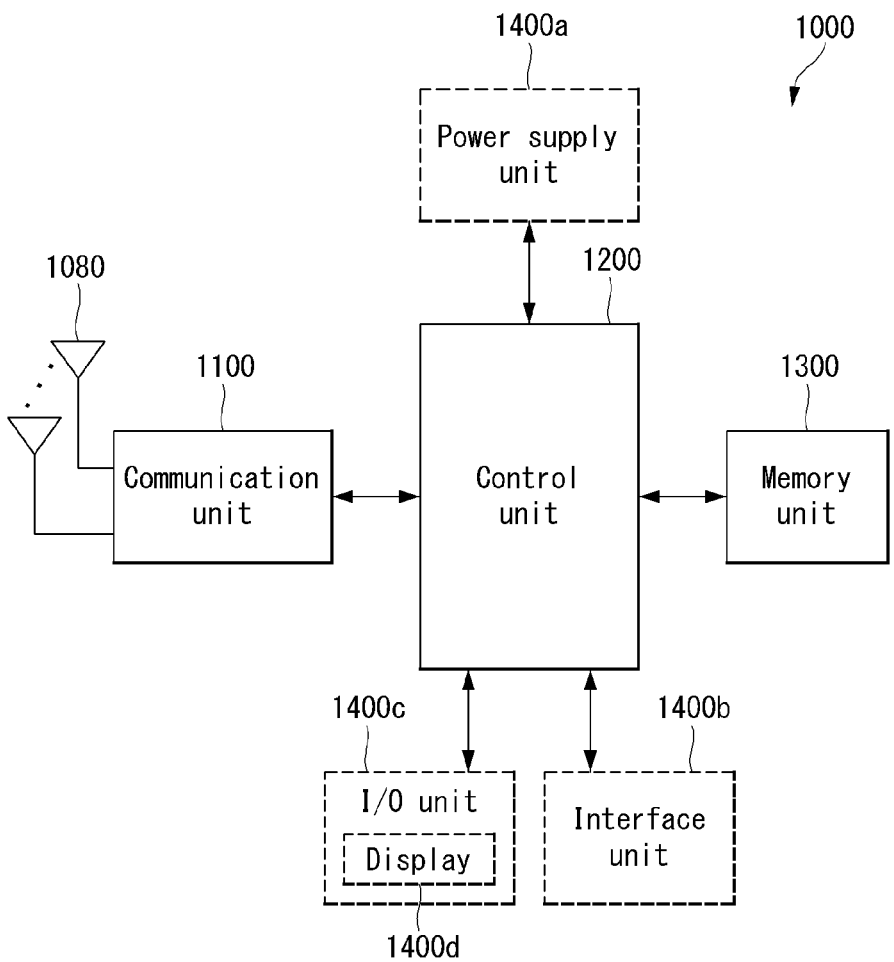

METHOD FOR TRANSMITTING AND RECEIVING URGENT INFORMATION IN WIRELESS COMMUNICATION SYSTEM SUPPORTING MACHINE TYPE COMMUNICATION, AND DEVICE FOR SAME

This application is the National Stage filing under 35 U.S.C. 371 of International Application No. PCT/KR2020/009699, filed on Jul. 23, 2020, which claims the benefit of and priority to U.S. Provisional Application No. 62/877,825, filed on Jul. 23, 2019 and Korean Application No. 10-2019-0142133, filed on Nov. 7, 2019, the contents of which are all hereby incorporated by reference herein in their entirety.

TECHNICAL FIELD

The present disclosure relates to a wireless communication system supporting machine type communication (MTC), and particularly, to a method for transmitting and receiving emergency information and an apparatus therefor.

BACKGROUND ART

In a wireless communication system, mobile communication systems have been developed to provide voice services while ensuring activity and mobility of users. However, coverage of mobile communication systems has been extended to include data services, as well as voice services, resulting in an explosive increase in traffic and shortage of resources. To meet the demands of users expecting relatively high speed services, an advanced mobile communication system is required.

Requirements of a next-generation mobile communication system include accommodation of increased amounts of data traffic, a significant increase in a transfer rate per user terminal, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

An embodiment of the present disclosure provides a method for allowing a user equipment (UE) which operates a coverage enhancement (CE) mode in an RRC connection state to efficiently receive emergency information and an apparatus therefor.

Furthermore, an embodiment of the present disclosure provides a method for allowing a format of Downlink Control Information (DCI) for notifying emergency information to have the same format as a DCI format (e.g., DCI format 6-1A and DCI format 6-1 B) for scheduling a Physical Downlink Control Channel (PDCCH) related to MTC, and an apparatus therefor.

Furthermore, an embodiment of the present disclosure provides a method for allowing DCI for notifying emergency information to have a size excluding information added by Radio Resource Control (RRC) configuration information in a DCI format for scheduling a PDCCH related to MTC.

Technical objects to be achieved in the disclosure are not limited to the above-described technical objects, and other technical objects not described above may be evidently understood by a person having ordinary skill in the art to which the disclosure pertains from the following description.

Technical Solution

The present disclosure proposes a method of receiving, by a user equipment, emergency information in a wireless communication system supporting Machine Type Communication (MTC). The method may include: receiving, from a base station (BS), information including a reference signal received power (RSRP) threshold; determining a coverage enhancement (CE) mode based on the RSRP threshold and an RSRP measurement value; determining a physical random access channel (PRACH) resource based on the CE mode; transmitting, to the BS, a PRACH preamble based on the PRACH resource; receiving, from the BS, a random access response including an uplink (UL) grant based on the PRACH preamble; transmitting, to the BS, message 3 based on the UL grant; receiving, from the BS, a message for contention resolution based on message 3; receiving, from the BS, a system information block (SIB) including scheduling information for the emergency information; receiving, from the BS, configuration information for a search space; receiving, from the BS, downlink control information (DCI) for notification of the emergency information in the search space; and receiving, from the BS, the emergency information based on the DCI and the scheduling information, in which a format of the DCI may be the same as a DCI format for scheduling a Physical Downlink Shared Channel (PDSCH) related to the MTC, and the DCI may have a size acquired by excluding information added by radio resource control (RRC) configuration information in the DCI format.

Further, in the method of the present disclosure, the DCI format may be DCI format 6-1A or DCI format 6-1 B.

Further, in the method of the present disclosure, the size of the DCI may be the same as that of the DCI of the DCI format 6-1A mapped to a common search space based on that the format of the DCI may be based on the DCI format 6-1A.

Further, in the method of the present disclosure, the UE may be a UE which operates in CE mode A based on that the DCI is the DCI format 6-1A, and the UE may be a UE which operates in CE mode B based on that the DCI is the DCI format 6-1 B.

Further, in the method of the present disclosure, the search space may be a type 0-MTC Physical Downlink Control Channel (MPDCCH) common search space.

Further, the method of the present disclosure may further include receiving, from the BS, a Master Information Block (MIB) including scheduling information for the SIB.

Further, in the method of the present disclosure, the DCI for notification of the emergency information may be CRC-scrambled by a System Information (SI)-Radio Network Temporary Identifier (RNTI).

Further, in the method of the present disclosure, the DCI for notification of the emergency information may be received through an MTC Physical Downlink Control Channel (PDCCH).

Further, in the method of the present disclosure, the UE may operate in an RRC connection state.

A user equipment (UE) receiving emergency information in a wireless communication system supporting Machine Type Communication (MTC) ma include: one or more transceivers; one or more processors; and one or more memories functionally connected to the one or more processors and storing instructions for performing operations, in which the operations may include receiving, from a BS, information including a reference signal received power (RSRP) threshold; determining a coverage enhancement (CE) mode based on the RSRP threshold and an RSRP measurement value; determining a physical random access channel (PRACH) resource based on the CE mode; transmitting, to the BS, a PRACH preamble based on the PRACH resource; receiving, from the BS, a random access response including an uplink (UL) grant based on the PRACH preamble; transmitting, to the BS, message 3 based on the UL grant; receiving, from the BS, a message for contention resolution based on message 3; receiving, from the BS, a system information block (SIB) including scheduling information for the emergency information; receiving, from the BS, configuration information for a search space; receiving, from the BS, downlink control information (DCI) for notification of the emergency information in the search space; and receiving, from the BS, the emergency information based on the DCI and the scheduling information, in which a format of the DCI may be the same as a DCI format for scheduling a Physical Downlink Shared Channel (PDSCH) related to the MTC, and the DCI may have a size acquired by excluding information added by radio resource control (RRC) configuration information in the DCI format.

Further, the present disclosure proposes a method of transmitting, by a base station, emergency information in a wireless communication system supporting Machine Type Communication (MTC). The method may include: transmitting, to a UE, information including a reference signal received power (RSRP) threshold, a coverage enhancement (CE) mode being determined based on the RSRP threshold and an RSRP measurement value, and a physical random access channel (PRACH) resource being determined based on the CE mode; receiving, from the UE, a PRACH preamble based on the PRACH resource; transmitting, to the UE, a random access response including an uplink (UL) grant based on the PRACH preamble; receiving, from the UE, message 3 based on the UL grant; transmitting, to the UE, a message for contention resolution based on message 3; transmitting, to the UE, a system information block (SIB) including scheduling information for the emergency information; transmitting, to the UE, configuration information for a search space; transmitting, to the UE, downlink control information (DCI) for notification of the emergency information in the search space; and transmitting, to the UE, the emergency information based on the DCI and the scheduling information, in which a format of the DCI may be the same as a DCI format for scheduling a Physical Downlink Shared Channel (PDSCH) related to the MTC, and the DCI may have a size acquired by excluding information added by radio resource control (RRC) configuration information in the DCI format.

Further, in the method of the present disclosure, the DCI format may be DCI format 6-1A or DCI format 6-1 B.

Further, in the method of the present disclosure, the size of the DCI may be the same as that of the DCI of the DCI format 6-1A mapped to a common search space based on that the format of the DCI may be based on the DCI format 6-1A.

Further, in the method of the present disclosure, the UE may be a UE which operates in CE mode A based on that the DCI is the DCI format 6-1A, and the UE may be a UE which operates in CE mode B based on that the DCI is the DCI format 6-1 B.

Further, in the method of the present disclosure, the search space may be a type 0-MTC Physical Downlink Control Channel (MPDCCH) common search space.

Further, the method of the present disclosure may further include transmitting, to the UE, a Master Information Block (MIB) including scheduling information for the SIB.

Further, in the method of the present disclosure, the DCI for notification of the emergency information may be CRC-scrambled by a System Information (SI)-Radio Network Temporary Identifier (RNTI).

Further, in the method of the present disclosure, the DCI for notification of the emergency information may be received through an MTC Physical Downlink Control Channel (PDCCH).

Further, in the method of the present disclosure, the UE may operate in an RRC connection state.

Further, a base station (BS) transmitting emergency information in a wireless communication system supporting Machine Type Communication (MTC) may include: one or more transceivers; one or more processors; and one or more memories functionally connected to the one or more processors and storing instructions for performing operations, in which the operations may include transmitting, to a UE, information including a reference signal received power (RSRP) threshold, a coverage enhancement (CE) mode being determined based on the RSRP threshold and an RSRP measurement value, and a physical random access channel (PRACH) resource being determined based on the CE mode; receiving, from the UE, a PRACH preamble based on the PRACH resource; transmitting, to the UE, a random access response including an uplink (UL) grant based on the PRACH preamble; receiving, from the UE, message 3 based on the UL grant; transmitting, to the UE, a message for contention resolution based on message 3; transmitting, to the UE, a system information block (SIB) including scheduling information for the emergency information; transmitting, to the UE, configuration information for a search space; transmitting, to the UE, downlink control information (DCI) for notification of the emergency information in the search space; and transmitting, to the UE, the emergency information based on the DCI and the scheduling information, in which a format of the DCI may be the same as a DCI format for scheduling a Physical Downlink Shared Channel (PDSCH) related to the MTC, and the DCI may have a size acquired by excluding information added by radio resource control (RRC) configuration information in the DCI format.

Further, an apparatus may include: one or more memories; and one or more processors functionally connected to the one or more memories, in which the one or more processors may be configured to control the apparatus to receive, from a BS, information including a reference signal received power (RSRP) threshold, determine a coverage enhancement (CE) mode based on the RSRP threshold and an RSRP measurement value, determine a physical random access channel (PRACH) resource based on the CE mode, transmit, to the BS, a PRACH preamble based on the PRACH resource, receive, from the BS, a random access response including an uplink (UL) grant based on the PRACH preamble, transmit, to the BS, message 3 based on the UL grant, receive, from the BS, a message for contention resolution based on message 3, receive, from a BS, a System Information Block (SIB) including scheduling information for emergency information, receive, from the BS, configuration information for a search space, receive, from the BS, Downlink Control Information (DCI) for notification of the emergency information in the search space, and receive, from the BS, the emergency information based on the DCI and the scheduling information, in which a format of the DCI is the same as a DCI format for scheduling a Physical Downlink Shared Channel (PDSCH) related to the MTC, and the DCI has a size acquired by excluding information added by radio resource control (RRC) configuration information in the DCI format.

Further, in a non-transitory computer readable medium (CRM) storing one or more instructions, one or more instructions executable by one or more processors may control a user equipment (UE) to receive, from a base station (BS), information including a reference signal received power (RSRP) threshold; determine a coverage enhancement (CE) mode based on the RSRP threshold and an RSRP measurement value; determine a physical random access channel (PRACH) resource based on the CE mode; transmit, to the BS, a PRACH preamble based on the PRACH resource; receive, from the BS; a random access response including an uplink (UL) grant based on the PRACH preamble; transmit, to the BS, message 3 based on the UL grant, receive, from the BS, a message for contention resolution based on message 3; receive, from a BS, a System Information Block (SIB) including scheduling information for emergency information; receive, from the BS, configuration information for a search space; receive, from the BS, Downlink Control Information (DCI) for notification of the emergency information in the search space; and receive, from the BS, the emergency information based on the DCI and the scheduling information, in which a format of the DCI may be the same as a DCI format for scheduling a Physical Downlink Shared Channel (PDSCH) related to the MTC, and the DCI may have a size acquired by excluding information added by radio resource control (RRC) configuration information in the DCI format.

Advantageous Effects

According to the present disclosure, there is an effect that a UE which operates a coverage enhancement (CE) mode in an RRC connection state efficiently receives emergency information.

Furthermore, according to the present disclosure, there is an effect that a format of Downlink Control Information (DCI) for notifying emergency information has the same format as a DCI format (e.g., DCI format 6-1A and DCI format 6-1 B) for scheduling a Physical Downlink Control Channel (PDCCH) related to MTC, thereby reducing a scheduling burden of a BS and increasing downlink transmission efficiency.

Furthermore, according to the present disclosure, there is an effect that DCI for notifying emergency information has a size excluding information added by Radio Resource Control (RRC) configuration information in a DCI format for scheduling a PDCCH related to MTC, thereby improving complexity and overhead of blind decoding.

Furthermore, according to the present disclosure, there is an effect that a low-latency and high-reliability wireless communication system can be implemented.

Effects which may be obtained in the disclosure are not limited to the above-described effects, and other technical effects not described above may be evidently understood by a person having ordinary skill in the art to which the disclosure pertains from the following description.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates physical channels and general signal transmission used in a 3GPP system.

FIG. 2 illustrates the structure of a radio frame in a wireless communication system to which the disclosure may be applied.

FIG. 3 illustrates a resource grid for one downlink slot in a wireless communication system to which the disclosure may be applied.

FIG. 4 illustrates the structure of a downlink subframe in a wireless communication system to which the disclosure may be applied.

FIG. 5 illustrates the structure of an uplink subframe in a wireless communication system to which the disclosure may be applied.

FIG. 6 illustrates an example of an overall structure of a NR system to which a method proposed in the disclosure may be applied.

FIG. 7 illustrates a relation between an uplink frame and a downlink frame in a wireless communication system to which a method proposed in the disclosure may be applied.

FIG. 8 illustrates an example of a frame structure in a NR system.

FIG. 9 illustrates an example of a resource grid supported in a wireless communication system to which a method proposed in the disclosure may be applied.

FIG. 10 illustrates examples of a resource grid per antenna port and numerology to which a method proposed in the disclosure may be applied.

FIG. 11 illustrates an example of a self-contained structure to which a method proposed in the disclosure may be applied.

FIG. 12 illustrates MTC.

FIG. 13 illustrates physical channels and general signal transmission used in MTC.

FIG. 14 illustrates cell coverage enhancement in MTC.

FIG. 15 illustrates a signal band for MTC.

FIG. 16 illustrates scheduling in legacy LTE and MTC.

FIG. 17 illustrates physical channels used in NB-IoT and general signal transmission using the physical channels.

FIG. 18 illustrates a frame structure when a subframe spacing is 15 kHz.

FIG. 19 illustrates a frame structure when a subframe spacing is 3.75 kHz.

FIG. 20 illustrates three operation modes of NB-IoT.

FIG. 21 illustrates a layout of an in-band anchor carrier at an LTE bandwidth of 10 MHz.

FIG. 22 illustrates transmission of an NB-IoT downlink physical channel/signal in an FDD LTE system.

FIG. 23 illustrates an NPUSCH format.

FIG. 24 illustrates an operation when multi-carriers are configured in FDD NB-IoT.

FIG. 25 illustrates an initial network access and a subsequent communication process.

FIG. 26 illustrates preamble transmission in NB-IoT RACH.

FIG. 27 is a flowchart for describing an operation method of a UE proposed in the present disclosure.

FIG. 28 is a flowchart for describing an operation method of a BS proposed in the present disclosure.

FIG. 29 illustrates a communication system 10 applied to the present disclosure.

FIG. 30 illustrates a wireless device which may be applied to the present disclosure.

FIG. 31 illustrates a signal processing circuit for a transmit signal.

FIG. 32 illustrates another example of a wireless device applied to the present disclosure.

FIG. 33 illustrates a portable device applied to the present disclosure.

MODE FOR INVENTION

Hereafter, preferred embodiments of the disclosure will be described in detail with reference to the accompanying drawings. A detailed description to be disclosed hereinafter together with the accompanying drawing is to describe embodiments of the disclosure and not to describe a unique embodiment for carrying out the disclosure. The detailed description below includes details in order to provide a complete understanding. However, those skilled in the art know that the disclosure can be carried out without the details.

In some cases, in order to prevent a concept of the disclosure from being ambiguous, known structures and devices may be omitted or may be illustrated in a block diagram format based on core function of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Embodiments of the present disclosure may be supported by standard documents disclosed in at least one of wireless access systems IEEE 802, 3GPP, and 3GPP2. That is, steps or portions of the embodiments of the present disclosure which are not described in order to clearly illustrate the technical spirit of the present disclosure may be supported by the documents. Further, all terms disclosed in the document may be described by the standard document.

For clarity of description, a 3GPP LTE/LTE-A/NR system is mainly described, but the technical features of the present disclosure are not limited thereto.

Physical Channel and General Signal Transmission

FIG. 1 illustrates physical channels and general signal transmission used in a 3GPP system. In the wireless communication system, the UE receives information from the BS through Downlink (DL) and the UE transmits information from the BS through Uplink (UL). The information which the BS and the UE transmit and receive includes data and various control information and there are various physical channels according to a type/use of the information which the BS and the UE transmit and receive.

When the UE is powered on or newly enters a cell, the UE performs an initial cell search operation such as synchronizing with the BS (S11). To this end, the UE may receive a Primary Synchronization Signal (PSS) and a (Secondary Synchronization Signal (SSS) from the BS and synchronize with the BS and acquire information such as a cell ID or the like. Thereafter, the UE may receive a Physical Broadcast Channel (PBCH) from the BS and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S12).

Meanwhile, when there is no radio resource first accessing the BS or for signal transmission, the UE may perform a Random Access Procedure (RACH) to the BS (S13 to S16). To this end, the UE may transmit a specific sequence to a preamble through a Physical Random Access Channel (PRACH) (S13 and S15) and receive a response message (Random Access Response (RAR) message) for the preamble through the PDCCH and a corresponding PDSCH. In the case of a contention based RACH, a Contention Resolution Procedure may be additionally performed (S16).

The UE that performs the above procedure may then perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the BS through the uplink or the UE receives from the BS may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Overview of LTE System

FIG. 2 illustrates the structure of a radio frame in a wireless communication system to which the disclosure may be applied.

A 3GPP LTE/LTE-A supports radio frame structure type 1 applicable to frequency division duplex (FDD) and radio frame structure type 2 applicable to time division duplex (TDD).

In FIG. 2, the size of the radio frame in the time domain is represented by a multiple of a time unit of $T\_s=1/(15000*2048)$. The downlink and uplink transmissions are configured by a radio frame having an interval of $T\_f=307200*T\_s=10$ ms.

FIG. 2(a) illustrates the structure of radio frame type 1. Radio frame type 1 may be applied to both full duplex and half duplex FDDs.

The radio frame is constituted by 10 subframes. One radio frame is constituted by 20 slots having a length of $T\_slot=15360*T\_s=0.5$ ms and indexes of 0 to 19 are granted to each slot. One subframe is constituted by two consecutive slots in the time domain and subframe i is constituted by slot 2i and slot 2i+1. A time required for transmitting one subframe is referred to as a transmission time interval (TTI). For example, a length of one subframe may be 1 ms and the length of one slot may be 0.5 ms.

In the FDD, the uplink transmission and the downlink transmission are classified in the frequency domain. There is no limit in the full duplex FDD, while in a half duplex FDD operation, the UE may not perform transmission and reception simultaneously.

One slot includes a plurality of orthogonal frequency division multiplexing (OFDM) symbols in the time domain and includes multiple resource blocks (RBs) in the frequency domain. Since the 3GPP LTE uses OFDMA in the downlink, the OFDM symbol is intended to represent one symbol period. The OFDM symbol may be referred to as one SC-FDMA symbol or symbol period. A resource block as a resource allocation unit includes a plurality of consecutive subcarriers in one slot.

The subframe may be defined as one or more slots as below according to a subcarrier spacing (SCS).

In the case of SCS=7.5 kHz or 15 kHz, subframe #i is defined as two 0.5 ms slots #2i and #2i+1 (i=0 to 9).

In the case of SCS=1.25 kHz, subframe #i is defined as one 1 ms slot #2i.

In the case of SCS=15 kHz, subframe #i may be defined as six subslots as shown in Table A1.

Table 1 shows a subslot configuration in the subframe (normal CP).

TABLE 1

| Subslot number | 0 | 1 | 2 | 3 | 4 | 5 |
|---|---|---|---|---|---|---|
| Slot number | | | 2i | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |

TABLE 1-continued

| Subslot number | 0 | 1 | 2 | 3 | 4 | 5 |
|---|---|---|---|---|---|---|
| Downlink subslot pattern 2 (Symbol number) | 0, 1 | 2, 3, 4 | 5, 6 | 0, 1 | 2, 3 | 4, 5, 6 |

FIG. 2(b) illustrates frame structure type 2.

Radio frame type 2 is constituted by two half frames each having a length of $153600*T\_s=5$ ms. Each half frame is constituted by 5 subframes having a length of $30720*T\_s=1$ ms.

In frame structure type 2 of the TOO system, an uplink-downlink configuration is a rule indicating whether the uplink and the downlink are assigned (or reserved) for all subframes.

Table 2 shows an uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, for each subframe of the radio frame, '0' denotes a subframe for the downlink transmission, 'U' denotes a subframe for the uplink transmission, '5' denotes a special subframe constituted by three fields, i.e., a downlink pilot time slot (DwPTS), a guard period (GP), and an uplink pilot time slot (UpPTS). The DwPTS is used for initial cell search, synchronization, or channel estimation in the UE. The UpPTS is used to match the channel estimation at the base station and uplink transmission synchronization of the UE. The GP is a period for eliminating interference caused in the uplink due to a multi-path delay of a downlink signal between the uplink and the downlink.

Each subframe i is constituted by slot 2i and slot 2i+1 each having a length of $T\_slot=15360*T\_s=0.5$ ms.

The uplink-downlink configuration may be divided into 7 types and locations and/or the numbers of downlink subframes, special subframes, and uplink subframes vary for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 3 shows a configuration (the length of DwPTS/GP/UpPTS) of the special subframe.

TABLE 3

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | UpPTS Extended cyclic prefix in uplink | DwPTS | UpPTS Normal cyclic prefix in uplink | UpPTS Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Here, X is configured by a higher layer (e.g., RRC) signal or given as 0.

The structure of the radio frame according to the example of FIG. 2 is merely an example and the number of subcarriers included in the radio frame or the number of slots included in the subframe, and the number of OFDM symbols included in the slot may be variously changed.

FIG. 3 is a diagram illustrating a resource grid for one downlink slot in the wireless communication system to which the disclosure may be applied.

Referring to FIG. 3, one downlink slot includes the plurality of OFDM symbols in the time domain. Herein, it is exemplarily described that one downlink slot includes 7 OFDM symbols and one resource block includes 12 subcarriers in the frequency domain, but the disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 4 illustrates the structure of a downlink subframe in the wireless communication system to which the disclosure may be applied.

Referring to FIG. 4, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a physical control format indicator channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

FIG. 5 illustrates the structure of an uplink subframe in the wireless communication system to which the disclosure may be applied.

Referring to FIG. 5, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

Overview of NR System

The following disclosure proposed by the disclosure can be applied to a 5G NR system (or device) as well as a LTE/LTE-A system (or device).

Communication of the 5G NR system is described below with reference to FIGS. 6 to 11.

The 5G NR system defines enhanced mobile broadband (eMBB), massive machine type communications (mMTC), ultra-reliable and low latency communications (URLLC), and vehicle-to-everything (V2X) based on usage scenario (e.g., service type).

A 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

Embodiments of the disclosure can be supported by standard documents disclosed in at least one of IEEE 802, 3GPP, and 3GPP2 which are the wireless access systems. That is, steps or parts in embodiments of the disclosure which are not described to clearly show the technical spirit of the disclosure can be supported by the standard documents. Further, all terms disclosed in the disclosure can be described by the standard document.

As smartphones and Internet of Things (IoT) terminals spread rapidly, an amount of information exchanged through a communication network is increasing. Hence, it is necessary to consider an environment (e.g., enhanced mobile broadband communication) that provides faster services to more users than the existing communication system (or existing radio access technology) in the next generation wireless access technology.

To this end, a design of a communication system considering machine type communication (MTC) that provides services by connecting multiple devices and objects is being discussed. In addition, a design of a communication system (e.g., ultra-reliable and low latency communication (URLLC) considering a service and/or a terminal sensitive to reliability and/or latency of communication is also being discussed.

Hereinafter, in the disclosure, for convenience of description, the next generation radio access technology is referred to as NR (new RAT, radio access technology), and a wireless communication system to which the NR is applied is referred to as an NR system.

Definition of NR System Related Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

FIG. 6 illustrates an example of an overall structure of a NR system to which a method proposed in the disclosure may be applied.

Referring to FIG. 6, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 4 below. Further, FR2 may mean a millimeter wave (mmW).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

New Rat (NR) Numerology and Frame Structure

The NR system may support multiple numerologies. Here, the numerology may be defined by a subcarrier spacing and cyclic prefix (CP) overhead. In this case, multiple subcarrier spacings may be derived by scaling a basic subcarrier spacing with an integer N (or μ). Further, even if it is assumed that a very low subcarrier spacing is not used at a very high carrier frequency, the used numerology may be selected independently of a frequency band.

In addition, in the NR systems, various frame structures depending on multiple numerologies may be supported.

Hereinafter, Orthogonal Frequency Division Multiplexing (OFDM) numerology and the frame structure which may be considered in the NR system will be described.

Multiple OFDM numerologies supported in the NR systems may be defined as shown in Table 5.

TABLE 5

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In respect to the frame structure in the NR system, sizes of various fields are expressed as a multiple of a time unit of $T_s = 1/(\Delta f_{max} \cdot N_f)$. Here, $\Delta f_{max} = 480 \cdot 10^3$ and $N_f = 4096$. Downlink and uplink transmission is configured by a radio frame having a section of $T_f = (\Delta f_{max} N_f / 100) \cdot T_s = 10$ ms. Here, the radio frame is constituted by 10 subframes each having a section of $T_{sf} = (\Delta f_{max} N_f / 1000) \cdot T_s = 1$ ms. In this case, one set of frames for uplink and one set frames for downlink may exist.

FIG. 7 illustrates a relationship between an uplink frame and a downlink frame in a wireless communication system to which a method proposed in the present disclosure may be applied.

As illustrated in FIG. 7, transmission of uplink frame number i from the UE should start before the start of the corresponding downlink frame in the corresponding UE by $T_{NA} = N_{TA} T_s$.

For numerology μ, slots are numbered in an increasing number of $n_s^\mu \in \{0, \ldots, N_{subframe}^{slots,\mu} - 1\}$ in the subframe and numbered in an increasing order of $n_{s,f}^\mu \in \{0, \ldots, N_{frame}^{slots,\mu} - 1\}$ in the radio frame. One slot is constituted by consecutive OFDM symbols of $N_{symb}^\mu$ and $N_{symb}^\mu$ is determined according to used numerology and slot configuration. The start of slot $n_s^\mu$ in the subframe is temporally aligned with the start of THE OFDM symbol $n_s^\mu N_{symb}^\mu$ in the same subframe.

All UEs may not simultaneously perform transmission and reception and this means that all OFDM symbols of a downlink slot or an uplink slot may not be used.

Table 6 shows the number of OFDM symbols for slot ($N_{symb}^{slot}$), the number of slots for each radio frame ($N_{slot}^{frame,\mu}$), and the number of slots for each subframe ($N_{slot}^{subframe,\mu}$) in the normal CP and Table 7 shows the number of OFDM symbols for each slot, the number of slots for each radio frame, and the number of slots for each subframe in the extended CP.

TABLE 6

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 7

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 8 illustrates an example of a frame structure in an NR system. FIG. 8 is just for convenience of the description and does not limit the scope of the present disclosure.

In the case of Table 7, as an example of a case where μ=2, that is, a case where the subcarrier spacing is 60 kHz, referring to Table 7, one subframe may include four slots, and one subframe={1, 2, 4} slots illustrated in FIG. 8 is an example and the number of slots which may included in one subframe may be defined as in Table 7.

Further, a mini-slot may be constituted by 2, 4, or 7 symbols and constituted by more or less symbols.

With respect to the physical resource in the NR system, an antenna port, a resource grid, a resource element, a resource block, a carrier part, and the like may be considered.

Hereinafter, the physical resources which may be considered in the NR system will be described in detail.

First, with respect to the antenna port, the antenna port is defined so that a channel in which the symbol on the antenna port is transported may be inferred from a channel in which different symbols on the same antenna port are transported. When a large-scale property of a channel in which a symbol on one antenna port is transported may be inferred from a channel in which symbols on different antenna ports are transported, two antenna ports may have a quasi co-located or quasi co-location (QC/QCL) relationship. Here, the large-scale property includes at least one of a delay spread, a Doppler spread, a frequency shift, average received power, and a received timing.

FIG. 9 illustrates an example of a resource grid supported by a wireless communication system to which a method proposed in the present disclosure may be applied.

Referring to FIG. 9, it is exemplarily described that the resource grid is constituted by $N_{RB}^{\mu}N_{sc}^{RB}$ subcarriers on the frequency domain and one subframe is constituted by 14·2 OFDM symbols, but the present disclosure is not limited thereto.

In the NR system, a transmitted signal is described by one or more resource grids constituted by $N_{RB}^{\mu}b_{sc}^{RB}$ subcarriers and $2^{\mu}N_{symb}^{(\mu)}$ OFDM symbols. Here, $N_{RB}^{\mu} \leq N_{RB}^{max,\mu}$. The $N_{RB}^{max,\mu}$ represents a maximum transmission bandwidth and this may also vary between uplink and downlink in addition to numerology.

In this case, as illustrated in FIG. 10, one resource grid may be configured for each numerology μ and antenna port p.

FIG. 10 illustrates examples of a resource grid for each antenna port and numerology to which a method proposed in the present disclosure may be applied.

Each element for resource grids for numerology μ and antenna port p is referred to as the resource element and is uniquely identified by index pair (k,l) Here, k=0, . . . , $N_{RB}^{\mu}N_{sc}^{RB}-1$ represents the index on the frequency domain and l=0, . . . , $2^{\mu}N_{symb}^{(\mu)}-1$ refers to the position of the symbol in the subframe. When the resource element is referred in the slot, index pair (k,l) is used. Here, l=0, . . . , $N_{symb}^{\mu}-1$.

Resource element (k,l) for numerology μ and antenna p corresponds to complex value $a_{k,l}^{(p,\mu)}$. When there is no confusion or when a specific antenna port or numerology is not specified, indexes p and μ may be dropped. As a result, the complex value may be $a_{k,l}^{(p)}$ or $a_{k,l}$.

Further the physical resource block is defined by $N_{sc}^{RB}=12$ consecutive subcarriers on the frequency domain.

Point A may serve as a common reference point of a resource block grid and may be acquired as follows.

OffsetToPointA for PCell downlink indicates the frequency offset between the lowest subcarrier of the lowest resource block superposed with the SS/PBCH block used by the UE for initial cell selection and point A, and is expressed by resource block units assuming a 15 kHz subcarrier spacing for FR1 and a 60 kHz subcarrier spacing for FR2; and absoluteFrequencyPointA indicates the frequency-position of point A expressed as in an absolute radio-frequency channel number (ARFCN).

Common resource blocks are numbered upwards from 0 in the frequency domain for subcarrier spacing configuration μ.

A center of subcarrier 0 of common resource block 0 for subcarrier spacing μ coincides with 'point A'. A resource element (k,l) for common resource block number $n_{CRB}^{\mu}$ and subcarrier spacing configuration u may be given as in Equation 1 below.

$$n_{CRB}^{\mu} = \left\lfloor \frac{k}{N_{sc}^{RB}} \right\rfloor \quad \text{[Equation 1]}$$

Here, k may be relatively defined to point A so that k=0 corresponds to a subcarrier centered on point A. Physical resource blocks are numbered from 0 to $N_{BWP,i}^{size}-1$ in a bandwidth part (BWP) and i represents the number of the BWP. A relationship between physical resource block $n_{PRB}$ and common resource block $n_{CRB}$ may be given by Equation 2 below.

$$n_{CRB} = n_{PRB} + N_{BWP,i}^{start} \quad \text{[Equation 2]}$$

Here, $N_{BWP,i}^{start}$ may represent a common resource block in which the BWP starts relatively to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

FIG. 11 illustrates one example of a self-contained structure to which a method proposed in the present disclosure may be applied. FIG. 11 is just for convenience of the description and does not limit the scope of the present disclosure.

Referring to FIG. 11, it is assumed that one transmission unit (e.g., slot or subframe) is constituted by 14 orthogonal frequency division multiplexing (OFDM) symbols as in legacy LTE.

In FIG. 11, a region 1102 refers to a downlink control region and a region 1104 refers to an uplink control region. Further, regions (that is, regions without a separate indication) other than the regions 1102 and 1104 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 11 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data transfer may be minimized.

In the self-contained slot structure illustrated in FIG. 11, a time gap for a process of switching from a transmission mode to a reception mode of a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Downlink Channel Structure

The BS transmits an associated signal to the UE through a downlink channel to be described below and the UE receives the associated signal from the BS through the downlink channel to be described below.

Physical Downlink Shared Channel (PDSCH)

The PDSCH transports downlink data (e.g., DL-shared channel transport block (DL-SCH TB)), and adopts modulation methods such as Quadrature Phase Shift Keying (QPSK), 16 Quadrature Amplitude Modulation (QAM), 64 QAM, and 256 QAM. A codeword is generated by encoding a TB. The PDSCH may transport a maximum of 2 code-words. Scrambling and modulation mapping are performed for each codeword and modulation symbols generated from each codeword are mapped to one or more layers (layer mapping). Each layer is mapped to a resource together with a demodulation reference signal (DMRS), generated as an OFDM symbol signal, and transmitted through a corresponding antenna port.

Physical Downlink Control Channel (PDCCH)

The PDCCH transports downlink control information (DCI) and a QPSK modulation method is applied. One PDCCH is constituted by 1, 2, 4, 8, and 16 Control Channel Elements (CCEs) according to an Aggregation Level (AL). One CCE is constituted by 6 Resource Element Groups (REGs). One REG is defined by one OFDM symbol and one (P)RB. The PDCCH is transmitted through a control resource set (CORESET). The CORESET is defined as a REG set with given numerology (e.g., SCS, CP length, etc.). A plurality of CORESETs for one UE may be overlapped in the time/frequency domain. The CORESET may be configured through system information (e.g., MIB) or UE-specific higher layer (e.g., Radio Resource Control or RRC layer) signaling. Specifically, the number of RBs and the number of symbols (maximum 3) constituting the CORESET may be configured by the higher layer signaling.

The UE performs decoding (so-called, blind decoding) for a set of PDCCH candidates to obtain the DCI transmitted through the PDCCH. The set of PDCCH candidates decoded by the UE is defined as a PDCCH search space set. The search space set may be a common search space or a UE-specific search space. The UE may obtain the DCI by monitoring PDCCH candidates in one or more search space sets configured by the MIB or higher layer signaling. Each CORESET configuration is associated with one or more search space sets and each search space set is associated with one CORESET configuration. One search space set is determined based on the following parameters.

- controlResourceSetId: represents a control resource set associated with the search space set
- monitoringSlotPeriodicityAndOffset: represents a PDCCH monitoring period section (slot unit) and an PDCCH monitoring section offset (slot unit)
- monitoringSymbolsWithinSlot: represents a PDCCH monitoring pattern in the slot for PDCCH monitoring (e.g., represents a first symbol(s) of a control resource set)
- nrofCandidates: represents the number of PDCCH candidates (one value of 0, 1, 2, 3, 4, 5, 6, and 8) for each AL={1, 2, 4, 8, 16}

Table 8 shows a feature for each search space type.

TABLE 8

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 8-continued

| Type | Search Space | RNTI | Use Case |
|---|---|---|---|
| | UE Specific | C-RNTI, or MCS-C-RNTI, or CS-RNTI(s) | User specific PDSCH decoding |

Table 9 shows DCI formats transmitted through the PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule TB-based (or TB-level) PUSCH, DCI format 0_1 may be used to schedule TB-based (or TB-level) PUSCH or Code Block Group (CBG)-based (or CBG-level) PUSCH. DCI format 1_0 may be used to schedule TB-based (or TB-level) PDSCH, DCI format 1_1 may be used to schedule TB-based (or TB-level) PDSCH or Code Block Group (CBG)-based (or CBG-level) PDSCH. DCI format 2_0 is used for transferring dynamic slot format information (e.g., dynamic SFI) to the UE and DCI format 2_1 is used for transferring downlink preemption information to the UE. DCI format 2_0 and/or DCI format 2_1 may be transferred to UEs in the corresponding group through group common PDCCH which is PDCCH transferred to UEs defined as one group.

Uplink Channel Structure

The UE transmits an associated signal to the BS through an uplink channel to be described below and the BS receives the associated signal from the UE through the uplink channel to be described below.

Physical Uplink Shared Channel (PUSCH)

The PUSCH transports uplink data (e.g., UL-shared channel transport block (UL-SCH TB) and/or uplink control information (UCI) and is transmitted based on a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. As an example, when the transform precoding is disable (e.g., transform precoding is disabled), the UE transmits the PUSCH based on the CP-OFDM waveform, and when the transform precoding is enabled (e.g., transform precoding is enabled), the UE may transmit the PUSCH based on the CP-OFDM waveform or the DFT-s-OFDM waveform. PUSCH transmission is dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed based on a codebook or a non-codebook.

Physical Uplink Control Channel (PUCCH)

The PUCCH transports uplink control information, HARQ-ACK, and/or scheduling request (SR), and is divided into Short PUCCH and Long PUCCH according to a PUCCH transmission length. Table 10 shows PUCCH formats.

TABLE 10

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 transports the UCI with a maximum size of 2 bits and is mapped and transmitted based on a sequence. Specifically, the UE transmits specific UCI to the BS by transmitting one of a plurality of sequences through the PUCCH which is PUCCH format 0. The UE transmits the PUCCH which is PUCCH format 0 within a PUCCH resource for corresponding SR configuration only when transmitting a positive SR.

PUCCH format 1 transports the UCI having the maximum size of 2 bits and the modulation signal is spread by an orthogonal cover code (OCC) (configured differently depending on whether or not frequency hopping) in the time domain. The DMRS is transmitted in a symbol in which the modulation symbol is not transmitted (that is, time division multiplexed (TDMed) and transmitted).

PUCCH format 2 transports UCI having a bit size larger than 2 bits and the modulation symbol is frequency division multiplexed (FDMed) with the DMRS and transmitted. The DMRS is located in symbol indexes #1, #4, #7, and #10 within a resource block given with a density of 1/3. A pseudo noise (PN) sequence is used for a DMRS sequence. The frequency hopping may be activated for 2 symbol PUCCH format 2.

PUCCH format 3 does not support multiplexing of UEs in the same physical resource block, and transports UCI with a bit size larger than 2 bits. In other words the PUCCH resource of PUCCH format 3 includes the orthogonal cover code. The modulation symbol is subjected to time division multiplexing (TDM) with the DMRS and transmitted.

PUCCH format 4 supports multiplexing of up to 4 terminals in the same physical resource block, and transports UCI with a bit size larger than 2 bits. In other words the PUCCH resource of PUCCH format 3 includes an orthogonal cover code. The modulation symbol is subjected to time division multiplexing (TDM) with the DMRS and transmitted.

Machine Type Communication (MTC)

MTC as a type of data communication including one or more machines and may be applied to Machine-to-Machine (M2M) or Internet-of-Things (IoT). Here, the machine is an entity that does not require direct human manipulation or intervention. For example, the machine includes a smart meter with a mobile communication module, a vending machine, a portable terminal having an MTC function, etc.

In 3GPP, the MTC may be applied from release 10 and may be implemented to satisfy criteria of low cost and low complexity, enhanced coverage, and low power consumption. For example, a feature for a low-cost MTC device is added to 3GPP Release 12 and to this end, UE category 0 is defined. UE category is an index indicating how many data the UE may process in a communication modem. The UE of UE category 0 uses a half-duplex operation having a reduced peak data rate and relieved radio frequency (RF) requirements, and a single receiving antenna to reduce baseband/RF complexity. In 3GPP Release 12, enhanced MTC (eMTC) is introduced and the MTC terminal is configured to operate only at 1.08 MHz (i.e., 6 RBs) which is a minimum frequency bandwidth supported in legacy LTE to further reduce a price and power consumption of the MTC UE.

In the following description, the MTC may be mixedly used with terms such as eMTC, LTE-M1/M2, Bandwidth reduced low complexity/coverage enhanced (BL/CE), non-BL UE (in enhanced coverage), NR MTC, enhanced BL/CE, etc., or other equivalent terms. Further, the MT CUE/device encompasses a UE/device (e.g., the smart meter, the vending machine, or the portable terminal with the MTC function) having the MTC function.

FIG. 12 illustrates MTC.

Referring to FIG. 12, the MTC device 100 as a wireless device providing the MTC may be fixed or mobile. For example, the MTC device 100 includes the smart meter with the mobile communication module, the vending machine, the portable terminal having the MTC function, etc. The BS 200 may be connected to the MTC device 100 by using radio access technology and connected to the MTC server 700 through a wired network. The MTC server 700 is connected to the MTC devices 100 and provides an MTC service to the MTC devices 100. The service provided through the MTC has discrimination from a service in communication in which human intervenes in the related art and various categories of services including tracking, metering, payment, a medical field service, remote control, and the like may be provided. For example, services including electric meter reading, water level measurement, utilization of a monitoring camera, reporting of an inventory of the vending machine, and the like may be provided through the MTC. The MTC has a characteristic in that a transmission data amount is small and uplink/downlink data transmission/reception occurs occasionally. Accordingly, it is efficient to lower a unit price of the MTC device and reduce battery consumption according to a low data rate. The MTC device generally has low mobility, and as a result, the MTC has a characteristic in that a channel environment is hardly changed.

FIG. 13 illustrates physical channels used in MTC and general signal transmission using the same. In a wireless communication system, the MTC UE receives information from the BS through Downlink (DL) and the UE transmits information to the BS through Uplink (UL). The information which the BS and the UE transmit and receive includes data and various control information and there are various physical channels according to a type/use of the information which the BS and the UE transmit and receive.

A UE that is powered on again while being powered off or enters a new cell performs an initial cell search operation such as synchronizing with the BS (S1001). To this end, the UE receives a Primary Synchronization Signal (PSS) and a Secondary Synchronization Signal (SSS) from the BS to synchronize with the BS and obtain information such as a cell identifier (ID), etc. The PSS/SSS used for the initial cell search operation of the UE may be a PSS/SSS of the legacy LTE. Thereafter, the MTC UE may receive a Physical Broadcast Channel (PBCH) from the BS and obtain in-cell broadcast information (S1002). Meanwhile, the UE receives a Downlink Reference Signal (DL RS) in an initial cell search step to check a downlink channel state.

Upon completion of the initial cell search, the UE receives MTC PDCCH (MPDCCH) and PDSCH corresponding thereto to obtain more specific system information (S1102).

Thereafter, the UE may perform a random access procedure in order to complete an access to the BS (S1003 to S1006). Specifically, the UE may transmit a preamble through a Physical Random Access Channel (PRACH) (S1003) and receive a Random Access Response (RAR) for the preamble through the PDCCH and the PDSCH corresponding thereto (S1004). Thereafter, the UE may transmit a Physical Uplink Shared Channel (PUSCH) by using scheduling information in the RAR (S1005) and perform a Contention Resolution Procedure such as the PDCCH and the PDSCH corresponding thereto (S1006).

The UE that performs the aforementioned procedure may then perform reception of an MPDCCH signal and/or a PDSCH signal (S1107) and transmission of a physical uplink shared channel (PUSCH) signal and/or a physical uplink control channel (PUCCH) signal (S5080) as a general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indication (CQI), a Precoding Matrix Indicator (PMI), Rank Indicator (RI), etc.

FIG. 14 illustrates cell coverage enhancement in MTC.

Various cell coverage extension techniques are being discussed in order to extend coverage extension or coverage enhancement (CE) of the BS for the MTC device 100. For example, for the extension of the cell coverage, the BS/UE may transmit one physical channel/signal over multiple occasions (a bundle of physical channels). Within a bundle section, the physical channel/signal may be repeatedly transmitted according to a pre-defined rule. A receiving apparatus may increase a decoding success rate of the physical channel/signal by decoding a part or the entirety of the physical channel/signal bundle. Here, the occasion may mean a resource (e.g., time/frequency) in which the physical channel/signal may be transmitted/received. The occasion for the physical channel/signal may include a subframe, a slot, or a symbol set in a time domain. Here, the symbol set may be constituted by one or more consecutive OFDM-based symbols. The OFDM-based symbols may include an OFDM(A) symbol and a DFT-s-OFDM(A) (=SC-FDM(A)) symbol. The occasion for the physical channel/signal may include a frequency band and an RB set in a frequency domain. For example, PBCH, PRACH, MPDCCH, PDSCH, PUCCH, and PUSCH may be repeatedly transmitted.

FIG. 15 illustrates a signal band for MTC.

Referring to FIG. 15, as a method for lowering the unit price of the MT CUE, the MTC may operate only in a specific band (or channel band) (hereinafter, referred to as an MTC subband or narrowband (NB)) regardless of a system bandwidth of a cell. For example, an uplink/downlink operation of the MT CUE may be performed only in a frequency band of 1.08 MHz. 1.08 MHz corresponds to 6 consecutive physical resource blocks (PRBs) in the LTE system is defined to follow the same cell search and random access procedures as the LTE UE. FIG. 15(a) illustrates a case where an MTC subband is configured at a center (e.g., 6 PRBs) of the cell and FIG. 15(b) illustrates a case where a plurality of MTC subbands is configured in the cell. The plurality of MTC subbands may be consecutively/inconsecutively configured in the frequency domain. The physical channels/signals for the MTC may be transmitted/received in one MTC subband. In the NR system, the MTC subband may be defined by considering a frequency range and a subcarrier spacing (SCS). As an example, in the NR system, a size of the MTC subband may be defined as X consecutive PRBs (i.e., a bandwidth of 0.18*X*(2 μ) MHz) (see Table A4 for u). Here, X may be defined as 20 according to the size of a Synchronization Signal/Physical Broadcast Channel (SS/PBCH). In the NR system, the MTC may operate in at least one bandwidth part (BWP). In this case, the plurality of MTC subbands may be configured in the BWP.

FIG. 16 illustrates scheduling in legacy LTE and MTC.

Referring to FIG. 16, in the legacy LTE, the PDSCH is scheduled by using the PDCCH. Specifically, the PDCCH may be transmitted in first N OFDM symbols in the subframe (N=1 to 3) and the PDSCH scheduled by the PDCCH is transmitted in the same subframe. Meanwhile, in the MTC, the PDSCH is scheduled by using the MPDCCH. As a result, the MT CUE may monitor an MPDCCH candidate in a search space in the subframe. Here, monitoring includes blind-decoding the MPDCCH candidates. The MPDCCH transmits the DCI and the DCI includes uplink or downlink scheduling information. The MPDCCH is FDM-multiplexed with the PDSCH in the subframe. The MPDCCH is repeatedly transmitted in a maximum of 256 subframes and the DCI transmitted by the MPDCCH includes information on the number of MPDCCH repetitions. In the case of downlink scheduling, when repeated transmission of the MPDCCH ends in subframe #N, the PDSCH scheduled by the MPDCCH starts to be transmitted in subframe #N+2. The PDSCH may be repeatedly transmitted in a maximum of 2048 subframes. The MPDCCH and the PDSCH may be transmitted in different MTC subbands. As a result, the MT CUE may perform radio frequency (RF) retuning for receiving the PDSCH after receiving the MPDCCH. In the case of uplink scheduling, when repeated transmission of the MPDCCH ends in subframe #N, the PUSCH scheduled by the MPDCCH starts to be transmitted in subframe #N+4. When the repeated transmission is applied to the physical channel, frequency hopping is supported between different MTC subbands by the RF retuning. For example, when the PDSCH is repeatedly transmitted in 32 subframes, the PDSCH may be transmitted in a first MTC subband in first 16 subframes and the PDSCH may be transmitted in a second MTC subband in 16 remaining subframes. The MTC operates in a half duplex mode. HARQ retransmission of the MTC is an adaptive asynchronous scheme.

Narrowband Internet of Things (NB-IoT)

NB-IoT represents a narrow-band Internet of Things technology that supports a low-power wide area network through a legacy wireless communication system (e.g., LTE, NR). In addition, the NB-IoT may refer to a system for supporting low complexity and low power consumption through a narrowband. The NB-IoT system uses OFDM parameters such as subcarrier spacing (SCS) in the same manner as the legacy system, so that there is no need to separately allocate an additional band for the NB-IoT system. For example, one PRB of the legacy system band may be allocated for the NB-IoT. Since the NB-IoT UE recognizes a single PRB as each carrier, the PRB and the carrier may be interpreted as the same meaning in the description of the NB-IoT.

Hereinafter, the description of the NB-IoT mainly focuses on a case where the description of the NB-IoT is applied to the legacy LTE system, but the description below may be extensively applied even to a next generation system (e.g., NR system, etc.). Further, in the present disclosure, contents related to the NB-IoT may be extensively applied to MTC which aims for similar technical purposes (e.g., low-power, low-cost, coverage enhancement, etc.). Further, the NB-IoT may be replaced with other equivalent terms such as NB-LTE, NB-IoT enhancement, enhanced NB-IoT, further enhanced NB-IoT, NB-NR, and the like.

FIG. 17 illustrates physical channels used in NB-IoT and general signal transmission using the same. In the wireless communication system, the UE receives information from the BS through Downlink (DL) and the UE transmits information from the BS through Uplink (UL). The information which the BS and the UE transmit and receive includes data and various control information and there are various physical channels according to a type/use of the information which the BS and the UE transmit and receive.

A UE that is powered on again while being powered off or enters a new cell performs an initial cell search operation such as synchronizing with the BS (S11). To this end, the UE receives a Narrowband Primary Synchronization Signal (NPSS) and a Narrowband Secondary Synchronization Signal (NSSS) from the BS to synchronize with the BS and obtain information such as a cell identifier (ID), etc. Thereafter, the UE receives a Narrowband Physical Broadcast Channel (NPBCH) from the BS to obtain in-cell broadcast information (S12). Meanwhile, the UE receives a Downlink Reference Signal (DL RS) in an initial cell search step to check a downlink channel state.

Upon completion of the initial cell search, the UE receives Narrowband PDCCH (NPDCCH) and Narrowband PDSCH (NPDSCH) corresponding thereto to obtain more specific system information in step S12 (S12).

Thereafter, the UE may perform a random access procedure in order to complete an access to the BS (S13 to S16). Specifically, the UE may transmit a preamble through a Narrowband Physical Random Access Channel (NPRACH) (S13) and receive the Random Access Response (RAR) for the preamble through the NPDCCH and the NPDSCH corresponding thereto (S14). Thereafter, the UE may transmit a Narrowband Physical Uplink Shared Channel (NPUSCH) by using scheduling information in the RAR (S15) and perform a Contention Resolution Procedure such as the NPDCCH and the NPDSCH corresponding thereto (S16).

The UE that performs the aforementioned procedure may then perform reception of the NPDCCH signal and/or NPDSCH signal (S17) and NPUSCH transmission (S18) as the general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indication (CQI), a Precoding Matrix Indicator (PMI), Rank Indicator (RI), etc. In the NB-IoT, the UCI is transmitted through the NPUSCH. According to the request/instruction of the network (e.g., BS), the UE may transmit the UCI through the NPUSCH periodically, aperiodically, or semi-persistently.

An NB-IoT frame structure may be configured differently according to the subcarrier spacing (SCS). FIG. 18 illustrates a frame structure when a subframe spacing is 15 kHz and FIG. 18 illustrates a frame structure when a subframe spacing is 3.75 kHz. The frame structure of FIG. 18 may be used in downlink/uplink and the frame structure of FIG. 19 may be used only in uplink.

Referring to FIG. 18 the NB-IoT frame structure for the subcarrier spacing of 15 kHz may be configured to be the same as the frame structure of the legacy system (i.e., LTE system) (see FIG. 2). That is, a 10-ms NB-IoT frame may include ten 1-ms NB-IoT subframes and a 1-ms NB-IoT subframe may include two 0.5-ms NB-IoT slots. Each 0.5-ms NB-IoT slot may include seven symbols. The 15-kHz subcarrier spacing may be applied to both downlink and uplink. The symbol includes an OFDMA symbol in downlink and an SC-FDMA symbol in uplink. In the frame structure of FIG. 18, the system band is 1.08 MHz and is defined by 12 subcarriers. The 15-kHz subcarrier spacing is applied to both downlink and uplink and orthogonally with the LTE system is guaranteed, and as a result, coexistence with the LTE system may be facilitated.

Meanwhile, referring to FIG. 19, when the subcarrier spacing is 3.75 kHz, the 10-ms NB-IoT frame may include five 2-ms NB-IoT subframes, and the 2-ms NB-IoT subframe may include seven symbols and one guard period (GP) symbol. The 2-ms NB-IoT subframe may be expressed as an NB-IoT slot or an NB-IoT resource unit (RU). Here, the symbol may include the SC-FDMA symbol. In the frame structure of FIG. 19, the system band is 1.08 MHz and is defined by 48 subcarriers. The subcarrier spacing of 3.75 kHz may be applied only to the uplink and the orthogonality with the LTE system may be impaired, resulting in performance degradation due to interference.

The figure may illustrate an NB-IoT frame structure based on an LTE system frame structure and the illustrated NB-IoT frame structure may be extensively applied even to the next-generation system (e.g., NR system).

FIG. 20 illustrates three operation modes of NB-IoT. Specifically, FIG. 20(*a*) illustrates an in-band system, FIG. 20(*b*) illustrates a guard-band system, and FIG. 20(*c*) illustrates a stand-alone system. Here, the in-band system may be expressed as an in-band mode, the guard-band system may be expressed as guard-band mode, and the stand-alone system may be expressed as a stand-alone mode. For convenience, the NB-IoT operation mode is described based on the LTE band, but the LTE band may be replaced with a band of another system (e.g., NR system band).

The in-band mode means an operation mode to perform the NB-IoT in the (legacy) LTE band. In the in-band mode, some resource blocks of an LTE system carrier may be allocated for the NB-IoT. For example, in the in-band mode, specific 1 RB (i.e., PRB) in the LTE band may be allocated for the NB-IoT. The in-band mode may be operated in a structure in which the NB-IoT coexists in the LTE band. The guard-band mode means an operation mode to perform the NB-IoT in a reserved space for the guard-band of the (legacy) LTE band. Accordingly, in the guard-band mode, the guard-band o the LTE carrier not used as the resource block in the LTE system may be allocated for the NB-IoT. The (legacy) LTE band may have a guard-band of at least 100 kHz at the end of each LTE band. The stand-alone mode means an operation mode to perform the NB-IoT in a frequency band independently from the (legacy) LTE band. For example, in the stand-alone mode, a frequency band (e.g., a GSM carrier to be reallocated in the future) used in a GSM EDGE Radio Access Network (GERAN) may be allocated for the NB-IoT.

The NB-IoT UE searches an anchor carrier in units of 100 kHz and in the in-band and the guard-band, a center frequency of the anchor carrier should be located within ±7.5 kHz from a 100 kHz channel raster. Further, six center PRBs among LTE PRBs are not allocated to the NB-IoT. Accordingly, the anchor carrier may be located only in a specific PRB.

FIG. 21 illustrates a layout of an in-band anchor carrier at an LTE bandwidth of 10 MHz.

Referring to FIG. 21, a direct current (DC) subcarrier is located in the channel raster. Since a center frequency spacing between adjacent PRBs is 180 kHz, the center frequency is located at ±2.5 kH from the channel raster in the case of PRB indexes 4, 9, 14, 19, 30, 35, 40, and 45. Similarly, the center frequency of the PRB suitable as the anchor carrier at an LTE bandwidth of 20 MHz is located at ±2.5 kHz from the channel raster and the center frequency of the PRB suitable as the anchor carrier at LTE bandwidths of 3 MHz, 5 MHz, and 15 MHz is located at ±7.5 kHz from the channel raster.

In the case of the guard-band mode, the center frequency is located at +2.5 kHz from the channel raster in the case of a PRB immediately adjacent to an edge PRB of LTE at the bandwidths of 10 MHz and 20 MHz. In the case of the bandwidths 3 MHz, 5 MHz, and 15 MHz, a guard frequency band corresponding to three subcarriers from the edge PRB is used to locate the center frequency of the anchor carrier at ±7.5 kHz from the channel raster.

The anchor carrier of the stand-alone mode may be aligned in the 100 kHz channel raster and all GSM carriers including a DC carrier may be used as the NB-IoT anchor carrier.

The NB-IoT may support multi-carriers and combinations of in-band and in-band, in-band and guard-band, guard band and guard-band, and stand-alone and stand-alone may be used.

In NB-IoT downlink, physical channels such as a Narrowband Physical Broadcast Channel (NPBCH), a Narrowband Physical Downlink Shared Channel (NPDSCH), and a Narrowband Physical Downlink Control Channel (NPDCCH) are provided and physical signals such as a Narrowband Primary Synchronization Signal (NPSS), a Narrowband Primary Synchronization Signal (NSSS), and a Narrowband Reference Signal (NRS) are provided.

The NPBCH transfers, to the UE, a Master Information Block-Narrowband (MIB-NB) which is minimum system information which the NB-IoT requires for accessing the system. The NPBCH signal may be repeatedly transmitted eight times in total for coverage enhancement. A Transport Block Size (TBS) of the MIB-NB is 34 bits and is newly updated every 64 ms TTI period. The MIB-NB includes information such as an operation mode, a System Frame Number (SFN), a Hyper-SFN, the number of Cell-specific Reference Signal (CRS) ports, a channel raster offset, etc.

FIG. 22 illustrates transmission of an NB-IoT downlink physical channel/signal in an FDD LTE system. A downlink physical channel/signal is transmitted through one PRB and supports 15 kHz subcarrier spacing/multi-tone transmission.

Referring to FIG. 22, the NPSS is transmitted in a $6^{th}$ subframe of every frame and the NSSS is transmitted in a last (e.g., 10th) subframe of every even frame. The UE may obtain frequency, symbol, and frame synchronization using the synchronization signals (NPSS and NSSS) and search 504 physical cell IDs (PCIDs) (i.e., BS IDs). The NPBCH is transmitted in a first subframe of every frame and transports the NB-MIB. The NRS is provided as a reference signal for downlink physical channel demodulation and is generated in the same scheme as the LTE. However, Physical Cell ID (NB-PCID) (or NCell ID or NB-IoT BS ID) is used as an initialization value for NRS sequence generation. The NRS is transmitted through one or two antenna ports. The NPDCCH and the NPDSCH may be transmitted in the remaining subframes except for the NPSS/NSSS/NPBCH. The NPDCCH and the NPDSCH may be transmitted together in the same subframe. The NPDCCH transports the DCI and the DCI supports three types of DCI formats. DCI format NO includes Narrowband Physical Uplink Shared Channel (NPUSCH) scheduling information and DCI formats N1 and N2 include NPDSCH scheduling information. The NPDCCH may be repeatedly transmitted 2048 times in total for coverage enhancement. The NPDSCH is used for transmitting data (e.g., TB) of transmission channels such as a Downlink-Shared Channel (DL-SCH) and a Paging Channel (PCH). The maximum TBS is 680 bits and may be repeatedly transmitted 2048 times in total for coverage enhancement.

The uplink physical channel includes a Narrowband Physical Random Access Channel (NPRACH) and the NPUSCH and supports single-tone transmission and multi-tone transmission. The single-tone transmission is supported for the subcarrier spacings of 3.5 kHz and 15 kHz and the multi-tone transmission is supported only for the subcarrier spacing of 15 kHz.

FIG. 23 illustrates an NPUSCH format.

The NPUSCH supports two formats. NPUSCH format 1 is used for UL-SCH transmission, and the maximum TBS is 1000 bits. NPUSCH format 2 is used for transmission of uplink control information such as HARQ ACK signaling. NPUSCH format 1 supports the single-/multi-tone transmission, and NPUSCH format 2 supports only the single-tone transmission. In the case of the single-tone transmission, pi/2-Binary Phase Shift Keying (BPSK) and pi/4-Quadrature Phase Shift Keying (QPSK) are used to reduce Peat-to-Average Power Ratio (PAPR). In the NPUSCH, the number of slots occupied by one resource unit (RU) may vary according to resource allocation. The RU represents the smallest resource unit to which the TB is mapped, and is constituted by NULsymb*NULslots consecutive SC-FDMA symbols in the time domain and NRUsc consecutive subcarriers in the frequency domain. Here, NULsymb represents the number of SC-FDMA symbols in the slot, NULslots represents the number of slots, and NRUsc represents the number of subcarriers constituting the RU.

Table 11 shows the configuration of the RU according to the NPUSCH format and subcarrier spacing. In the case of TDD, the supported NPUSCH format and SCS vary according to the uplink-downlink configuration. Table 2 may be referred to for the uplink-downlink configuration.

TABLE 11

| NPUSCH format | Subcarrier spacing | Supported uplink-downlink configurations | $N^{RU}_{sc}$ | $N^{UL}_{slots}$ | $N^{UL}_{symb}$ |
|---|---|---|---|---|---|
| 1 | 3.75 kHz | 1, 4 | 1 | 16 | 7 |
|  | 15 kHz | 1, 2, 3, 4, 5 | 1 | 16 |  |
|  |  |  | 3 | 8 |  |
|  |  |  | 6 | 4 |  |
|  |  |  | 12 | 2 |  |
| 2 | 3.75 kHz | 1, 4 | 1 | 4 |  |
|  | 15 kHz | 1, 2, 3, 4, 5 | 1 | 4 |  |

Scheduling information for transmission of UL-SCH data (e.g., UL-SCH TB) is included in DCI format NO, and the DCI format NO is transmitted through the NPDCCH. The DCI format NO includes information on the start time of the NPUSCH, the number of repetitions, the number of RUs used for TB transmission, the number of subcarriers, resource locations in the frequency domain, and MCS.

Referring to FIG. 23, DMRSs are transmitted in one or three SC-FDMA symbols per slot according to the NPUSCH format. The DMRS is multiplexed with data (e.g., TB, UCI), and is transmitted only in the RU including data transmission.

FIG. 24 illustrates an operation when multi-carriers are configured in FDD NB-IoT.

In FDD NB-IoT, a DL/UL anchor-carrier may be basically configured, and a DL (and UL) non-anchor carrier may be additionally configured. Information on the non-anchor carrier may be included in RRCConnectionReconfiguration. When the DL non-anchor carrier is configured (DL add carrier), the UE receives data only in the DL non-anchor carrier. On the other hand, synchronization signals (NPSS and NSSS), broadcast signals (MIB and SIB), and paging signals are provided only in the anchor-carrier. When the DL non-anchor carrier is configured, the UE listens only to the DL non-anchor carrier while in the RRC_CONNECTED state. Similarly, when the UL non-anchor carrier is configured (UL add carrier), the UE transmits data only in the UL non-anchor carrier, and simultaneous transmission on the UL non-anchor carrier and the UL anchor-carrier is not allowed. When the UE is transitioned to the RRC_IDLE state, the UE returns to the anchor-carrier.

FIG. 24 illustrates a case where only the anchor-carrier is configured for UE1, the DL/UL non-anchor carrier is additionally configured for UE2, and the DL non-anchor carrier is additionally configured for UE3. As a result, carriers in which data is transmitted/received in each UE are as follows.

UE1: Data reception (DL anchor-carrier) and data transmission (UL anchor-carrier)

UE2: Data reception (DL non-anchor-carrier) and data transmission (UL non-anchor-carrier)

UE3: Data reception (DL non-anchor-carrier) and data transmission (UL anchor-carrier)

The NB-IoT UE may not transmit and receive at the same time, and the transmission/reception operations are limited to one band each. Therefore, even if the multi-carrier is configured, the UE requires only one transmission/reception chain of the 180 kHz band.

Network Access and Communication Process

The UE may perform a network access process while performing the procedures and/or methods described/proposed above. For example, the UE may receive system information and configuration information required for performing the procedure and/or methods described/proposed above while performing accessing a network (e.g., BS), and store the received system information and configuration information. The configuration information required for the present disclosure may be received through higher layer (e.g., RRC layer; Medium Access Control, MAC, layer, etc.) signaling.

FIG. 25 illustrates an initial network access and a subsequent communication process. In NR, a physical channel and a reference signal may be transmitted by using beam-forming. When beam-forming based signal transmission is supported, a beam management process may be accompanied in order to align a beam between the BS and the UE. Further, a signal proposed in the present disclosure may be transmitted/received by using the beam-forming. In a radio resource control (RRC) idle mode, beam alignment may be performed based on an SSB. On the contrary, in an RRC connected mode, the beam alignment may be performed based on CSI-RS (in DL) and SRS (in UL). Meanwhile, when the beam-forming based signal transmission is not supported, an operation related to a beam may be omitted in the following description.

Referring to FIG. 25, the base station (e.g., BS) may periodically transmit the SSB (S702). Here, the SSB includes a PSS/SSS/PBCH. The SSB may be transmitted by using beam sweeping (see FIG. 22). The PBCH may include a master information block (MIB), and the MIB may include scheduling information regarding remaining minimum system information (RMSI). Thereafter, the BS may transmit the RMSI and other system information (OSI) (S704). The RMSI may include information (e.g., PRACH configuration information) which the UE requires to initially access the BS. Meanwhile, the UE performs SSB detection, and then identifies a best SSB. Thereafter, the UE may transmit, to the BS, an RACH preamble (Message 1, Msg1) by using a PRACH resource linked/corresponding to an index (i.e., a beam) of the best SSB (S706). A beam direction of an RACH preamble is associated with a PRACH resource. An association between the PRACH resource (and/or RACH preamble) and the SSB (index) may be configured through system information (e.g., RMSI). Thereafter, as a part of an RACH process, the BS may transmit a random access response (Msg2) in response to the RACH preamble (S708), the UE may transmit Msg3 (e.g., RRC connection request) by using a UL grant in the RAR (S710), and the BS may transmit a contention resolution message (Msg4) (S712). Msg4 may include RRC connection setup.

When the RRC connection is configured between the BS and the UE through the RACH process, subsequent beam alignment may be performed based on SSB/CSI-RS (in DL) and SRS (in UL). For example, the UE may receive the SSB/CSI-RS (S714). The SSB/CSI-RS may be used for the UE to generate beam/CSI reporting. Meanwhile, the BS may request the beam/CSI reporting to the UE through DCI (S716). In this case, the UE may generate the beam/CSI reporting based on the SSB/CSI-RS, and transmit the generated beam/CSI reporting to the BS through the PUSCH/PUCCH (S718). The beam/CSI reporting may include a beam measurement result, information on a preferred beam, and the like. The BS and the UE may switch the beam based on the beam/CSI reporting (S720a and S720b).

Thereafter, the UE and the BS may perform the procedure and/or methods described/proposed above. For example, the UE and the BS may process the information in the memory and transmit the radio signal or process the received radio signal and store the processed radio signal in the memory according to the proposal of the present disclosure based on configuration information obtained during the network access process (e.g., a system information acquisition process, an RRC connection process through the RACH, etc.). Here, the radio signal may include at least one of the PDCCH, the PDSCH, and the reference signal (RS) in the case of the downlink and include at least one of the PUCCH, the PUSCH, and the SRS in the case of the uplink.

The contents described above may be basically applied to the MTC and the NB-IoT in common. Parts which may be different in the MTC and the NB-IoT will be additionally described below.

MTC Network Access Process

The MTC network access process based on the LTE will be additionally described. The following description may be extensively applied even to the NR. In the LTE, the MIB includes 10 reserved bits. In the MTC, 5 most significant bits (MSBs) among 10 reserved bits in the MIB are used to indicate scheduling information for System Information Block for bandwidth reduced device (SIB1-RB). 5 MSBs are used for indicating a repetition number of SIB1-BR and a transport block size (TBS). The SIB1-BR is transmitted in the PDSCH. The SIB1-BR may not be changed in 512 radio frames (5120 ms) so as to permit multiple subframes to be combined. Transported information in the SIB1-BR is similar to SIB1 in the LTE system.

The MTC RACH process is basically the same as the LTE RACH process, and both processes are different in the following matter. The MTC RACH process is performed based on a coverage enhancement (CE) level. For example, whether the PRACH is repeatedly transmitted/the number of repeated transmission times of the PRACH may vary for each CE level for PRACH coverage improvement.

Table 12 shows a CE mode/level supported in the MTC. The MTC supports 2 modes (CE mode A and CE mode B) and 4 levels (levels 1 to 4) for coverage enhancement.

TABLE 12

| Mode | Level | Description |
|---|---|---|
| Mode A | Level 1 | No repetition |
|  | Level 2 | Small Number of Repetition |
| Mode B | Level 3 | Medium Number of Repetition |
|  | Level 4 | Large Number of Repetition |

CE mode A may be a mode for small coverage enhancement in which complete mobility and CSI feedback are supported, and there may be no repetition or the repetition number may be configured to be small. CE mode B may be a mode for a UE which is in an extremely poor coverage condition supporting the CSI feedback and the limited mobility, and the repetition number may be configured to be large.

The BS may broadcast system information including a plurality of (e.g., 3) reference signal received power (RSRP) thresholds, and the UE compares the RSRP threshold and the RSRP measurement value to determine the CE level. The following information may be independently configured through the system information for each CE level.

PRACH resource information: Period/offset of PRACH opportunity, PRACH frequency resource Preamble group: Preamble set allocated for each CE level Repetition number for each preamble attempt and the maximum number of preamble attempts RAR window time: Length of a time interval in which RAR reception is expected (e.g., a subframe number)

Contention resolution window time: Length of time interval in which contention resolution message reception is expected The UE may select a PRACH resource corresponding to the CE level thereof, and then perform the PRACH transmission based on the selected PRACH resource. A PRACH waveform used in the MTC is the same as the PRACH waveform used in the LTE (e.g., OFDM and Zadoff-Chu sequence). Signals/messages transmitted after the PRACH may be repeatedly transmitted, and the repetition number may be independently configured according to the CE mode/level.

NB-IoT Network Access Process

The NB-IoT network access process based on the LTE will be additionally described. The following description may be extensively applied even to the NR. In FIG. 12, the PSS, the SSS, and the PBCH of S702 are replaced with NPSS, NSSS, and NPBCH in the NB-IoT, respectively. Matters for the NPSS, the NSSS, and the NPBCH may be described with reference to FIG. 22.

The NB-IoT RACH process is basically the same as the LTE RACH process, and both processes are different in the following matter. First, RACH preamble formats are different. In the LTE, the preamble is based on a code/sequence (e.g., Zadoff-chu sequence), while in the NB-IoT, the preamble, is a subcarrier. Second, the NB-IoT RACH process is performed based on the CE level. Accordingly, the PRACH resource is differently assigned for each CE level. Third, since the SRS resource is not configured in the NB-IoT, an uplink resource allocation request in the NB-IoT is performed by using the RACH process.

FIG. 26 illustrates preamble transmission in NB-IoT RACH.

Referring to FIG. 26, the NPRACH preamble may be constituted by 4 symbol groups, and each symbol group may be constituted by a CP and a plurality of (e.g., 5) SC-FDMA symbols. In the NR, the SC-FDMA symbol may be replaced with the OFDM symbol or the DFT-s-OFDM symbol. The NPRACH supports only single-tone transmission of 3.75 kHz subcarrier spacing, and provides CPs having lengths of 66.7 μs and 266.67 μs in order to support different cell radii. Each symbol group supports frequency hopping and a hopping pattern is as follows. A subcarrier that transmits a first symbol group is determined by a pseudo-random scheme. A second symbol group leaps 1 subcarrier, a third symbol group leaps 6 subcarriers, and a fourth symbol group leaps 1 subcarrier. A frequency hopping procedure is repeatedly applied to repeated transmission, and the NPRACH preamble may be repeatedly transmitted {1, 2, 4, 8, 16, 32, 64, 128} times for coverage improvement. The NPRACH resource may be configured for each CE level. The UE may select the NPRACH resource based on the CE level determined according to a downlink measurement result (e.g., RSRP), and transmit the RACH preamble by using the selected NPRACH resource. The NPRACH may be transmitted in an anchor carrier or transmitted in a non-anchor carrier in which the NPRACH resource is configured.

The present disclosure proposes a method for receiving an emergency channel (e.g., ETWS or CMAS) in the RRC Connected state when a non-Band reduced and Low cost (BL) user equipment (UE) operates a coverage extension (CE) mode. The corresponding method may be similarly applied even to a case where a specific function is additionally implemented in an MTC dedicated UE (BL UE) other than the non-BL UE.

The emergency channel (or emergency information) is transferred to the UE through a paging channel. However, since the BL/CE UE or the non-BL UE which operates in the CE mode does not receive the paging channel in the RRC Connected state, a procedure of releasing the RRC connection and changing the configuration to an RRC Idle or inactive state in order for the UE to transfer the emergency channel (or emergency channel information). For example, the emergency channel may be an Earthquake and Tsunami Warning System (ETWS), a Commercial Mobile Alert System (CMAS), and/or messages therefor (i.e., ETWS and CMAS).

Accordingly, a time delay required for receiving the emergency channel may increase and a lot of resources for changing the RRC state configuration may be consumed. In order to solve the problem, a function is required, in which the UE which operates in the CE mode may efficiently receive the emergency channel in the RRC Connected state.

However, since the BL/CE UE is generally a device such as a sensor, it may not be relatively important to require the reception of the emergency channel. On the other hand, when a UE (e.g., non-BL UE) which a general user may carry operates in the CE mode for power consumption reduction and coverage enhancement, a delay consumed for receiving the emergency channel needs to be minimized.

Accordingly, the present disclosure proposes a method for receiving the emergency channel in the RRC Connected state when the non-BL UE operates in the CE mode.

Among the emergency channels, the ETWS and/or the CMAS are not information to be transmitted separately for each UE, but information to be similarly received by all UEs located in a specific area. That is, it may be more efficient in terms of resource use to transmit corresponding information to multiple random UEs simultaneously through a channel which may be detected rather than individually transfer ETWS and/or CMAS notification to the UEs in the RRC Connected state. In other words, it may be more efficient in terms of the resource use to simultaneously transmit ETWS and/or CMAS notification information to multiple random UEs through a common channel rather than individually transmitting the ETWS and/or CMAS notification information to the UEs.

To this end, the corresponding notification information (or DCI for notifying the emergency information or direct indication information) needs to be transmitted through the MPDCCH (or PDCCH) of the common search space (CSS) which multiple UE which operate in the CE mode in the RRC Connected state may commonly monitor. The UE that receives the notification information may obtain emergency channel related information (or emergency channel information or emergency information) by interpreting information such as a system information block (SIB) (e.g., SIB10, SIB11, and/or SIB12) related to the ETWS and/or CMAS.

The corresponding SIBs (or emergency information) may be scheduled through SIB1-BR (or scheduling information for the emergency information) and SIB1-BR scheduling information may be transferred through schedulingInfo-SIB1-BR of the MIB.

That is, the UE performs a process of receiving a configuration for a UE-specific search space (USS) and a CSS to monitor the emergency channel notification through RRC, and/or obtaining emergency channel (e.g., ETWS and/or CMAS) notification information from a configured specific CSS, and/or obtaining the SIB1-BR scheduling information by detecting the MIB of the corresponding cell, and/or detecting emergency channel related SIBs (or emergency information) by detecting the SIB1-BR based on the SIB1-BR scheduling information, in the RRC Connected state (or mode).

In the present disclosure, blind decoding (BD) means an operation of performing, by the UE, decoding for all available PDCCH candidates pre-defined for each subframe (or slot) in order to receive the PDCCH. The BD is one of key factors for determining UE complexity and a battery life span.

Hereinafter, the present disclosure proposes a method for more efficiently improving the method for transmitting/receiving the emergency channel.

Specifically, in the present disclosure, a method for monitoring a CSS (or CSS used for notifying the emergency channel) for notifying the emergency channel at a specific period (first embodiment), a method for transmitting/receiving information indicating whether to change scheduling to be included in the DCI for notifying the emergency channel (second embodiment), and a method for improving blind decoding overhead of the DCI for notifying the emergency channel (third embodiment) are described. For example, the second embodiment may be a method for skipping a process of transmitting/receiving the SIB1-BR scheduling information through the MIB and/or scheduling information of SIBs through the SIB1-BR after detecting the emergency channel notification information.

Hereinafter, the embodiments described in the present disclosure are only classified for convenience of description and it is needless to say that some methods and/or some configurations of any one embodiment may be substituted with the method and/or configuration of another embodiment or may be applied in combination with each other.

In the present disclosure, 'A/B' may be interpreted as 'A and B', 'A or B', and/or 'A and/or B'.

First Embodiment

First, a method for monitoring the CSS for notifying the emergency channel at a specific period is described.

Hereinafter, methods to be described are just classified for convenience and it is needless to say that the configuration of any one method may be substituted with the configuration of another method or may be applied in combination with each other.

When the non-BL UE operates in the CE mode, the operation may vary for each CE mode.

For example, in the case of CE mode A, the UE may attempt to simultaneously detect Type0 CSS (e.g., Type0-MPDCCH CSS) in a UE-specific Search Space (USS) narrow band (NB) in which MPDCCH candidates for unicast use may be transmitted in the RRC Connected state.

Here, Type0 CSS may be a channel or a search space used for uplink Transmit Power Control (TPC) of the UE. The DCI included in the corresponding search space (SS) may be simultaneously detected by multiple UEs. Each UE may interpret a specific field indicated for each UE as TPC information to be used thereby and disregard the remaining fields. That is, Type0 CSS may be derived by the USS configured for each UE and a location of information in the DCI to be referred to for the TPC for each UE may be configured to be UE specific.

In this case, when some fields of the DCI transmitted to Type0 CSS are configured to be expected as information used for notifying the emergency channel to multiple users (or UEs) monitoring the corresponding DCI, the corresponding DCI may be used together with the transmission of the legacy TPC information. In other words, the emergency channel notification information may be included in the DCI transmitted to Type0 CSS. That is, each UE may use some fields as the emergency channel notification information shared with another user while interpreting a specific field as the TPC information in the DCI detected in Type0 CSS.

On the other hand, a UE which operates in CE mode B may be configured to additionally monitor the same or similar CSS (e.g., Type0' CSS) as or to Type0 CSS of CE mode A in USS NB in which MPDCCH candidates for unicast use may be transmitted in the RRC Connected state and may use the CSS as the channel for notifying the emergency channel.

Unlike CE mode A, in the case of Type0' CSS of CE mode B, all fields of the DCI may be used for transferring information related to the notification of the emergency channel. In other words, in the case of Type0' CSS of CE mode B, all fields of the DCI may be used as the emergency channel notification information.

And/or, when the non-BL UE operates in the CE mode, the non-BL UE may operate similarly regardless of the CE mode. For example, the non-BL UE may operate by using one of CE mode A or B detecting method described above. For example, the UE which operates in CE mode A and/or the UE which operates in CE mode B may interpret a first field of the DCI detected in Type0 CSS as the TPC information and interpret a second field as the emergency channel notification information. For example, the UE which operates in CE mode A and/or the UE which operates in CE mode B may interpret the DCI detected in Type0' CSS as the emergency channel notification information.

The Type0 CSS or Type0' CSS based emergency channel notifying method may be used for notifying the emergency channel without transitioning the RRC states of the UEs in the RRC Connected state.

However, an interpretation timing of a specific field for corresponding channel monitoring and emergency channel notification may be need to be minimized in terms of power saving and false alarm. In other words, monitoring the DCI including the emergency channel notification needs to be minimized in Type0 CSS or Type0' CSS in terms of power saving and false detection. For example, interpretation of emergency channel information transmission field (e.g., field of the emergency channel notification information) of Type0 CSS and/or a detection attempt timing (or DCI detection attempt timing) of Type0' CSS may be limited to a timing when the UE attempts to detect the paging channel in the RRC Idle mode.

That is, in the case of the UE in CE mode B, the UE may be allowed to attempt to detect Type0' CSS only at a specific period and/or timing instead of detecting Type0' CSS every USS detection attempt. The specific period and/or timing may be a value derived from a period and/or timing at which the corresponding UE or UEs sharing corresponding Type0' CSS monitor the paging channel in the RRC Idle state. For example, the period and/or timing may be a paging cycle, a paging frame (PF), a paging occasion (PO), and/or a UE identifier (UE_ID).

For example, in the UE which operates in CE mode B, detection of Type0' CSS may be attempted at a specific and/or timing.

And/or, UEs that interpret the emergency channel notification field (e.g., emergency notification information) in Type0 CSS may be the same as each other. That is, each time the Type0 CSS is detected, the corresponding field is not interpreted as the emergency channel notification information, but every period or only at a timing derived from a period and/or timing at which the corresponding UE or the UE sharing the corresponding Type0' CSS monitors the paging channel in the RRC Idle state, the corresponding field may be interpreted as valid emergency channel notification information. For example, the period and/or timing of monitoring the paging channel in the RRC Idle state may mean a period and/or timing derived by the paging cycle, the paging frame, the paging occasion, and/or the UE identifier.

For example, the UE which operates in CE mode A may decode Type0 CSS in the RRC connected state regardless of the paging cycle. However, interpretation and application of a specific field reserved as the ETWS and/or CMAS in the corresponding DCI may be performed only at a specific period and/or timing related to the paging cycle, the paging frame, the paging occasion, and/or the UE identifier of the corresponding UE.

For example, in the case of the UE which operates in CE mode B, Type0 CSS is configured based on USS, but in respect to the timing when each UE attempts to decode the corresponding DCI, the decoding of the corresponding DCI may be allowed to be performed only at the paging cycle of the corresponding UE and/or a specific time (e.g., PO or PF) related thereto. In other words, Type0 CSS is configured based on USS, but each UE may attempt decode the DCI only at the paging cycle of the corresponding UE and/or the specific time (e.g., PO or PF) related thereto.

And/or, Type0' CSS is derived from the USS configuration of the corresponding UE, but in respect to the timing when each UE attempts to detect the DCI of the corresponding search space, the DCI detection may be performed only at a specific period and/or timing related to the paging cycle, the paging frame, the paging occasion, and/or the UE identifier of the corresponding UE. In other words, Type0' CSS is derived from the USS configuration of the corresponding UE, but each UE may attempt to detect the DCI only at a specific period and/or timing related to the paging cycle, the paging frame, the paging occasion, and/or the UE identifier of the corresponding UE.

Second Embodiment

Next, a method for transmitting/receiving the DCI for notifying the emergency channel including information indicating whether to change the scheduling will be described. For example, the BS and/or UE may transmit the DCI for notifying the emergency channel including SIB-BR scheduling related information.

Hereinafter, methods to be described are just classified for convenience and it is needless to say that the configuration of any one method may be substituted with the configuration of another method or may be applied in combination with each other.

As described above, the UE that receives the emergency channel notification information performs a procedure of obtaining the SIB1-BR scheduling information through the MIB, then obtaining scheduling information of the remaining SIBs by detecting SIB1-BR, and receiving emergency channel information related SIBs. In the present disclosure, the emergency channel information related SIBs (e.g., SIB10, SIB11, SIB12, etc.) may be referred to as eSIBs.

In other words, the UE that receives the emergency channel notification information may receive the MIB including the SIB1-BR scheduling information, receive the SIB1-BR including the scheduling information of the SIBs based on the SIB1-BR scheduling information, and receive SIBs (or emergency channel information) based on scheduling information of SIB1 s.

In this case, when eSIBs start to be transmitted, the remaining SIB scheduling information included in SIB1-BR is changed, but the scheduling information of SIB1-BR itself may be the same as a timing before eSIBs are transmitted. In this case, if the BS together transmits the emergency channel notification information (e.g., DCI of Type0 CSS or Type0' CSS of the proposal) including whether the SIB1-BR scheduling information is changed through comparison with SIB1-BR scheduling information before a specific timing, when the SIB1-BR scheduling information is not changed, the UE may skip the detection attempt of the MIB.

For example, the DCI may include information indicating whether the emergency channel notification information and/or the SIB1-BR scheduling information is changed. The UE may check whether the SIB-BR scheduling information is not changed based on the corresponding DCI and skip reception of the MIB. And/or, the UE may confirm that the SIB-BR scheduling information is changed based on the corresponding DCI and receive the MIB.

And/or, the SIB1-BR scheduling information may mean scheduling information of eSIBs including SIB1-BR. For example, the UE may check whether the scheduling information of eSIBs is not changed based on the DCI and skip reception of the SIB11-BR. And/or, the UE may confirm that the scheduling information of eSIBs is changed based on the corresponding DCI and receive the SIB11-BR. And/or, the SIB1-BR scheduling information may mean information including the scheduling information of SIB1-BR and the scheduling information of eSIBs.

And/or, in the Type0 CSS or Type0' CSS of the proposal, the SIB1-BR scheduling information may be directly indicated. For example, the DCI may include the emergency channel information and/or the SIB1-BR scheduling information. The UE may receive the SIB1-BR scheduling information based on the corresponding DCI and may receive SIB1-BR based on the SIB1-BR scheduling information. And/or, the UE may receive the SIB1-BR scheduling information based on the corresponding DCI and may receive eSIBs based on the SIB1-BR scheduling information.

And/or, if only the information indicating whether to change the SIB1-BR scheduling information is transferred together with the emergency channel notification information, defining a previous SIB1-BR scheduling information section which becomes a change criterion of the SIB1-BR scheduling information is required. That is, since whether the SIB1-BR scheduling information is changed is a relative definition, when whether to the SIB1-BR scheduling information is changed is applied based on a timing when each obtains the SIB1-BR scheduling information at a predetermined time, the BS does not know an accurate timing when each UE obtains the SIB1-BR scheduling information and the BS does not accurately know at which timing the SIB1-BR scheduling information is changed or maintained based on the SIB1-BR scheduling information between the UEs.

To this end, a timing of the "previous SIB1-BR scheduling information" as the criterion may be configured based on a specific period P of the BS. For example, parameters such as System Information Modification Period, BCCH modification period, or Physical Broadcast Channel (PBCH) Transmission Time Interval (TTI) may be utilized. That is, the BS may make whether the SIB1-BR scheduling information at the corresponding timing is updated based on the specific period be included in the emergency channel notification information.

However, the emergency channel information may be transmitted for a long time so that multiple UEs safely receive the corresponding channel. In other words, the SIB1-BR scheduling information may be the same for a long time during which eSIBs are transmitted. In this case, since the timing of detection and interpretation of the DCI related to the change of the SIB1-BR scheduling information may be different for each UE, interpretation of the change or maintenance of the SIB1-BR scheduling information is required depending on how the change of the SIB1-BR scheduling information is defined.

That is, when the emergency channel notification information is repeatedly transmitted for a long time, if specific UE group A obtains the corresponding information at a first attempt and the other specific UE group B obtains the corresponding information after time P, the interpretation of the change of the SIB1-BR scheduling information may differ between groups A and B. In other words, from the viewpoint of the BS, at an initial time when the SIB1-BR scheduling information is updated by transmission of eSIBs, it is indicated that the SIB1-BR scheduling is updated through an emergency channel notification-related channel, but if eSIBs are transmitted even after time P, there is a high probability that the SIB1-BR scheduling information is maintained to be the same as that before time P and in this case, since the SIB1-BR scheduling information is not changed compared to the SIB1-BR scheduling information before time P, the BS transfers, to the UEs, that the SIB1-BR scheduling information is being maintained through the emergency channel notification-related channel.

In such a situation, UEs that obtain emergency channel notification related information after timing point P from the timing when the SIB1-BR scheduling information is updated may erroneously interpret that the SIB1-BR scheduling information is the same as the SIB1-BR scheduling information before transmission of eSIBs.

Accordingly, SIB1-BR scheduling update information included in the emergency channel notification information may be defined in a scheme in which the SIB1-BR scheduling information is toggled every time the SIB1-BR scheduling information is updated. In this case, in respect to a toggle criterion, the previous SIB1-BR scheduling information before the initial timing, which indicates that eSIBs in the emergency channel notification information are transmitted may be designated as '0' when the SIB1-BR scheduling information is changed while eSIBs are transmitted and otherwise, may be designated as '1'. Thereafter, the SIB1-BR scheduling information may be designated by a method in which the SIB1-BR scheduling information is toggled every time the SIB1-BR scheduling information is updated. And/or, the meaning of '0' and '1' may be interpreted and/or designated in reverse.

Third Embodiment

Next, a method for improving blind decoding overhead of the DCI for notifying the emergency channel will be described.

Hereinafter, methods to be described are just classified for convenience and it is needless to say that the configuration of any one method may be substituted with the configuration of another method or may be applied in combination with each other.

For notifying the emergency channel, there may be a method for using the same format (e.g., DCI format 6-1A or DCI format 6-1B) as the DCI used in the USS as the DCI for transmitting the notification of the emergency channel through Type0 CSS (e.g., Type0-MPDCCH CSS) or Type0' CSS and distinguishing the DCI through a Radio Network Temporary Identifier (RNTI).

For example, in the case of CE mode A, DCI format 6-0A or DCI format 6-1A may be used. A method for using DCI format 6-0A or DCI format 6-1A has an advantage in that DCI for UL/DL scheduling and emergency channel notification may be received in one DCI format without defining a new DCI format when considering that the CSS is a form of using a part of the search space of the USS.

However, a DCI size may vary for each UE by a DCI field of which existence is determined by a UE-specific RRC configuration. In other words, in the case of a first UE, the DCI size may be x1 by the UE-specific RRC configuration and in the case of a second UE, the DCI size may be x2 (x2≠x1) by UE-specific RRC configuration. In this case, there may be a problem in that the emergency channel notification may not be efficiently broadcasted to all UEs.

In order to solve such a problem, in respect to the DCI size for the emergency channel notification, all UEs may have the same DCI size by excluding a field added by the UE-specific RRC configuration. For example, the DCI format for the emergency channel notification has DCI format 6-1A and/or DCI format 6-1B, but the DCI size may be equal to the size of DCI format 6-1A and/or DCI format 6-1B excluding the field added by UE-specific RRC configuration. For example, in the UE which operates in CE mode B, the format of the DCI is the same as DCI format 6-1B, and the size of the DCI may be equal to a size acquired by excluding Number of scheduled TB for SC-MTCH field, Information for SC-MCCH change notification field, Scheduling TBs for Unicast field, and Resource reservation field from DCI format 6-1B scheduling the PDSCH. Further, Resource block assignment field may also be configured with a size (or number of bits) when ce-pdsch-maxBandwidth-config which is RRC configuration information is not configured. In other words, the field added by the UE-specific RRC configuration may mean Number of scheduled TB for SC-MTCH field, Information for SC-MCCH change notification field, Scheduling TBs for Unicast field, Resource reservation field, and Resource block assignment field when ce-pdsch-maxBandwidth-config as RRC configuration information is configured. In other words, the size of the DCI may be $$14 + \left\lceil \log_2 \left\lfloor \frac{N_{RB}^{DL}}{6} \right\rfloor \right\rceil + 1 \text{ bits.}$$

The emergency channel notification information is transmitted to all UEs that monitor a corresponding narrowband with Type0 CSS or Type0' CSS as one DCI is transmitted through the method to enhance downlink transmission efficiency for a scheduling burden of the BS and a blind decoding burden of the UE.

The method may include determining the DCI size by assuming a specific value (e.g., minimum value) for the corresponding field size when the field size is changed by the UE-specific RRC configuration.

In the method, "by excluding the field added by the UE-specific RRC configuration" may include a meaning of "by excluding a field which exists only when the corresponding DCI is mapped to the USS (MPDCCH CRC scrambled with C-RNTI)" or a meaning of "by configuring only with a field which exists when the corresponding DCI is transmitted with the CSS". For example, when the format of the DCI for notifying the emergency information is DCI format 6-1 a, the DCI size may be equal to a size when DCI format 6-1A is mapped to the common search space.

In the method, in order to prevent additional BD from being increased, DCI may be used, which has the same size as DCI for transferring TPC information transmitted with the CSS or fallback DCI. In this case, separate RNTI different from RNTI used for transmitting the DCI for transferring TPC information transmitted with the CSS or fallback DCI may be used in order to distinguish the DCI. For example, the separate RNTI may be dedicated RNTI for the emergency channel notification. Alternatively, since the DCI for the emergency channel notification is broadcast information, the separate RNTI may be SI-RNTI. For example, the DCI for notifying the emergency information may be CRC-scrambled with System Information (SI)-RNTI.

In the case of applying the method, the UE may perform BD for 1) DCI size k1 for transmitting the emergency channel notification information and 2) DCI size k2 including the field added by the UE-specific RRC configuration and transmitted with the USS, and transmitting UL/DL scheduling information. That is, the UE may perform BD for two DCI sizes. In this case, the same RNTI may be used and the DCI for the emergency channel notification and DCI for UL/DL scheduling may be distinguished by the DCI size (when k1 k2 is guaranteed).

And/or, in preparation for the case where k1=k2 exists, k1 and k2 may be distinguished by using separate RNTI. For example, the case of k1=k2 may be a case where there is no added field in the case of the UE-specific RRC configuration in the DCI. For example, the separate RNTI may be dedicated RNTI for the emergency channel notification or the SI-RNTI.

In this case, the dedicated RNTI for the emergency channel notification may be signaled to the UE through the RRC. The BS CRC-scrambles the emergency channel notification DCI with the separate RNTI and the CRC-scrambled DCI with Type0 CSS or Type0' CSS and the UE may distinguish the emergency channel notification DCI by performing BD by assuming DCI sizes k1 and k2 in the case of two RNTIs and/or k1≠k2.

And/or, when the emergency channel notification RNTI is separately used, a period of monitoring the DCI for the emergency channel may be configured to be different from a period of monitoring the DCI used in the USS. For example, when the emergency channel notification RNTI is separately used, attempting to detect Type0' CSS may be allowed only at a specific period and/or timing. The specific period and/or timing may be a value derived from a period and/or timing at which the corresponding UE or UEs sharing corresponding Type0' CSS monitor the paging channel in the RRC Idle state. In other words, the specific period and/or timing may be a value derived from the paging cycle, the paging frame, the paging occasion, and/or the UE identifier.

And/or, the method may be applied only to CE mode A. For example, in the case of CE mode A, the above proposed method for determining the DCI size by excluding the field added by the UE-specific RRC configuration may be applied and in the case of CE mode B, the same DCI size as the DCI format using in USS (e.g., DCI format 6-0B/1B) may be configured to be used.

As such, the reason for separately applying the DCI size to CE mode A and CE mode B is that in the case of CE mode A in the related art, since DCI of DCI format 6-0A/1A already transmitted with the USS and DCI (i.e., two sizes) transmitted with Type0 CSS are blind-decoded, when the DCI size for the emergency channel notification is equal to the DCI size transmitted with Type0 CSS, additional BD complexity does not increase, while in the case of CE mode B in the related art, since Type0 CSS is not supported, when the DCI size for the emergency channel notification is different from DCI format 6-0B/1B, the BD complexity may increase.

When the method is applied by considering this point, the emergency channel notification is supported without increasing UE complexity and in the case of CE mode A, the emergency channel notification is efficiently broadcasted to all UEs, thereby improving the BS scheduling burden and enhancing downlink transmission efficiency.

According to the method (e.g., the first to third embodiments) of the present disclosure, since RRC state transition procedure may be skipped in order for the BL/CE UE which operates in the CE mode to receive the emergency channel information in the RRC Connected state, signaling overhead of the BS may be minimized and an emergency channel reception delay time of the UE may also be minimized. Further, the UEs in the RRC Connected state is allowed to attempt to detect a specific physical layer channel (e.g., MPDCCH) for receiving the emergency channel information only at a specific limited time, thereby minimizing unnecessary power consumption.

It is obvious that since the examples of the embodiments proposed in the present disclosure may also be included as one of implementing methods of the present disclosure, the examples may be regarded as a kind of embodiments.

Further, as mentioned above, the embodiments proposed in the present disclosure may be independently implemented, but may be implemented as a combination (or merge) form of some embodiments. A rule may be defined and/or configured so as for the BS to notify, to the UE, information (or information on the rules of the embodiments) on whether to apply the embodiments through predefined signaling (e.g., physical layer signaling and/or higher layer signaling).

FIG. 27 is a flowchart for describing an operation method of a user equipment (UE) proposed by the present disclosure.

Referring to FIG. 27, first, a UE (reference numeral 1000/2000 in FIGS. 29 to 33) may receive, from, a BS, information including a reference signal received power (RSRP) threshold (S2701).

For example, the operation of the UE in step S2701 which receives the information including the RSRP threshold may be implemented by devices in FIGS. 29 to 33 to be described below. For example, referring to FIG. 30, one or more processors 1020 may control one or more memories 1040 and/or one or more RF units 1060 so as to receive the information including the RSRP threshold and one or more RF units 1060 may receive the information including the RSRP threshold.

And/or, the UE (reference numeral 1000/2000 in FIGS. 29 to 33) may determine a coverage enhancement (CE) mode based on an RSRP threshold and an RSRP measurement value (S2702).

For example, the operation of the UE in step S3108 which determines the CE mode may be implemented by the devices in FIGS. 29 to 33 to be described below. For example, referring to FIG. 30, one or more processors 1020 may determine the CE mode based on the RSRP threshold and the RSRP measurement value.

And/or, the UE (reference numeral 1000/2000 in FIGS. 29 to 33) may determine a physical random access channel (PRACH) resource based on the CE mode (S2703).

For example, the operation of the UE in step S2703 which determines the PRACH resource may be implemented by the devices in FIGS. 29 to 33 to be described below. For example, referring to FIG. 30, one or more processors 1020 may determine the PRACH resource based on the CE mode.

And/or, the UE (reference numeral 1000/2000 in FIGS. 29 to 33) may transmit, to the BS, a PRACH preamble based on the PRACH resource (S2704).

For example, the operation of the UE in step S2704 which transmits the PRACH preamble may be implemented by the devices in FIGS. 29 to 33 to be described below. For example, referring to FIG. 30, one or more processors 1020 may control one or more memories 1040 and/or one or more RF units 1060 so as to transmit the PRACH preamble and one or more RF units 1060 may transmit the PRACH preamble.

And/or, the UE (reference numeral 1000/2000 in FIGS. 29 to 33) may receive, from the BS, a random access response including an uplink (UL) grant based on the PRACH preamble (S2705).

For example, the operation of the UE in step S2705 which receives the random access response may be implemented by the devices in FIGS. 29 to 33 to be described below. For example, referring to FIG. 30, one or more processors 1020 may control one or more memories 1040 and/or one or more RF units 1060 so as to receive the random access response and one or more RF units 1060 may receive the random access response.

And/or, the UE (reference numeral 1000/2000 in FIGS. 29 to 33) may transmit, to the BS, message 3 based on the UL grant (S2706).

For example, the operation of the UE in step S2706 transmits message 3 may be implemented by the devices in FIGS. 29 to 33 to be described below. For example, referring to FIG. 30, one or more processors 1020 may control one or more memories 1040 and/or one or more RF units 1060 so as to receive message 3 and one or more RF units 1060 may receive message 3.

And/or, the UE (reference numeral 1000/2000 in FIGS. 29 to 33) may receive, from the BS, a message for contention resolution based on message 3 (S2707).

For example, the operation of the UE in step S2707 which receives the message for the contention resolution may be implemented by the devices in FIGS. 29 to 33 to be described below. For example, referring to FIG. 30, one or more processors 1020 may control one or more memories 1040 and/or one or more RF units 1060 so as to receive the message for the contention resolution and one or more RF units 1060 may receive the message for the contention resolution.

And/or, the UE (reference numeral 1000/2000 in FIGS. 29 to 33) may receive, from the BS, a system information block (SIB) (e.g., SIB1 and/or SIB1-BR) including scheduling information (e.g., schedulingInfoList) for emergency information (e.g., SIB10, SIB11, and/or SIB12) (S2708). For example, the emergency information may be an ETWS message or a CMAS message.

For example, the operation of the BS in step S2708 which receives the SIB may be implemented by the devices in FIGS. 29 to 33 to be described below. For example, referring to FIG. 30, one or more processors 1020 may control one or more memories 1040 and/or one or more RF units 1060 so as to receive the SIB and one or more RF units 1060 may receive the SIB.

And/or, the UE (reference numeral 1000/2000 in FIGS. 29 to 33) may receive, from the BS, configuration information for a search space (S2709).

For example, the operation of the UE in step S2709 which receives the configuration information for the search space may be implemented by the devices in FIGS. 29 to 33 to be described below. For example, referring to FIG. 30, one or more processors 1020 may control one or more memories 1040 and/or one or more RF units 1060 so as to receive the configuration information for the search space and one or more RF units 1060 may receive the configuration information for the search space.

And/or, the UE (reference numeral 1000/2000 of FIGS. 29 to 33) may receive, from the BS, downlink control information (DCI) for notification of the emergency information in the search space (S2710).

For example, the operation of the UE in step S2701 which receives the DCI may be implemented by the devices in FIGS. 29 to 33 to be described below. For example, referring to FIG. 30, one or more processors 1020 may control one or more memories 1040 and/or one or more RF units 1060 so as to receive the DCI and one or more RF units 1060 may receive the DCI.

And/or, the UE (reference numeral 1000/2000 in FIGS. 29 to 33) may receive, from the BS, the emergency information based on the DCI and the scheduling information (S2711).

For example, the operation of the BS in step S2711 which receives the emergency information may be implemented by the devices in FIGS. 29 to 33 to be described below. For example, referring to FIG. 30, one or more processors 1020 may control one or more memories 1040 and/or one or more RF units 1060 so as to receive the emergency information and one or more RF units 1060 may receive the emergency information.

In particular, the format of the DCI is the same as a DCI format for scheduling a Physical Downlink Shared Channel (PDSCH) (e.g., MPDCCH) related to MTC, and the DCI may have a size acquired by excluding information added by Radio Resource Control (RRC) configuration information from the DCI format.

For example, the DCI format may be DCI format 6-1A or DCI format 6-1B.

For example, the size of the DCI may be the same as the DCI of DCI format 6-1A or DCI format 6-11B mapped to the common search space. For example, the size of the DCI may be the same as the DCI of DCI format 6-1A mapped to the common search space based on that the format of the DCI is DCI format 6-1A. In the present disclosure, the 'search space', the 'common search space', and the 'UE specific search space' may be sequentially referred to as an 'exploration space', a 'common exploration space', and a 'UE specific exploration space', respectively.

For example, in the UE which operates in CE mode B, the format of the DCI is the same as DCI format 6-1 B, and the size of the DCI may be equal to a size acquired by excluding Number of scheduled TB for SC-MTCH field, Information for SC-MCCH change notification field, Scheduling TBs for Unicast field, and Resource reservation field from DCI format 6-1 B scheduling the PDSCH. Further, Resource block assignment field may also be configured with a size (or number of bits) when ce-pdsch-maxBandwidth-config which is RRC configuration information is not configured.

And/or, the UE may be a UE which operates in CE mode A based on that the DCI is DCI format 6-1A and the UE may be a UE which operates in CE mode B based on that the DCI is DCI format 6-1 B. For example, when the DCI is DCI format 6-1A, the UE may be a UE which operates in CE mode A. For example, when the DCI is DCI format 6-1 B, the UE may be a UE which operates in CE mode B.

For example, the search space is a type 0-MTC Physical Downlink Control Channel (MPDCCH) (e.g., MPDCCH) common search space.

And/or, the DCI for notification of the emergency information is CRC-scrambled by a System Information (SI)-Radio Network Temporary Identifier (RNTI).

And/or, the DCI for notification of the emergency information may be received through an MTC Physical Downlink Control Channel (PDCCH).

And/or, the UE may operate in an RRC connection state.

And/or, the UE (reference numeral 1000/2000 in FIGS. 29 to 33) may receive, from the BS, a master information block (MIB) including the scheduling information (e.g., schedulingInfoSIB1-BR) for the SIB.

For example, the operation of the UE which receives the MIB may be implemented by the devices in FIGS. 29 to 33 to be described below. For example, referring to FIG. 30, one or more processors 1020 may control one or more memories 1040 and/or one or more RF units 1060 so as to receive the MIB and one or more RF units 1060 may receive the MIB.

The operation of the UE described by referring to FIG. 27 is the same as the operations (e.g., the first to third embodiments) of the UE described by referring to FIGS. 1 to 26, so other detailed description will be omitted.

The signaling and operation may be implemented by the devices (e.g., FIGS. 29 to 33) to be described below. For example, the signaling and operation may be processed by one or more processors 1010 and 2020 in FIGS. 33 to 33 and the signaling and operation may be stored in memories (e.g., 1040 and 2040) in the form of an instruction/program (e.g., instruction or executable code) for driving at least one processor (e.g., 1010 and 2020) in FIGS. 29 to 33.

For example, in an apparatus including one or more memories and one or more memories functionally connected to one or more memories, one or more processors are configured to control the apparatus to receive, from the BS, information including a reference signal received power (RSRP) threshold, determine a coverage enhancement (CE) mode based on the RSRP threshold and an RSRP measurement value, determine a physical random access channel (PRACH) resource based on the CE mode, transmit, to the BS, a PRACH preamble based on the PRACH resource, receive, from the BS, a random access response including an uplink (UL) grant based on the PRACH preamble, transmit, to the BS, message 3 based on the UL grant, receive, from the BS, a message for contention resolution based on message 3, receive, from the BS, a system information block (SIB) including scheduling information for emergency information, receive, from the BS, configuration information for a search space, receive, from the BS, downlink control information (DCI) for notification of the emergency information in the search space, and receive, from the BS, the emergency information based on the DCI and the scheduling information, but the format of the DCI is the same as a DCI format for scheduling a Physical Downlink Shared Channel (PDSCH) (e.g., MPDCCH) related to MTC, and the DCI may have a size acquired by excluding information added by Radio Resource Control (RRC) configuration information from the DCI format.

As another example, in a non-transitory computer readable medium (CRM) device storing one or more instructions, one or more instructions executable by one or more processors are configured to control a UE to receive, from the BS, information including a reference signal received power (RSRP) threshold, determine a coverage enhancement (CE) mode based on the RSRP threshold and an RSRP measurement value, determine a physical random access channel (PRACH) resource based on the CE mode, transmit, to the BS, a PRACH preamble based on the PRACH resource, receive, from the BS, a random access response including an uplink (UL) grant based on the PRACH preamble, transmit, to the BS, message 3 based on the UL grant, receive, from the BS, a message for contention resolution based on message 3, receive, from the BS, a system information block (SIB) including scheduling information for emergency information, receive, from the BS, configuration information for a search space, receive, from the BS, downlink control information (DCI) for notification of the emergency information in the search space, and receive, from the BS, the emergency information based on the DCI and the scheduling information, but the format of the DCI is the same as a DCI format for scheduling a Physical Downlink Shared Channel (PDSCH) (e.g., MPDCCH) related to MTC, and the DCI may have a size acquired by excluding information added by Radio Resource Control (RRC) configuration information from the DCI format.

FIG. 28 is a flowchart for describing an operation method of a base station (BS) proposed by the present disclosure.

Referring to FIG. 28, first, a base station (BS) (reference numeral 1000/2000 in FIGS. 29 to 33) may transmit, to a UE, information including a reference signal received power (RSRP) threshold (S2801). And/or, the UE may determine a coverage enhancement (CE) mode based on an RSRP threshold and an RSRP measurement value. And/or, the UE (reference numeral 1000/2000 in FIGS. 29 to 33) may determine a physical random access channel (PRACH) resource based on the CE mode.

For example, the operation of the BS in step S2801 which transmits the information including the RSRP threshold may be implemented by the devices in FIGS. 29 to 33 to be described below. For example, referring to FIG. 30, one or more processors 1020 may control one or more memories 1040 and/or one or more RF units 1060 so as to transmit the information including the RSRP threshold and one or more RF units 1060 may transmit the information including the RSRP threshold.

And/or, the BS (reference numeral 1000/2000 in FIGS. 29 to 33) may receive, from the UE, a PRACH preamble based on the PRACH resource (S2802).

For example, the operation of the BS in step S2802 which receives the PRACH preamble may be implemented by the devices in FIGS. 29 to 33 to be described below. For example, referring to FIG. 30, one or more processors 1020 may control one or more memories 1040 and/or one or more RF units 1060 so as to receive the PRACH preamble and one or more RF units 1060 may receive the PRACH preamble.

And/or, the BS (reference numeral 1000/2000 in FIGS. 29 to 33) may transmit, to the UE, a random access response including an uplink (UL) grant based on the PRACH preamble (S2803).

For example, the operation of the BS in step S2803 which transmits the random access response may be implemented by the devices in FIGS. 29 to 33 to be described below. For example, referring to FIG. 30, one or more processors 1020 may control one or more memories 1040 and/or one or more RF units 1060 so as to transmit the random access response and one or more RF units 1060 may transmit the random access response.

And/or, the BS (reference numeral 1000/2000 in FIGS. 29 to 33) may receive, from the UE, message 3 based on the UL grant (S2804).

For example, the operation of the BS in step S2804 which receives message 3 may be implemented by the devices in FIGS. 29 to 33 to be described below. For example, referring to FIG. 30, one or more processors 1020 may control one or more memories 1040 and/or one or more RF units 1060 so as to receive message 3 and one or more RF units 1060 may receive message 3.

And/or, the BS (reference numeral 1000/2000 in FIGS. 29 to 33) may transmit, to the UE, a message for contention resolution based on message 3 (S2805).

For example, the operation of the BS in step S2805 which transmits the message for the contention resolution may be implemented by the devices in FIGS. 29 to 33 to be described below. For example, referring to FIG. 30, one or more processors 1020 may control one or more memories 1040 and/or one or more RF units 1060 so as to transmit the message for the contention resolution and one or more RF units 1060 may transmit the message for the contention resolution.

And/or, the BS (reference numeral 1000/2000 in FIGS. 33 to 33) may transmit, to the UE, a system information block (SIB) (e.g., SIB1 and/or SIB1-BR) including scheduling information (e.g., schedulingInfoList) for emergency information (e.g., SIB10, SIB11, and/or SIB12) (S2806). For example, the emergency information may be an ETWS message or a CMAS message.

For example, the operation of the BS in step S2806 which transmits the SIB may be implemented by the devices in FIGS. 29 to 33 to be described below. For example, referring to FIG. 30, one or more processors 1020 may control one or more memories 1040 and/or one or more RF units 1060 so as to transmit the SIB and one or more RF units 1060 may transmit the SIB.

And/or, the BS (reference numeral 1000/2000 in FIGS. 29 to 33) may transmit, to the UE, configuration information for a search space (S2807).

For example, the operation of the BS in step S2807 which transmits the configuration information for the search space may be implemented by the devices in FIGS. 29 to 33 to be described below. For example, referring to FIG. 30, one or more processors 1020 may control one or more memories 1040 and/or one or more RF units 1060 so as to transmit the configuration information for the search space and one or more RF units 1060 may transmit the configuration information for the search space.

And/or, the BS (reference numeral 1000/2000 in FIGS. 29 to 33) may transmit, to the UE, downlink control information (DCI) for notification of the emergency information in the search space (S2808).

For example, the operation of the BS in step S2808 which transmits the DCI may be implemented by the devices in FIGS. 29 to 33 to be described below. For example, referring to FIG. 30, one or more processors 1020 may control one or more memories 1040 and/or one or more RF units 1060 so as to transmit the DCI and one or more RF units 1060 may transmit the DCI.

And/or, the BS (reference numeral 1000/2000 in FIGS. 29 to 33) may transmit, to the UE, the emergency information based on the DCI and the scheduling information (S2809).

For example, the operation of the BS in step S2809 which transmits the emergency information may be implemented by the devices in FIGS. 29 to 33 to be described below. For example, referring to FIG. 30, one or more processors 1020 may control one or more memories 1040 and/or one or more RF units 1060 so as to transmit the emergency information and one or more RF units 1060 may transmit the emergency information.

In particular, the format of the DCI is the same as a DCI format for scheduling a Physical Downlink Shared Channel (PDSCH) (e.g., MPDCCH) related to MTC, and the DCI may have a size acquired by excluding information added by Radio Resource Control (RRC) configuration information from the DCI format.

For example, the DCI format may be DCI format 6-1A or DCI format 6-1B.

For example, the size of the DCI may be the same as the DCI of DCI format 6-1A or DCI format 6-11B mapped to the common search space. For example, the size of the DCI may be the same as the DCI of DCI format 6-1A mapped to the common search space based on that the format of the DCI is DCI format 6-1A.

For example, in the UE which operates in CE mode B, the format of the DCI is the same as DCI format 6-1 B, and the size of the DCI may be equal to a size acquired by excluding Number of scheduled TB for SC-MTCH field, Information for SC-MCCH change notification field, Scheduling TBs for Unicast field, and Resource reservation field from DCI format 6-1 B scheduling the PDSCH. Further, Resource block assignment field may also be configured with a size (or number of bits) when ce-pdsch-maxBandwidth-config which is RRC configuration information is not configured.

And/or, the UE may be a UE which operates in CE mode A based on that the DCI is DCI format 6-1A and the UE may be a UE which operates in CE mode B based on that the DCI is DCI format 6-1 B. For example, when the DCI is DCI format 6-1A, the UE may be a UE which operates in CE mode A. For example, when the DCI is DCI format 6-1 B, the UE may be a UE which operates in CE mode B.

For example, the search space is a type 0-MTC Physical Downlink Control Channel (MPDCCH) (e.g., MPDCCH) common search space.

And/or, the DCI for notification of the emergency information is CRC-scrambled by a System Information (SI)-Radio Network Temporary Identifier (RNTI).

And/or, the DCI for notification of the emergency information may be received through an MTC Physical Downlink Control Channel (PDCCH).

And/or, the UE may operate in an RRC connection state.

And/or, the BS (1000/2000 of FIGS. 29 to 33) may transmit, to the UE, a master information block (MIB) including the scheduling information (e.g., schedulingInfo-SIB1-BR) for the SIB.

For example, the operation of the BS which transmits the MIB may be implemented by the devices in FIGS. 29 to 33 to be described below. For example, referring to FIG. 30, one or more processors 1020 may control one or more memories 1040 and/or one or more RF units 1060 so as to transmit the MIB and one or more RF units 1060 may transmit the MIB.

The operation of the BS described by referring to FIG. 28 is the same as the operations (e.g., the first to third embodiments) of the BS described by referring to FIGS. 1 to 27, so a detailed description thereof will be omitted.

The signaling and operation may be implemented by the devices (e.g., FIGS. 29 to 33) to be described below. For example, the signaling and operation may be processed by one or more processors 1010 and 2020 in FIGS. 33 to 33 and the signaling and operation may be stored in memories (e.g., 1040 and 2040) in the form of an instruction/program (e.g., instruction or executable code) for driving at least one processor (e.g., 1010 and 2020) in FIGS. 29 to 33.

For example, in an apparatus including one or more memories and one or more memories functionally connected to one or more memories, one or more processors are configured to control the apparatus to transmit, to the UE, information including a reference signal received power (RSRP) threshold, in which a coverage enhancement (CE) mode is determined based on the RSRP threshold and an RSRP measurement value and a physical random access channel (PRACH) resource is determined based on the CE mode, receive, from the UE, a PRACH preamble based on the PRACH resource, transmit, to the UE, a random access response including an uplink (UL) grant based on the PRACH preamble, transmit, to the UE, message 3 based on the UL grant, transmit, to the UE, a message for contention resolution based on message 3, transmit, to the UE, a system information block (SIB) including scheduling information for emergency information, transmit, to the UE, configuration information for a search space, receive, from the BS, downlink control information (DCI) for notification of the emergency information in the search space, and transmit, to the UE, the emergency information based on the DCI and the scheduling information, but the format of the DCI is the same as a DCI format for scheduling a Physical Downlink Shared Channel (PDSCH) (e.g., MPDCCH) related to MTC, and the DCI may have a size acquired by excluding information added by Radio Resource Control (RRC) configuration information from the DCI format.

As another example, in a non-transitory computer readable medium (CRM) device storing one or more instructions, one or more instructions executable by one or more processors are configured to control a BS to transmit, to a UE, information including a reference signal received power (RSRP) threshold, in which a coverage enhancement (CE) mode is determined based on the RSRP threshold and an RSRP measurement value and a physical random access channel (PRACH) resource is determined based on the CE mode, receive, from the UE, a PRACH preamble based on the PRACH resource, transmit, to the UE, a random access response including an uplink (UL) grant based on the PRACH preamble, receive, from the UE, message 3 based on the UL grant, transmit, to the UE, a message for contention resolution based on message 3, transmit, to the UE, a system information block (SIB) including scheduling information for emergency information, transmit, to the UE, configuration information for a search space, transmit, to the UE, downlink control information (DCI) for notification of the emergency information in the search space, and receive, from the BS, the emergency information based on the DCI and the scheduling information, but the format of the DCI is the same as a DCI format for scheduling a Physical Downlink Shared Channel (PDSCH) (e.g., MPDCCH) related to MTC, and the DCI may have a size acquired by excluding information added by Radio Resource Control (RRC) configuration information from the DCI format.

Example of Communication System to Which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 29 illustrates a communication system 10 applied to the present disclosure.

Referring to 29, a communication system 10 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 1000*a*, vehicles 1000*b*-1 and 1000*b*-2, an eXtended Reality (XR) device 1000*c*, a hand-held device 1000*d*, a home appliance 1000*e*, an Internet of Thing (IoT) device 1000*f*, and an AI device/server 4000. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 2,000a may operate a BS/network node for another wireless device.

The wireless devices 1000a to 1000f may be connected to a network 3000 through a BS 2000. An artificial intelligence (AI) technology may be applied to the wireless devices 1000a to 100f and the wireless devices 1000a to 1000f may be connected to an AI server 4000 through the network 3000. The network 3000 may be configured by using a 3G network, a 4G (e.g., LTE) network, or a 5G (e.g., NR) network. The wireless devices 1000a to 1000f may communicate with each other through the BS 2000/network 3000, but may directly communicate with each other without going through the BS/network (sidelink communication). For example, the vehicles 1000b-1 and 1000b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 1000a to 1000f.

Wireless communications/connections 1500a, 1500b, and 1500c may be made between the wireless devices 1000a to 1000f and the BS 2000 and between the BS 2000 and the BS 2000. Here, the wireless communication/connection may be made through various wireless access technologies (e.g., 5G NR) such as uplink/downlink communication 1500a, sidelink communication 1500b (or D2D communication), and inter-BS communication 1500c (e.g., relay, Integrated Access Backhaul (IAB)). The wireless device and the BS/the wireless device and the BS and the BS may transmit/receive radio signals to/from each other through wireless communications/connections 1500a, 1500b, and 1500c. For example, the wireless communications/connections 1500a, 1500b, and 1500c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to Which Present Disclosure is Applied

FIG. 30 illustrates a wireless device which may be applied to the present disclosure.

Referring to FIG. 30, a first wireless device 1000 and a second wireless device 2000 may transmit/receive radio signals through various wireless access technologies (e.g., LTE and NR). Here, the first wireless device 1000 and the second wireless device 2000 may correspond to a wireless device 1000x and a BS 2000 and/or a wireless device 1000x and a wireless device 1000x of FIG. 32.

The first wireless device 1000 may include one or more processors 1020 and one or more memories 1040 and additionally further include one or more transceivers 1060 and/or one or more antennas 1080. The processor 1020 may control the memory 1040 and/or the transceiver 1060 and may be configured to implement descriptions, functions, procedures, proposals, methods, and/or operation flows disclosed in the present disclosure. For example, the processor 1020 may process information in the memory 1040 and generate a first information/signal and then transmit a radio signal including the first information/signal through the transceiver 1060. Further, the processor 1020 may receive a radio signal including a second information/signal through the transceiver 1060 and then store in the memory 1040 information obtained from signal processing of the second information/signal. The memory 1040 may connected to the processor 1020 and store various information related to an operation of the processor 1020. For example, the memory 1040 may store a software code including instructions for performing some or all of processes controlled by the processor 1020 or performing the descriptions, functions, procedures, proposals, methods, and/or operation flowcharts disclosed in the present disclosure. Here, the processor 1020 and the memory 1040 may be a part of a communication modem/circuit/chip designated to implement the wireless communication technology (e.g., LTE and NR). The transceiver 1060 may be connected to the processor 1020 and may transmit and/or receive the radio signals through one or more antennas 1080. The transceiver 1060 may include a transmitter and/or a receiver. The transceiver 1060 may be mixed with a radio frequency (RF) unit. In the present disclosure, the wireless device may mean the communication modem/circuit/chip.

The second wireless device 2000 may include one or more processors 2020 and one or more memories 2040 and additionally further include one or more transceivers 2060 and/or one or more antennas 2080. The processor 2020 may control the memory 2040 and/or the transceiver 2060 and may be configured to implement descriptions, functions, procedures, proposals, methods, and/or operation flows disclosed in the present disclosure. For example, the processor 2020 may process information in the memory 2040 and generate a third information/signal and then transmit a radio signal including the third information/signal through the transceiver 2060. Further, the processor 2020 may receive a radio signal including a fourth information/signal through the transceiver 2060 and then store in the memory 2040 information obtained from signal processing of the fourth information/signal. The memory 2040 may connected to the processor 2020 and store various information related to an operation of the processor 2020. For example, the memory 2040 may store a software code including instructions for performing some or all of processes controlled by the processor 2020 or performing the descriptions, functions, procedures, proposals, methods, and/or operation flowcharts disclosed in the present disclosure. Here, the processor 2020 and the memory 2040 may be a part of a communication modem/circuit/chip designated to implement the wireless communication technology (e.g., LTE and NR). The transceiver 2060 may be connected to the processor 2020 and may transmit and/or receive the radio signals through one or more antennas 2080. The transceiver 2060 may include a transmitter and/or a receiver and the transceiver 2060 may be mixed with the RF unit. In the present disclosure, the wireless device may mean the communication modem/circuit/chip.

Hereinafter, hardware elements of the wireless devices 1000 and 2000 will be described in more detail. Although not limited thereto, one or more protocol layers may be implemented by one or more processors 1020 and 2020. For example, one or more processors 1020 and 2020 may implement one or more layers (e.g., functional layers such as PHY, MAC, RLC, PDCP, RRC, and SDAP). One or more processors 1020 and 2020 may generate one or more protocol data units (PDUs) and/or one or more service data units (SDUs) according to the descriptions, functions, procedures, proposals, methods, and/or operation flowcharts disclosed in the present disclosure. One or more processors 1020 and 2020 may generate a message, control information, data, or information according to the descriptions, functions, procedures, proposals, methods, and/or operation flowcharts disclosed in the present disclosure. One or more processors 1020 and 2020 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 1060 and 2060. One or more processors 1020 and 2020 may receive the signal (e.g. baseband signal) from one or more transceivers 1060 and 2060 and acquire the PDU, the SDU, the message, the control information, the data, or the information according to the descriptions, functions, procedures, proposals, methods, and/or operation flowcharts disclosed in the present disclosure.

One or more processors 1020 and 2020 may be referred to as a controller, a microcontroller, a microprocessor, or a microcomputer. One or more processors 1020 and 2020 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 1020 and 2020. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 1020 and 2020 or stored in one or more memories 1040 and 2040 and driven by one or more processors 1020 and 2020. The descriptions, functions, procedures, proposals, and/or operation flowcharts disclosed in the present disclosure may be implemented by using firmware or software in the form of a code, the instruction and/or a set form of the instruction.

One or more memories 1040 and 2040 may be connected to one or more processors 1020 and 2020 and may store various types of data, signals, messages, information, programs, codes, instructions, and/or instructions. One or more memories 1040 and 2040 may be configured by a ROM, a RAM, an EPROM, a flash memory, a hard drive, a register, a cache memory, a computer reading storage medium, and/or a combination thereof. One or more memories 1040 and 2040 may be positioned inside and/or outside one or more processors 1020 and 2020. Further, one or more memories 1040 and 2040 may be connected to one or more processors 1020 and 2020 through various technologies such as wired or wireless connection.

One or more transceivers 1060 and 2060 may transmit to one or more other devices user data, control information, a wireless signal/channel, etc., mentioned in the methods and/or operation flowcharts of the present disclosure. One or more transceivers 1060 and 2060 may receive from one or more other devices user data, control information, a wireless signal/channel, etc., mentioned in the descriptions, functions, procedures, proposals, methods, and/or operation flowcharts disclosed in the present disclosure. For example, one or more transceivers 1060 and 2060 may be connected to one or more processors 1020 and 2020 and transmit and receive the radio signals. For example, one or more processors 1020 and 2020 may control one or more transceivers 1060 and 2060 to transmit the user data, the control information, or the radio signal to one or more other devices. Further, one or more processors 1020 and 2020 may control one or more transceivers 1060 and 2060 to receive the user data, the control information, or the radio signal from one or more other devices. Further, one or more transceivers 1060 and 2060 may be connected to one or more antennas 1080 and 2080 and one or more transceivers 1060 and 2060 may be configured to transmit and receive the user data, control information, wireless signal/channel, etc., mentioned in the descriptions, functions, procedures, proposals, methods, and/or operation flowcharts disclosed in the present disclosure through one or more antennas 1080 and 2080. In the present disclosure one or more antennas may be a plurality of physical antennas or a plurality of logical antennas (e.g., antenna ports). One or more transceivers 1060 and 2060 may convert the received radio signal/channel from an RF band signal to a baseband signal in order to process the received user data, control information, radio signal/channel, etc., by using one or more processors 1020 and 2020. One or more transceivers 1060 and 2060 may convert the user data, control information, radio signal/channel, etc., processed by using one or more processors 1020 and 2020, from the baseband signal into the RF band signal. To this end, one or more transceivers 1060 and 2060 may include an (analog) oscillator and/or filter.

Example of Signal Processing Circuit to which Present Disclosure is Applied

FIG. 31 illustrates a signal processing circuit for a transmit signal.

Referring to FIG. 31 a signal processing circuit 10000 may include a scrambler 10100, a modulator 10200, a layer mapper 10300, a precoder 10400, a resource mapper 10500, and a signal generator 10600. Although not limited thereto, an operation/function of FIG. 31 may be performed by the processors 1020 and 2020 and/or the transceivers 1060 and 2060 of FIG. 30. Hardware elements of FIG. 31 may be implemented in the processors 1020 and 2020 and/or the transceivers 1060 and 2060 of FIG. 30. For example, blocks 10100 to 10600 may be implemented in the processors 1020 and 2020 of FIG. 30. Further, blocks 10100 to 10500 may be implemented in the processors 1020 and 2020 of FIG. 30 and the block 10600 of FIG. and the block 2760 may be implemented in the transceivers 1060 and 2060 of FIG. 30.

A codeword may be transformed into a radio signal via the signal processing circuit 10000 of FIG. 31. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 10100. A scramble sequence used for scrambling may be generated based on an initialization value and the initialization value may include ID information of a wireless device. The scrambled bit sequence may be modulated into a modulated symbol sequence by the modulator 10200. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 10300. Modulated symbols of each transport layer may be mapped to a corresponding antenna port(s) by the precoder 10400 (precoding). Output z of the precoder 10400 may be obtained by multiplying output y of the layer mapper 10300 by precoding matrix W of N*M. Here, N represents the number of antenna ports and M represents the number of transport layers. Here, the precoder 10400 may perform precoding after performing transform precoding (e.g., DFT transform) for complex modulated symbols. Further, the precoder 10400 may perform the precoding without performing the transform precoding.

The resource mapper 10500 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 10600 may generate the radio signal from the mapped modulated symbols and the generated radio signal may be transmitted to another device through each antenna. To this end, the signal generator 10600 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (10100 to 10600) of FIG. 25. For example, the wireless device (e.g., 1000 or 2000 of FIG. 24) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to Which Present Disclosure is Applied

FIG. 32 illustrates another example of a wireless device applied to the present disclosure.

The wireless device may be implemented as various types according to a use example/service (see FIG. 29). Referring to FIG. 32, wireless devices 1000 and 2000 may correspond to the wireless devices 1000 and 2000 of FIG. 31 and may be constituted by various elements, components, units, and/or modules. For example, the wireless devices 1000 and 2000 may include a communication unit 1100, a control unit 1200, and a memory unit 1300, and an additional element 1400. The communication unit may include a communication circuit 1120 and a transceiver(s) 1140. For example, the communication circuit 1120 may include one or more processors 1020 and 2020 and/or one or more memories 1040 and 2040 of FIG. 22. For example, the transceiver(s) 1140 may include one or more transceivers 1060 and 2060 and/or one or more antennas 1080 and 2080 of FIG. 22. The control unit 1200 is electrically connected to the communication unit 1100, the memory unit 1300, and the additional element 1400 and controls an overall operation of the wireless device. For example, the control unit 1200 may an electrical/mechanical operation of the wireless device based on a program/code/instruction/information stored in the memory unit 1300. Further, the control unit 1200 may transmit the information stored in the memory unit 1300 to the outside (e.g., other communication devices) through the communication unit 1100 via a wireless/wired interface or store information received from the outside (e.g., other communication devices) through the wireless/wired interface through the communication unit 1100.

The additional element 1400 may be variously configured according to the type of wireless device. For example, the additional element 1400 may include at least one of a power unit/battery, an input/output (I/O) unit, a driving unit, and a computing unit. Although not limited thereto, the wireless device may be implemented as a form such as the robot 1000*a* of FIG. 29, the vehicles 1000*b*-1 and 1000*b*-2 of FIG. 29, the XR device 1000*c* of FIG. 29, the portable device 100*d* of FIG. 29, the home appliance 1000*e* of FIG. 29, the IoT device 1000*f* of FIG. 29, a digital broadcasting terminal, a hologram device, a public safety device, an MTC device, a medical device, a fintech device (or financial device), a security device, a climate/environment device, an AI server/device 4000 of FIG. 29, the BS 2000 of FIG. 29, a network node, etc. The wireless device may be movable or may be used at a fixed place according to a use example/service.

In FIG. 32, all of various elements, components, units, and/or modules in the wireless devices 1000 and 2000 may be interconnected through the wired interface or at least may be wirelessly connected through the communication unit 1100. For example, the control unit 1200 and the communication 110 in the wireless devices 1000 and 2000 may be wiredly connected and the control unit 1200 and the first unit (e.g., 1300 or 1400) may be wirelessly connected through the communication unit 1100. Further, each element, component, unit, and/or module in the wireless devices 1000 and 2000 may further include one or more elements. For example, the control unit 1200 may be constituted by one or more processor sets. For example, the control unit 1200 may be configured a set of a communication control processor, an application processor, an electronic control unit (ECU), a graphic processing processor, a memory control processor, etc. As another example, the memory 1300 may be configured as a random access memory (RAM), a dynamic RAM (DRAM), a read only memory (ROM), a flash memory, a volatile memory, a non-volatile memory, and/or combinations thereof.

FIG. 33 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 33, a portable device 1000 may include an antenna unit 1080, a communication unit 1100, a control unit 1200, a memory unit 1300, a power supply unit 1400*a*, an interface unit 1400*b*, and an input/output unit 1400*c*. The antenna unit 1080 may be configured as a part of the communication unit 1100. The blocks 1100 to 1300/1400*a* to 1400*c* correspond to the blocks 1100 to 1300/1400 of FIG. 32, respectively.

The communication unit 1100 may transmit/receive a signal (e.g., data, a control signal, etc.) to/from another wireless device and BSs. The control unit 1200 may perform various operations by controlling components of the portable device 1000. The control unit 1200 may include an Application Processor (AP). The memory unit 1300 may store data/parameters/programs/codes/instructions required for driving the portable device 1000. Further, the memory unit 1300 may store input/output data/information, etc. The power supply unit 1,400*a* may supply power to the portable device 1000 and include a wired/wireless charging circuit, a battery, and the like. The interface unit 1400b may support a connection between the portable device 1000 and another external device. The interface unit 1400b may include various ports (e.g., an audio input/output port, a video input/output port) for the connection with the external device. The input/output unit 1400c may receive or output a video information/signal, an audio information/signal, data, and/or information input from a user. The input/output unit 1400c may include a camera, a microphone, a user input unit, a display unit 1400d, a speaker, and/or a haptic module.

As one example, in the case of data communication, the input/output unit 1400c may acquire information/signal (e.g., touch, text, voice, image, and video) input from the user and the acquired information/signal may be stored in the memory unit 1300. The communication unit 1100 may transform the information/signal stored in the memory into the radio signal and directly transmit the radio signal to another wireless device or transmit the radio signal to the BS. Further, the communication unit 1100 may receive the radio signal from another wireless device or BS and then reconstruct the received radio signal into original information/signal. The reconstructed information/signal may be stored in the memory unit 1300 and then output in various forms (e.g., text, voice, image, video, haptic) through the input/output unit 1400c.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

In the wireless communication system supporting the MTC of the present disclosure, the method for transmitting/receiving the emergency information is described primarily with various wireless communication systems such as a 5G system, etc., in addition to an example applied to a 3GPP LTE/LTE-A system.

The invention claimed is:

1. A method of receiving, by a user equipment (UE), emergency information in a wireless communication system supporting Machine Type Communication (MTC), the method comprising:
    receiving, from a base station (BS), information including a reference signal received power (RSRP) threshold;
    determining a coverage enhancement (CE) mode based on the RSRP threshold and an RSRP measurement value;
    determining a physical random access channel (PRACH) resource based on the CE mode;
    transmitting, to the BS, a PRACH preamble based on the PRACH resource;
    receiving, from the BS, a random access response including an uplink (UL) grant based on the PRACH preamble;
    transmitting, to the BS, message 3 based on the UL grant;
    receiving, from the BS, a message for contention resolution based on message 3;
    receiving, from the BS, at least one emergency system information block (eSIB) including first scheduling information for the emergency information, wherein second scheduling information for the at least one eSIB is included in SIB1, wherein third scheduling information for the SIB1 is included in master information block (MIB),
    wherein the second scheduling information is changed in response to at least one transmission of the at least one eSIB, the third scheduling information remains as same as before the at least at least one transmission of the at least one eSIB;
    receiving, from the BS, configuration information related to a common search space;
    receiving, from the BS, first downlink control information (DCI) for emergency information indication, that is scrambled by a system information-radio network temporary identifier (SI-RNTI), in the common search space; and
    receiving, from the BS, the emergency information based on the first DCI and the scheduling information,
    wherein the first DCI has a same DCI format 6-1A as second DCI,
    wherein the first DCI has the same size as the second DCI that is scrambled by a cell-radio network temporary identifier (C-RNTI), which is mapped to a common search space.

2. The method of claim 1, wherein the UE is a UE which operates in CE mode A.

3. The method of claim 1, wherein a common search space is a Type 0-MTC Physical Downlink Control Channel (MPDCCH) common search space.

4. The method of claim 1, further comprising:
    receiving, from the BS, the MIB including the third scheduling information for the SIB1, receiving, from the BS, the SIB1 including the second scheduling information for the at least one eSIB.

5. The method of claim 1, wherein the first DCI is received through an MTC Physical Downlink Control Channel (PDCCH).

6. The method of claim 1, wherein the UE operates in an RRC connection state.

7. A user equipment (UE) configured to receive emergency information in a wireless communication system supporting Machine Type Communication (MTC), the UE comprising:
at least one transceiver;
at least one processor; and
at least one memory operably connectable to the at least one processor and storing instructions that, based on being executed by the at least one processor, perform operations comprising:
receiving, from a base station (BS), information including a reference signal received power (RSRP) threshold;
determining a coverage enhancement (CE) mode based on the RSRP threshold and an RSRP measurement value;
determining a physical random access channel (PRACH) resource based on the CE mode;
transmitting, to the BS, a PRACH preamble based on the PRACH resource;
receiving, from the BS, a random access response including an uplink (UL) grant based on the PRACH preamble;
transmitting, to the BS, message 3 based on the UL grant;
receiving, from the BS, a message for contention resolution based on message 3;
receiving, from the BS, at least one emergency system information block (eSIB) including first scheduling information for the emergency information, wherein second scheduling information for the at least one eSIB is included in SIB1, wherein third scheduling information for the SIB1 is included in master information block (MIB),
wherein the second scheduling information is changed in response to at least one transmission of the at least one eSIB, the third scheduling information remains as same as before the at least at least one transmission of the at least one eSIB;
receiving, from the BS, configuration information related to a common search space;
receiving, from the BS, first downlink control information (DCI) for emergency information indication, that is scrambled by a system information-radio network temporary identifier (SI-RNTI), in the common search space; and
receiving, from the BS, the emergency information based on the first DCI and the scheduling information,
wherein the first DCI has a same DCI format 6-1A as second DCI,
wherein the first DCI has the same size as the second DCI that is scrambled by a cell-radio network temporary identifier (C-RNTI), which is mapped to a common search space.

8. A method of transmitting, by a base station (BS), emergency information in a wireless communication system supporting Machine Type Communication (MTC), the method comprising:
transmitting, to a user equipment (UE), information including a reference signal received power (RSRP) threshold, wherein a coverage enhancement (CE) mode is determined based on the RSRP threshold and an RSRP measurement value, and wherein a physical random access channel (PRACH) resource is determined based on the CE mode;
receiving, from the UE, a PRACH preamble based on the PRACH resource;
transmitting, to the UE, a random access response including an uplink (UL) grant based on the PRACH preamble;
receiving, from the UE, message 3 based on the UL grant;
transmitting, to the UE, a message for contention resolution based on message 3;
transmitting, to the UE, at least one emergency system information block (eSIB) including first scheduling information for the emergency information, wherein second scheduling information for the at least one eSIB is included in SIB1, wherein third scheduling information for the SIB1 is included in master information block (MIB),
wherein the second scheduling information is changed in response to at least one transmission of the at least one eSIB, the third scheduling information remains as same as before the at least at least one transmission of the at least one eSIB;
transmitting, to the UE, configuration information related to a common search space;
transmitting, to the UE, first downlink control information (DCI) for emergency information indication, that is scrambled by a system information-radio network temporary identifier (SI-RNTI), in the common search space; and
transmitting, to the UE, the emergency information based on the first DCI and the scheduling information,
wherein the first DCI has a same DCI format 6-1A as second DCI,
wherein the first DCI has the same size as the second DCI that is scrambled by a cell-radio network temporary identifier (C-RNTI), which is mapped to a common search space.

9. The method of claim 8, wherein the UE is a UE which operates in CE mode A.

10. The method of claim 8, wherein a common search space is a Type 0-MTC Physical Downlink Control Channel (MPDCCH) common search space.

11. The method of claim 8, further comprising:
transmitting, to the UE, the MIB including the third scheduling information for the SIB1,
transmitting, to the UE, the SIB1 including the second scheduling information for the at least one eSIB.

12. The method of claim 8, wherein the first DCI is received through an MTC Physical Downlink Control Channel (PDCCH).

13. The method of claim 8, wherein the UE operates in an RRC connection state.

* * * * *